United States Patent
Takahashi et al.

(10) Patent No.: US 7,325,452 B2
(45) Date of Patent: Feb. 5, 2008

(54) VIBRATING GYROSCOPIC SENSOR AND METHOD OF ADJUSTING VIBRATING GYROSCOPIC SENSOR

(75) Inventors: Kazuo Takahashi, Miyagi (JP); Teruo Inaguma, Miyagi (JP); Manabu Aizawa, Miyagi (JP); Koji Suzuki, Miyagi (JP); Shin Sasaki, Miyagi (JP); Eiji Nakashio, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/368,153

(22) Filed: Mar. 3, 2006

(65) Prior Publication Data

US 2006/0196267 A1 Sep. 7, 2006

(30) Foreign Application Priority Data

| Mar. 4, 2005 | (JP) | ............................ 2005-106717 |
| Jun. 16, 2005 | (JP) | ............................ 2005-176870 |
| Jun. 16, 2005 | (JP) | ............................ 2005-176871 |
| Dec. 28, 2005 | (JP) | ............................ 2005-380330 |

(51) Int. Cl.
*G01P 3/00* (2006.01)
*G01P 9/00* (2006.01)

(52) U.S. Cl. .................. 73/504.15; 73/504.12
(58) Field of Classification Search ............ 73/504.02, 73/504.04, 504.12, 504.13, 504.14, 504.15, 73/504.16; 310/367, 320–322
See application file for complete search history.

(56) References Cited

U.S. PATENT DOCUMENTS

| 5,349,261 A * | 9/1994 | Fujimoto et al. ........... 310/321 |
| 5,635,642 A | 6/1997 | Nonomura et al. |
| 5,765,046 A | 6/1998 | Watanabe et al. |
| 5,796,000 A | 8/1998 | Fujiu et al. |
| 6,578,420 B1 | 6/2003 | Hsu |
| 6,944,931 B2 * | 9/2005 | Shcheglov et al. ........... 29/595 |

OTHER PUBLICATIONS

European Search Report dated Jun. 30, 2003.

* cited by examiner

*Primary Examiner*—Helen Kwok
(74) *Attorney, Agent, or Firm*—Sonnenschein Nath & Rosenthal LLP

(57) ABSTRACT

A vibrating gyroscopic sensor including a vibrating gyroscopic sensor element including a cantilever vibrator that includes a piezoelectric film, a driving electrode, and a pair of detection electrodes on a first surface, and a support substrate on which the vibrating gyroscopic sensor element is mounted. The vibrating gyroscopic sensor element is mounted on the support substrate so that the first surface of the cantilever vibrator faces the support substrate. An area other than the first surface of the cantilever vibrator is defined as a laser processing area where a depression for adjusting the vibration characteristics of the cantilever vibrator is to be provided.

25 Claims, 62 Drawing Sheets

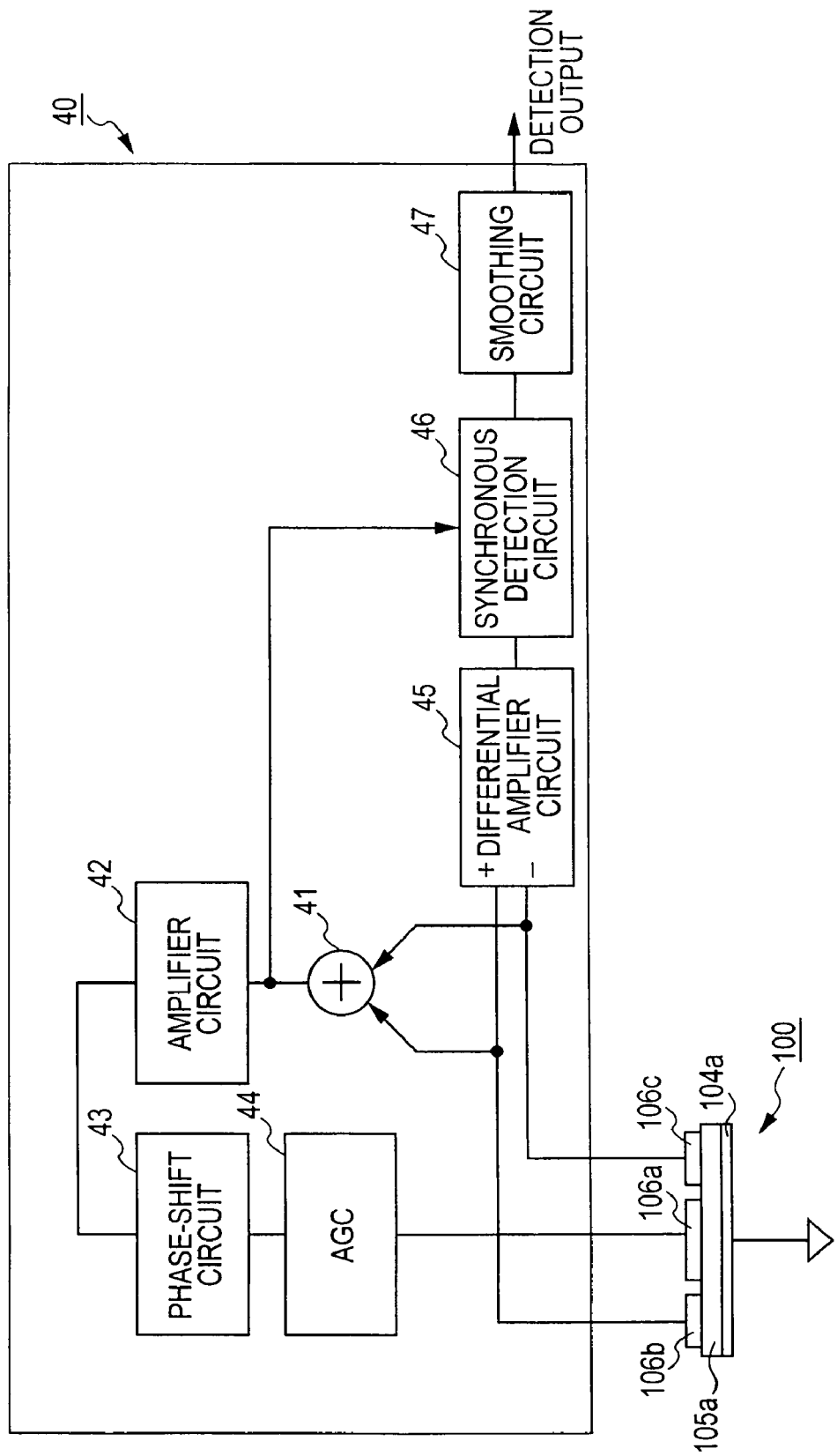

VIBRATION DIRECTION

VIBRATION DIRECTION

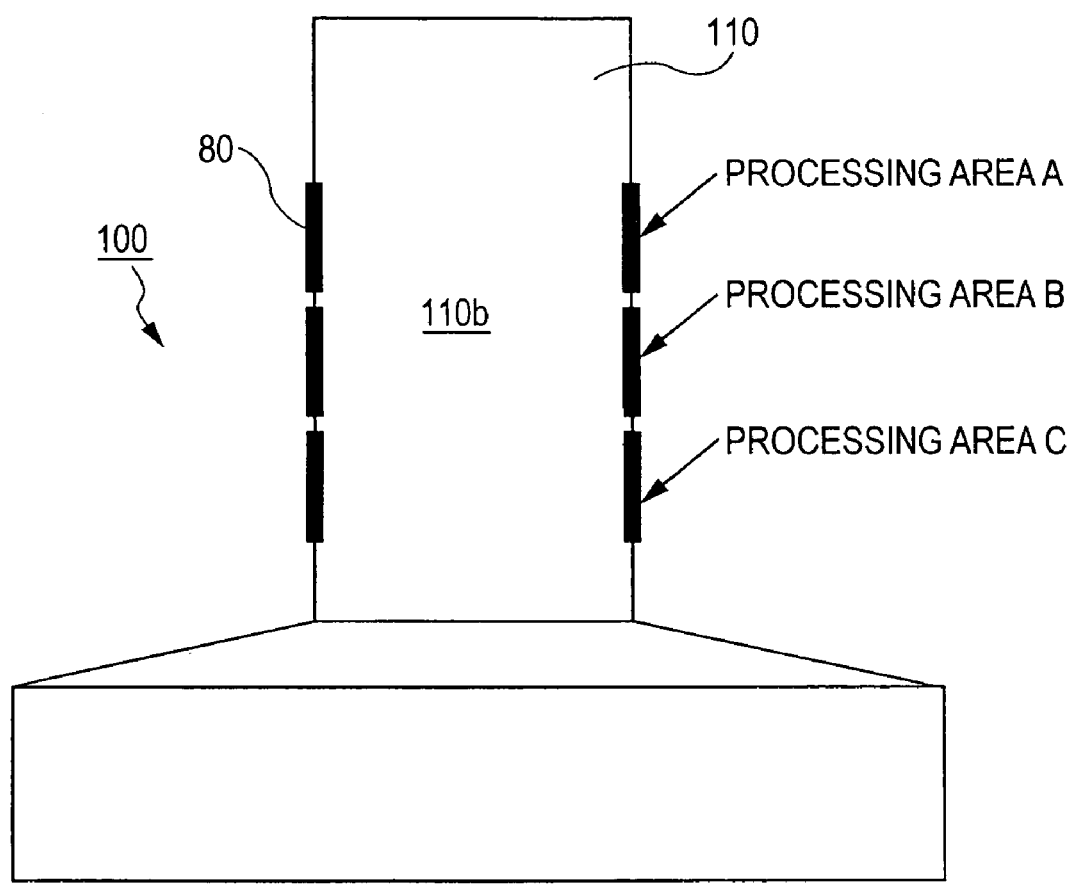

LASER PROCESSING

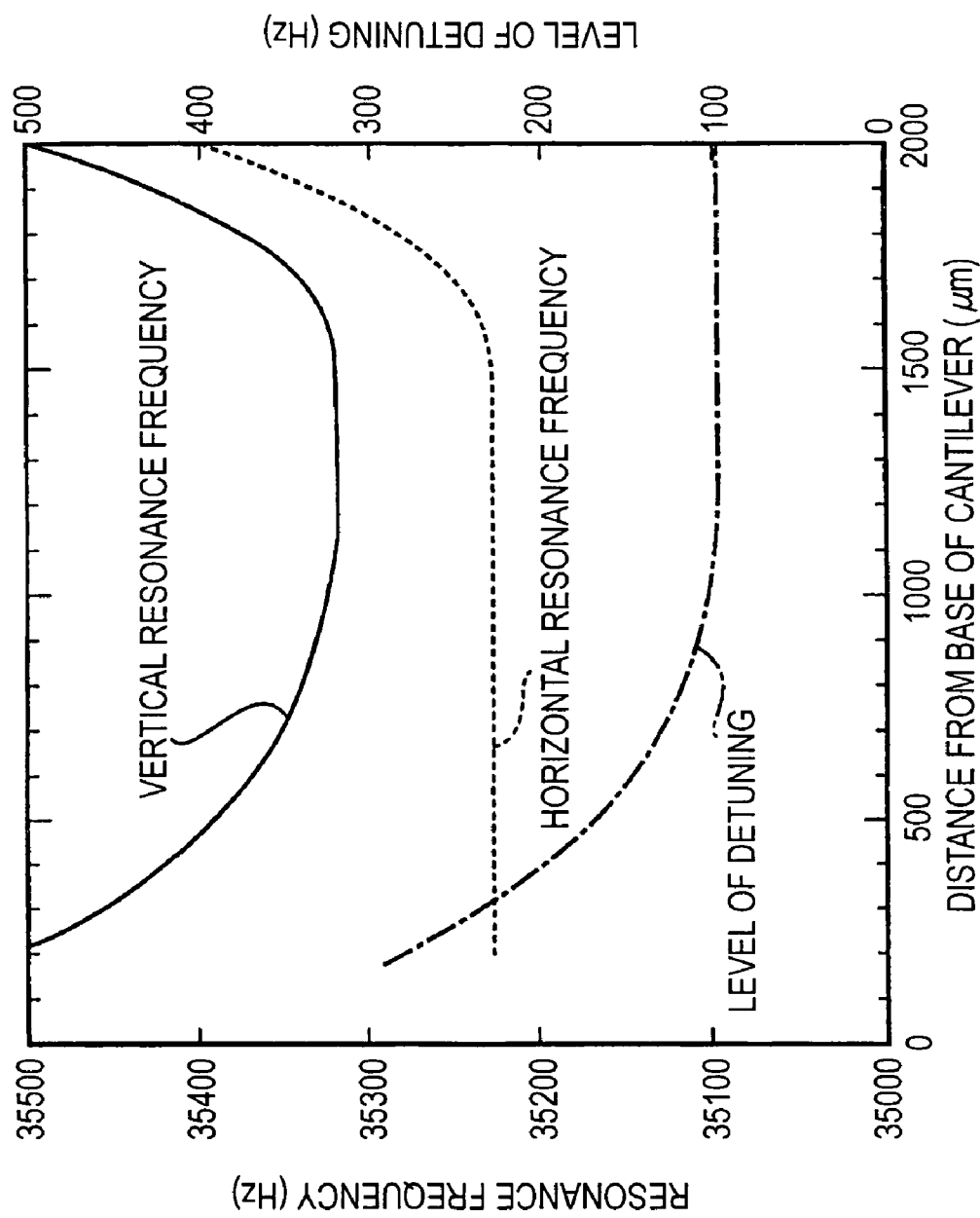

VIBRATION DIRECTION

VIBRATION DIRECTION

VIBRATION MODE
WHEN BASE IS SYMMETRIC

VIBRATION MODE
WHEN BASE IS ASYMMETRIC

VIBRATING GYROSCOPIC SENSOR AND METHOD OF ADJUSTING VIBRATING GYROSCOPIC SENSOR

CROSS REFERENCES TO RELATED APPLICATIONS

The present invention contains subject matter related to Japanese Patent Applications JP 2005-106717, JP 2005-176871, JP 2005-176870, and JP 2005-380330 filed in the Japanese Patent Office on Mar. 4, 2005, Jun. 16, 2005, Jun. 16, 2005, and Dec. 28, 2005, respectively, the entire contents of which are incorporated herein by reference.

BACKGROUND OF THE INVENTION

1. Field of the Invention

The present invention relates to an angular rate sensor used for, for example, shaking detection in a video camera, motion detection in a virtual reality apparatus, or direction detection in a car navigation system and, more specifically, relates to a small vibrating gyroscopic sensor including a cantilever vibrator and a method of adjusting the same.

2. Description of the Related Art

As a known commercial angular rate sensor, a vibrating gyroscopic sensor that is configured to detect angular rate by vibrating a cantilever vibrator at a predetermined resonance frequency and detecting the Coriolis force that is generated due to the angular speed with a piezoelectric device is widely used.

A known vibrating gyroscopic sensor is advantageous in that it has a simple mechanism, a short start-up time, and a low production cost. Such a known vibrating gyroscopic sensor is mounted on an electronic device, such as a video camera, a virtual reality apparatus, or a car navigation system, so as to function as a shaking detection sensor, a motion detection sensor, or a direction detection sensor, respectively.

A known vibrating gyroscopic sensor is produced by constructing a vibrator having a predetermined shape by using a machine to cut out a piezoelectric material. As the size and weight of components mounted on a known vibrating gyroscopic sensor have been reduced and the functions and performance of the components have been improved, size reduction and performance improvement of vibrating gyroscopic sensors have been required. However, it is difficult to produce a small and highly accurate vibrator due to a limit of the processing accuracy of machining.

Therefore, recently, a vibrating gyroscopic sensor including a cantilever vibrating element by employing thin film technology used in a semiconductor process so as to form a pair of electrode layers sandwiching a piezoelectric thin film on a silicon substrate has been proposed (for example, refer to Japanese Unexamined Patent Application Publication No. 7-113643). By reducing the size and thickness, such a vibrating gyroscopic sensor can be combined with other sensors used for other purposes to produce a complex and advanced system.

The vibrator of a vibrating gyroscopic sensor is often shaped as a prism, but it is difficult to produce a completely symmetric vibrator through a machining process or a thin film formation process. Therefore, the produced vibrator will be asymmetric with respect to the center line. When an asymmetric vibrator is vibrated, the vibration direction of the vibrator will be tilted with respect to the center line of the vibrator and will not be perpendicular to the support substrate. When the vibration direction of the vibrator is tilted, the magnitudes of the signals generated at the pair of detection electrodes that are symmetrically provided on the vibrator will differ. As a result, the characteristics of the vibrator will be unstable.

Accordingly, for a known vibrating gyroscopic sensor, the surface of an asymmetric vibrator is ground to adjust the mass balance of the vibrator (refer to Japanese Unexamined Patent Application Publication No. 2000-65579) or the vibration characteristics of the vibrator are adjusted at the positions where the vibrator is fixed to the support substrate (refer to Japanese Unexamined Patent Application Publication No. 2001-330440).

SUMMARY OF THE INVENTION

However, it is extremely difficult to employ the above-described method of adjusting a known vibrating gyroscopic sensor to a fine, small vibrating gyroscopic sensor that is produced by employing a semiconductor process.

Furthermore, there is a possibility that the piezoelectric film and the various electrode films provided on the surface of the vibrator will be damaged when adjusting the vibration of a fine, small vibrating gyroscopic sensor, causing the loss of stable piezoelectric properties. There is also a possibility that the durability of the vibrator will be decreased by a reduction of the strength of the vibrator caused by processing carried out on the surface of the vibrator to adjust the vibration characteristic of the vibrator.

The present invention has taken into consideration the above-identified problems and provides a vibrating gyroscopic sensor having a vibrator whose vibration characteristic can be adjusted while maintaining stable characteristics and great strength and a method of adjusting the vibrating gyroscopic sensor.

To solve the above-identified problems, a vibrating gyroscopic according to an embodiment of the present invention sensor includes a vibrating gyroscopic sensor element including a cantilever vibrator, the cantilever vibrator including a piezoelectric film, a driving electrode, and a pair of detection electrodes on a first surface and a support substrate on which the vibrating gyroscopic sensor element is mounted. The vibrating gyroscopic sensor element is mounted on the support substrate so that the first surface of the cantilever vibrator faces the support substrate, and an area other than the first surface of the cantilever vibrator is defined as a laser processing area where a depression for adjusting the vibration characteristics of the vibrator is to be formed.

According to an embodiment of the present invention, a method of adjusting a vibrating gyroscopic sensor including a vibrating gyroscopic sensor element and a support substrate on which the vibrating gyroscopic sensor element having a cantilever vibrator having a piezoelectric film, a driving electrode, and a pair of detection electrodes on a first surface is mounted includes the steps of mounting the vibrating gyroscopic sensor element on the support substrate so that the first surface of the cantilever vibrator faces the support substrate and adjusting the vibration characteristics of the vibrator by carrying out laser processing on a laser processing area that is an area other than the first surface of the cantilever vibrator.

As described above, according to an embodiment of the present invention, when a vibrating gyroscopic sensor element is mounted on a support substrate so that a first surface of the vibrator included in the vibrating gyroscopic sensor element faces the support substrate, a depression for adjusting the vibration characteristic is formed by carrying out laser processing at a laser processing area on a surface of the vibrator facing the upper surface of the vibrating gyroscopic sensor element. The depression is formed at a position so that the vibration characteristic of an asymmetric vibrator can be adjusted in such a manner that the vibrator vibrates in a predetermined direction.

The laser processing area on the vibrator faces the upper or a side surface of the vibrating gyroscopic sensor element mounted on the support substrate, the vibration characteristic of the vibrator can be easily adjusted by irradiating the laser processing area with a laser beam. Since the vibration characteristic is adjusted after the vibrator is mounted on the support substrate, the vibration characteristic can be prevented from showing a change from before to after mounting and each individual vibrating gyroscopic sensor element can be adjusted within an operational range after mounting by observing the vibration characteristic after mounting.

The laser processing area refers to a surface opposing the first surface where the piezoelectric film and so on are provided or the ridge line area connecting these surfaces. Accordingly, since the laser processing area is an area a distance apart from the first surface, changes in the piezoelectric quality and/or the polarization state due to heat generated during laser processing can be prevented as must as possible.

To obtain a angular rate sensor having stable qualities, it is necessary to match the frequency difference of the vertical and horizontal resonance frequencies due to a variance in the shape of the vibrator with the amplitude and phase of the waveform of the left and right signals while resonating. According to an embodiment of the present invention, the frequency difference and the waveform difference of the detection signals are monitored before adjustment so as to determine the section to be processed.

More specifically, the operating frequency read from the detection signal generated when the vibrator is vibrating in a vertical resonance state is defined as a vertical resonance frequency. The difference of the pair of detection signals is defined as a differential signal. Next, the operating frequency read from the detection signal generated when the vibrator is vibrating in a horizontal resonance state is defined as a horizontal resonance frequency. The difference between the horizontal resonance frequency and the vertical resonance frequency is defined as the level of detuning. The above-described process is repeated until the level of detuning and the differential signal reach target values.

The effect of the adjustment depends on the position of the section to be laser-processed. Since the amount of change in the frequency difference and the detection signal balance becomes smaller as the section to be laser-processed moves from the base of the vibrator to the tip, course adjustment can be carried out by processing the base and fine adjustment can be carried out by processing the tip. By controlling the position of the section to be laser-processed and the depth of the laser processing, the strength and durability of the vibrator against dropping impact can be maintained.

As described above, for a vibrator of a vibrating gyroscopic sensor element mounted on a support substrate according to an embodiment of the present invention, a depression for adjusting the vibration characteristics is formed in an area excepting the surface of the vibrator on which the piezoelectric layer and so on are provided. Therefore, it is possible to adjust the vibration characteristics of the vibrator after the vibrator is mounted and change in the quality of the piezoelectric film during adjustment can be prevented.

Since the vibration characteristics are adjusted by carrying out laser processing on a surface of the vibrator on which the piezoelectric film and so on are disposed, the small vibrating gyroscopic sensor element produced through a semiconductor process can maintain stable detection ability and high durability against external impacts while fine and accurate adjustment can be easily carried out.

BRIEF DESCRIPTION OF THE DRAWINGS

FIG. 5 illustrates a block diagram of a drive detector circuit of the vibrating gyroscopic sensor element illustrated in FIG. 1;

FIGS. 7A and 7B illustrate schematic views of the production process of the vibrating gyroscopic sensor element illustrated in FIG. 1, wherein FIG. 7A is a plan view of a single crystal silicon substrate and FIG. 7B is a cross-sectional view taken along line VIIB-VIIB in FIG. 7A;

FIGS. 8A and 8B illustrate schematic views of the substrate shown in FIGS. 7A and 7B with the thermally-oxidized film removed, wherein FIG. 8A is a plan view and FIG. 8B is a cross-sectional view taken along line XIIIB-XIIIBs in FIG. 8A;

FIGS. 9A and 9B illustrate schematic views of the substrate shown in FIGS. 7A and 7B with the thermally-oxidized film removed, wherein FIG. 9A is a plan view and FIG. 9B is a cross-sectional view taken along line IXB-IXB in FIG. 9A;

FIGS. 10A and 10B illustrate schematic views of the substrate shown in FIGS. 7A and 7B with anisotropic etching carried out, wherein FIG. 10A is a plan view and FIG. 10B is a cross-sectional view taken along line XB-XB in FIG. 10A;

FIGS. 12A and 12B illustrate enlarged views of the substrate shown in FIG. 10B, where a lower electrode film, a piezoelectric film, and an upper electrode film are provided, wherein FIG. 12A is a plan view and FIG. 12B is a cross-sectional view taken along line XIIB-XIIB in FIG. 12A;

FIGS. 13A and 13B illustrate enlarged views of the substrate shown in FIG. 10B, where a detection electrode is provided, wherein FIG. 13A is a plan view and FIG. 13B is a cross-sectional view taken along line XIIIB-XIIIB in FIG. 13A;

FIGS. 14A and 14B illustrate enlarged views of the substrate shown in FIG. 10B, where a piezoelectric film is provided, wherein FIG. 14A is a plan view and FIG. 14B is a cross-sectional view taken along line XIVB-XIVB in FIG. 14A;

FIGS. 15A and 15B illustrate enlarged views of the substrate shown in FIG. 10B, where a lower electrode film is provided, wherein FIG. 15A is a plan view and FIG. 15B is a cross-sectional view taken along line XVB-XVB in FIG. 15A;

FIGS. 35A and 35B illustrate a polarizing process for stabilizing the piezoelectric characteristic, wherein FIG. 35A illustrates a plan view of the entire substrate and FIG. 35B is an enlarged plan view of the substrate;

FIGS. 36A and 36B illustrate the substrate with the unwanted Cu leads removed after the polarizing process, wherein FIG. 36A illustrates a plan view of the entire substrate and FIG. 36B is an enlarged plan view of the substrate;

FIGS. 37A and 37B illustrate Au bumps provided for flit-chip, wherein FIG. 37A illustrates a plan view of the entire substrate and FIG. 37B is an enlarged plan view of the substrate;

FIGS. 38A and 38B illustrate dividing lines provided for separating each vibrating gyroscopic sensor element that function as a piezoelectric thin film sensor, wherein FIG. 38A illustrates a plan view of the entire substrate and FIG. 38B is an enlarged plan view of the substrate;

FIGS. 42A and 42B illustrate the relationship between the symmetry of a vibrator and the vibration mode, wherein FIG. 42A illustrates the vibration mode of a vibrator having a symmetric shape and FIG. 42B illustrates the vibration mode of a vibrator having an asymmetric shape;

FIG. 44 illustrates a schematic plan view of example laser processing areas on which laser processing is carried out;

FIGS. 62A and 62B illustrate the vibration characteristics of a cantilever vibrator according to a second embodiment of the present invention, wherein FIG. 62A illustrates a front view of the vibrator and FIG. 62B illustrates the frequency characteristics;

FIGS. 63A, 63B, and 63C illustrate the adjustment process of the vibrator shown in FIGS. 62A and 62B, wherein FIG. 63A illustrates a front view of the vibrator, FIG. 63B illustrates the frequency characteristics, and FIG. 63C illustrates the frequency characteristics to show problems in the adjusted vibrator;

FIGS. 65A and 65B illustrate the operation of a cantilever vibrator according to the second embodiment of the present invention, wherein FIG. 65A illustrates a front view of the vibrator and FIG. 65B illustrates the frequency characteristic;

FIG. 66 illustrates the relationship between a laser processing area, the resonance frequency, and the level of detuning according to a third embodiment of the present invention;

FIGS. 68A and 68B illustrate the relationship between the symmetry of a cantilever vibrator and the vibration mode, wherein FIG. 68A illustrates the vibration mode of a cantilever vibrator having a symmetric shape and FIG. 68B illustrates the vibration mode of a cantilever vibrator having an asymmetric shape;

FIGS. 69A and 69B illustrate the process of forming a penetration part that defines the external shape of a cantilever vibrator, wherein FIG. 69A illustrates a cross-sectional view of the main parts viewed from the longitudinal direction of the vibrator and FIG. 69B lustrates a cross-sectional view of the main parts of the penetration part viewed from a direction orthogonal to the longitudinal direction of the cantilever vibrator;

FIGS. 70A and 70B illustrate the operation of a cantilever vibrator according to a fourth embodiment of the present invention, wherein FIG. 70A illustrates the vibration mode of a symmetric vibrator and FIG. 70B illustrates the vibration mode of an asymmetric vibrator;

FIGS. 72A and 72B illustrate the relationship between the symmetry of the shape of the base of a cantilever vibrator and the vibration mode, wherein FIG. 72A illustrates the vibration mode of a cantilever vibrator having a symmetric base and FIG. 72B illustrates the vibration mode of a cantilever vibrator having an asymmetric base;

DESCRIPTION OF THE PREFERRED EMBODIMENTS

Embodiments of the present invention will be described below with reference to the drawings. The embodiments described below do not limit the scope of the present invention, and various modifications of the embodiments may be provided within the scope of the present invention.

First Embodiment

Figure 1A:
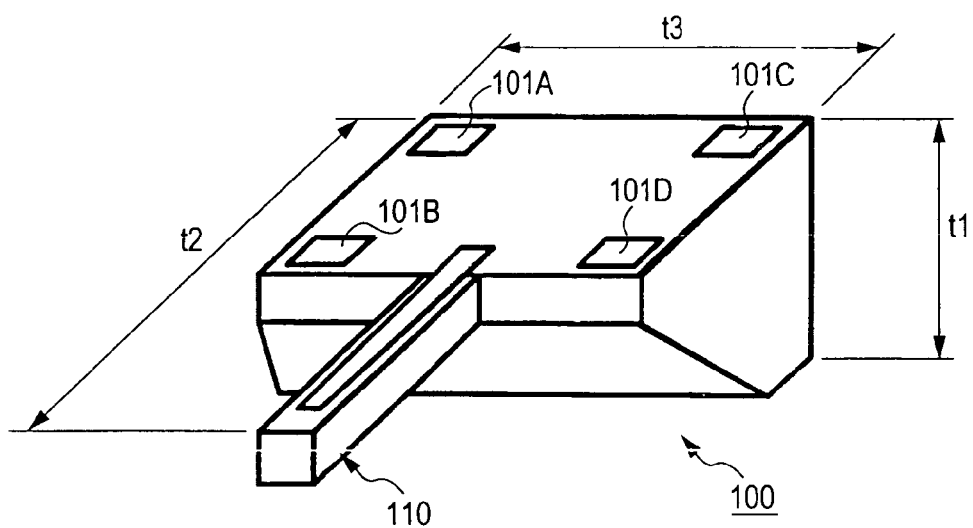
FIG. 1 illustrates a schematic perspective view of a vibrating gyroscopic sensor element according to a first embodiment of the present invention.
Figure 1B:
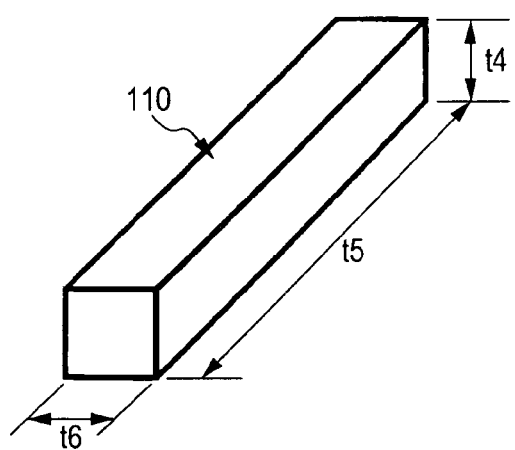

FIGS. 1A and 1B illustrate a vibrating gyroscopic sensor element 100 according to an embodiment of the present invention. FIG. 1A is an external perspective view illustrating the entire vibrating gyroscopic sensor element 100. FIG. 1B is an enlarged perspective view of a vibrator 110 of the vibrating gyroscopic sensor element 100. As shown in FIGS. 1A and 1B, the vibrating gyroscopic sensor element 100, cut out from a silicon single-crystal substrate, includes the cantilever vibrator 110 that is provided as a cantilever. This cantilever vibrator 110 is shaped as a prism, and, thus, a cross-section of the cantilever vibrator 110 orthogonal to the longitudinal direction of the cantilever vibrator 110 is square.

The vibrating gyroscopic sensor element 100 has a thickness t1 of 300 μm, a length t2 of 3 mm, and a width t3 of 1 mm. The cantilever vibrator 110 that actually vibrates has a thickness t4 of 100 μm, a length t5 of decorative panel 2.5 mm, and a width t6 of 100 μm. The resonance frequency of the vibrating cantilever vibrator 110 is about 40 kHz. Here, these dimensions are only provided as examples and may be set to any other value depending on the frequency to be used and the desired size of the vibrating gyroscopic sensor element 100.

Figure 2:
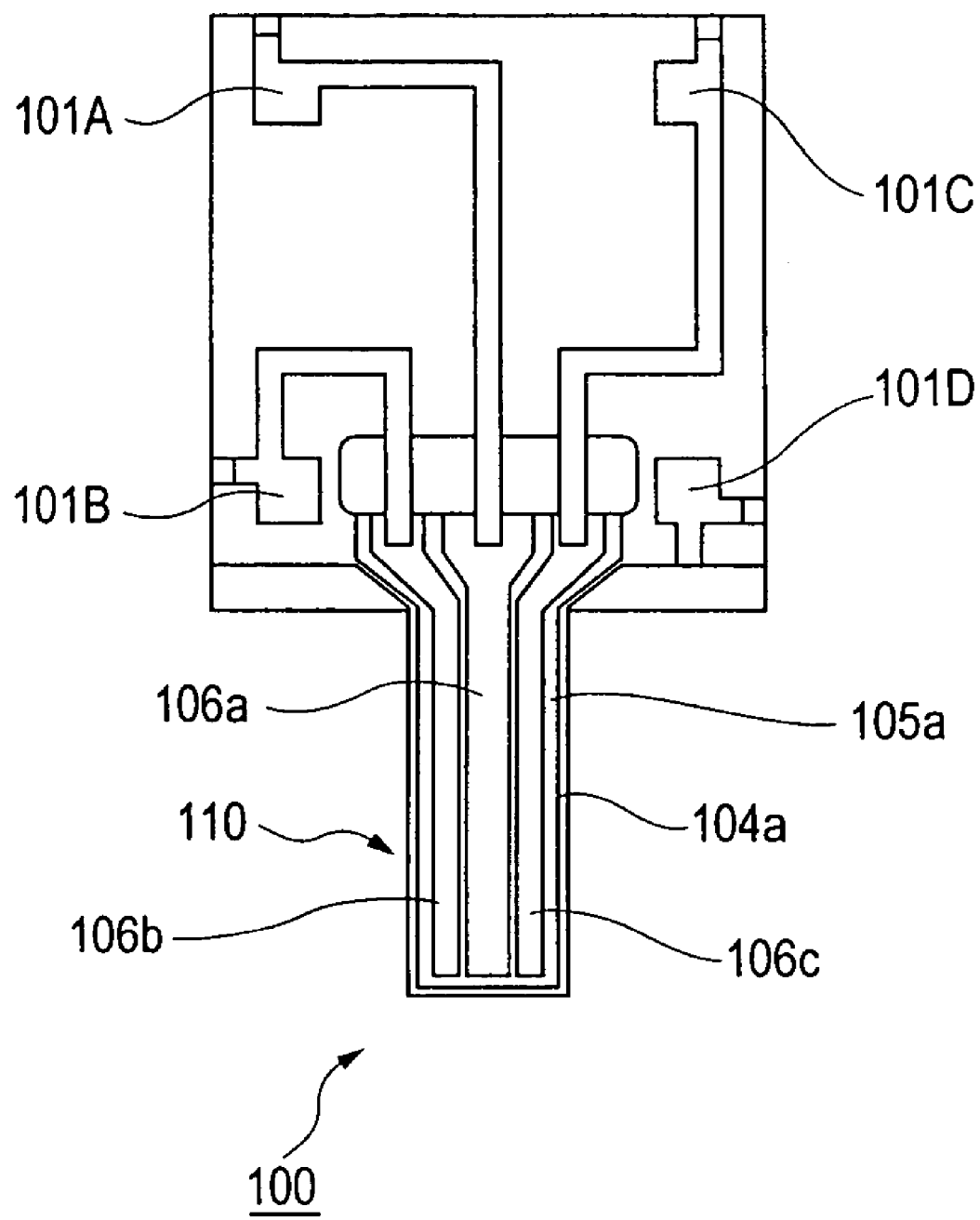
FIG. 2 illustrates a schematic bottom view of the vibrating gyroscopic sensor element illustrated in FIG. 1.
Figure 3:
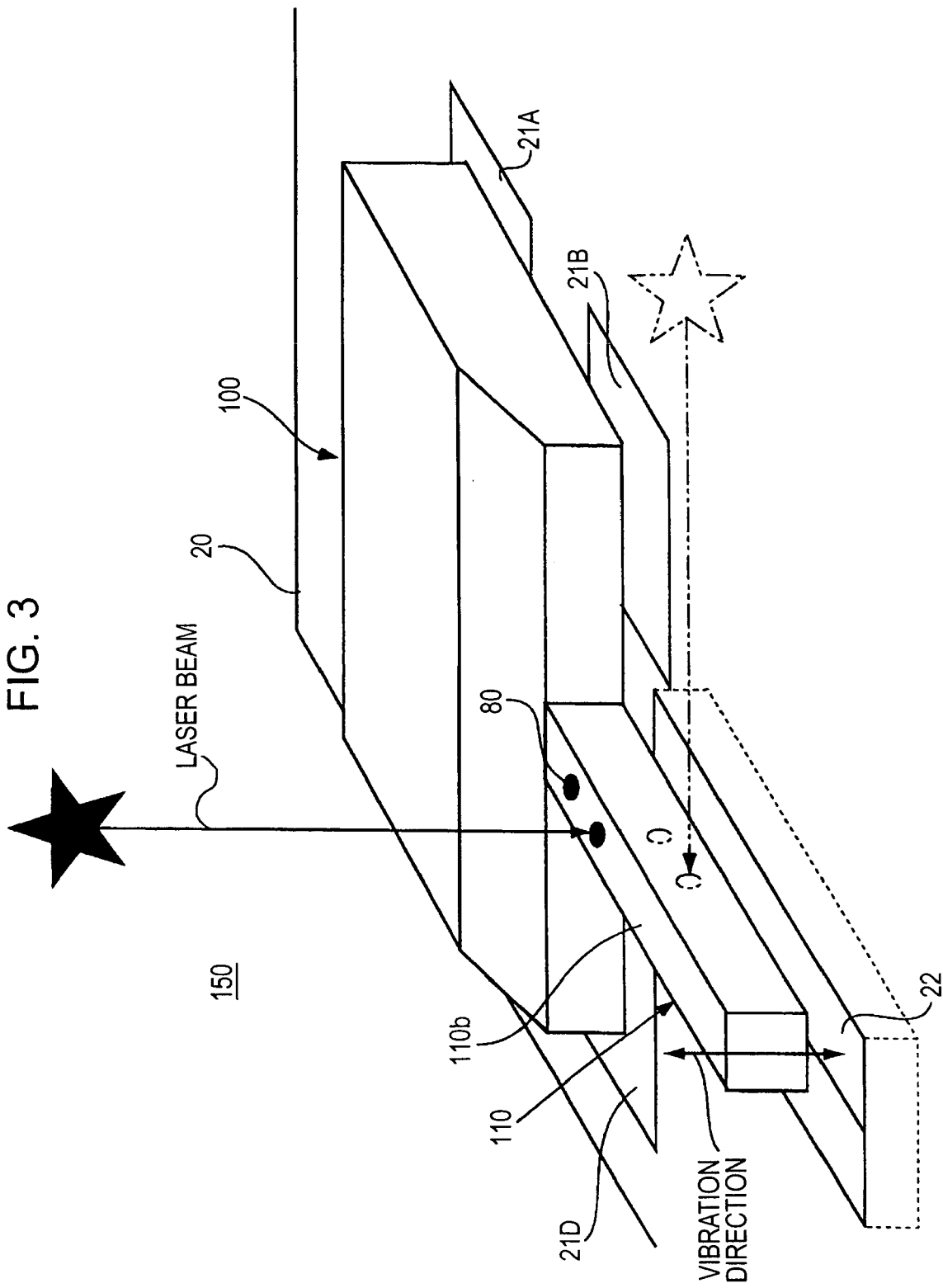
FIG. 3 illustrates a schematic perspective view of the vibrating gyroscopic sensor element illustrated in FIG. 1 mounted on a support substrate.

The vibrating gyroscopic sensor element 100 is mounted on a support substrate 20 (refer to FIG. 3). The mounting surface of the vibrating gyroscopic sensor element 100 that is the surface opposing the support substrate 20 is illustrated in FIG. 2 (bottom surface).

On this surface of the cantilever vibrator 110, a reference electrode 104a and a piezoelectric body 105a are stacked in order. On the piezoelectric body 105a, a driving electrode 106a and a pair of detection electrodes 106b and 106c are disposed parallel to each other in the longitudinal direction of the cantilever vibrator 110 so that the driving electrode 106a and the detection electrodes 106b and 106c do not come into contact with each other. Wiring connection terminals 101A, 101B, 101C, and 101D are provided for the driving electrode 106a, the detection electrode 106b, the detection electrode 106c, and the reference electrode 104a, respectively.

The piezoelectric body 105a is a piezoelectric film composed of, for example, piezoelectric ceramic, such as lead zirconium titanate (PZT), or piezoelectric single crystal, such as quartz or Lanthanum tantalum oxide ($LaTaO_3$). The reference electrode 104a, the driving electrode 106a, and the detection electrodes 106b and 106c are constructed of metal electrodes or conductive oxide electrodes.

FIG. 3 illustrates a perspective view of the main components of an angular rate sensor (vibrating gyroscopic sensor) 150 configured by mounting the vibrating gyroscopic sensor element 100 on the support substrate 20. The vibrating gyroscopic sensor element 100 is mounted on the support substrate 20 with the above-described mounting surface, shown in FIG. 2, facing down toward the support substrate 20. According to this embodiment, metal bumps are provided on the wiring connection terminals 101A, 101B, 101C, and 101D of the vibrating gyroscopic sensor element 100. The wiring connection terminals 101A, 101B, 101C, and 101D are connected to lands 21A, 21B, 21C, and 21D, respectively, on the support substrate 20 via the metal bumps.

The front surface (first surface) of the cantilever vibrator 110 on which the reference electrode 104a, the piezoelectric body 105a, the driving electrode 106a, and the detection electrodes 106b and 106c are stacked faces the support substrate 20. Therefore, the surface of the cantilever vibrator 110 opposite from the front surface, i.e., a back surface 110b of the cantilever vibrator 110 on which a piezoelectric body and various electrode films are not disposed, is faces upward, as shown in FIG. 3. On the support substrate 20 opposite to the cantilever vibrator 110, a depression (flank) 22 having a predetermined size and depth is formed to allow desirable vibration of the cantilever vibrator 110 in the direction orthogonal to the support substrate 20.

As described below, the external shape of the cantilever vibrator 110 is defined by carrying out reflective ion etching (RIE) on a silicon substrate. At this time, depending on the etching conditions and the position of the wafer, the shape of the cantilever vibrator 110 may not be symmetric with respect to the vibration direction. If the cantilever vibrator 110 is not symmetric, the barycentric position of the cantilever vibrator 110 will be biased either to the right side or to the left side of the cantilever vibrator 110 and the mass balance of the cantilever vibrator 110 will be off. As a result, the cantilever vibrator 110 will not vibrate in the direction perpendicular to the support substrate 20 and, instead, will vibrate in a direction tilted toward the side with the smaller mass. If the vibration direction of the cantilever vibrator 110 is tilted, there will be a large difference between the detection signals output from the left and right detection electrodes 106b and 106c. As a result, it will become impossible to carry out accurate angular rate detection.

Therefore, according to this embodiment, after mounting the vibrating gyroscopic sensor element 100 on the support substrate 20, the cantilever vibrator 110 of the vibrating gyroscopic sensor element 100 is adjusted to a vertical vibration mode, as shown in FIG. 3, by employing methods described below to irradiate a rear surface 110b of the cantilever vibrator 110 with a laser beam to form depressions 80. In this way, the mass balance of the cantilever vibrator 110 can be adjusted to achieve an optimal vibration mode. The same advantages are gained by irradiating a side surface adjacent to the front surface (rear surface 110b) of the cantilever vibrator 110 with a laser beam to form the above-described depressions 80.

Since the rear surface 110b of the cantilever vibrator 110 is exposed at the upper side of the vibrating gyroscopic sensor element 100 mounted on the support substrate 20, the vibration characteristics of the cantilever vibrator 110 can be easily adjusted by carrying out laser processing. Moreover, since the vibration characteristics are adjusted after the vibrating gyroscopic sensor element 100 is mounted on the support substrate 20, the vibration characteristics of before and after mounting the vibrating gyroscopic sensor element 100 can be prevented from varying. In addition, the vibration characteristics can be adjusted within the range of use of each individual vibrating gyroscopic sensor element 100 after mounting the vibrating gyroscopic sensor element 100.

Since the laser processing region for vibration adjustment is provided on a surface disposed apart from the front surface of the vibrating gyroscopic sensor element 100 on which the piezoelectric body 105a and so on are provided, effects caused by heat generated during laser processing, such as a change in the quality of the piezoelectric film and/or a change in the polarization state, can be prevented as much as possible. Since the front surface of the cantilever vibrator 110 is flush with the bottom surface of the vibrating gyroscopic sensor element 100 and faces the support substrate 20, the cantilever vibrator 110 is less affected by disturbance, such as heat and light from outside, the detection ability of the vibrating gyroscopic sensor element 100 can be stably maintained.

Figure 4A:
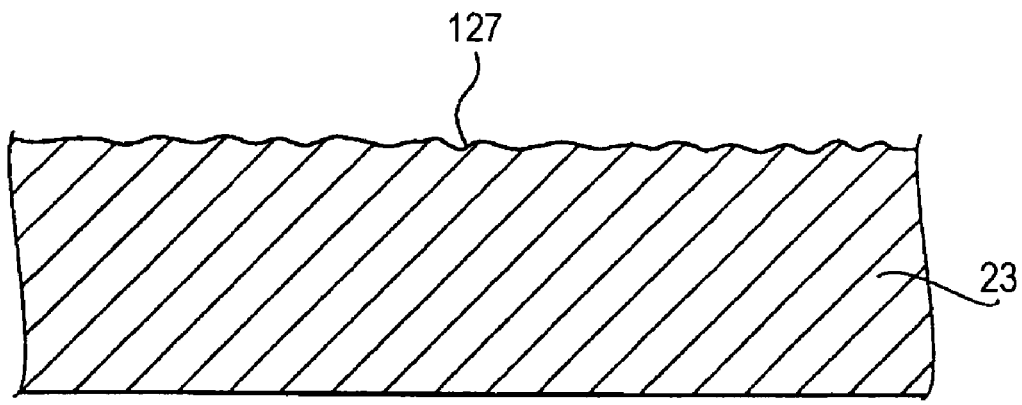
FIG. 4 illustrates a schematic view of the chamfering and melted face the vibrating gyroscopic sensor element illustrated in FIG. 1.

Extremely fine bumps and micro-cracks exist on the surface of the silicon substrate. As described above, the external shape of the cantilever vibrator 110 is defined by carrying out reactive ion etching (RIE) on the silicon substrate. At this time, minute streaks are formed due to the flow of plasma on the rear surface 110b of the cantilever vibrator 110 and the ridge line areas connecting the rear surface 110b and the side surfaces of the cantilever vibrator 110. Such minute bumps and cracks will be collectively referred to as "minute bumps 127," as shown in FIG. 4A. In FIG. 4A, the minute bumps 127 are exaggerated.

When a great impact is applied to the vibrating gyroscopic sensor element 100, for example, when vibrated, stress concentrates at the minute bumps 127 existing on the rear surface 110b and the ridge line areas of the cantilever vibrator 110. As a result, damage and cracks may be occur on the cantilever vibrator 110.

Figure 4B:
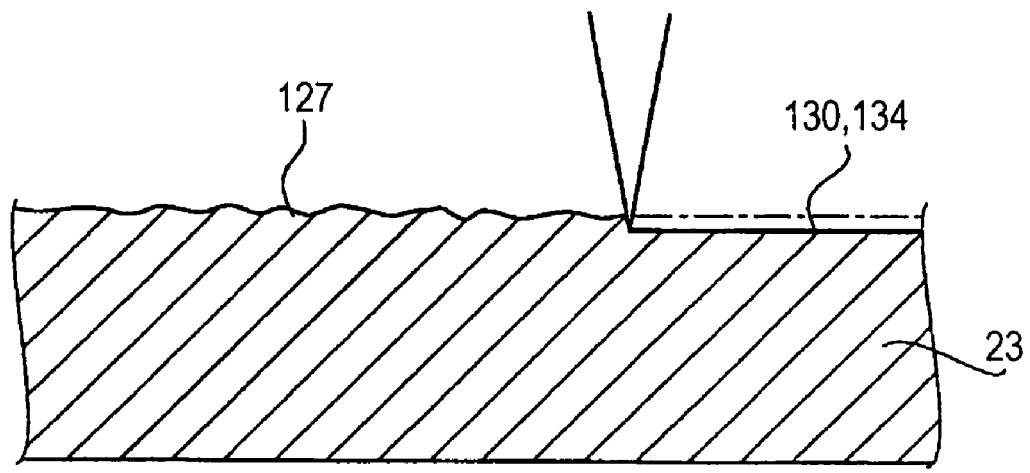

According to this embodiment, the ridge line areas, the rear surface 110b, and the side surfaces of the cantilever vibrator 110 are irradiated with a laser beam to melt the surface of the silicon substrate and obtain a chamfered portion 130 or a melted surface 134, as shown in FIG. 4B. In this way, the minute bumps 127 are removed. Accordingly, even when an external load is applied to the cantilever vibrator 110, stress concentration at the minute bumps 127 can be prevented to increase the mechanical strength of the cantilever vibrator 110.

The formation of the chamfered portion 130 and the melted surface 134 is carried out before adjusting the vibration characteristic of the cantilever vibrator 110. The same laser apparatus used for the adjusting processing is also used for this formation process. By using the same laser apparatus, the chamfered portion 130 and the melted surface 134 can be easily formed without carrying out machine processing, such as precision polishing. However, the laser apparatus used for the formation of the chamfered portion 130 and the melted surface 134 is not limited to the same laser apparatus used for the adjusting process, and a different laser apparatus may be used.

The vibrating gyroscopic sensor element 100 having the above-described structure is connected to an integrated circuit (IC) 40, shown in FIG. 5, when operated and functions as an angular rate sensor (vibrating gyroscopic sensor) configured to detect the Coriolis force generated in accordance with angular speed. The IC 40 includes IC devices and other electronic components mounted together with the vibrating gyroscopic sensor element 100 on the support substrate 20 (FIG. 3).

The IC 40 includes an adder circuit 41, an amplifier circuit 42, a phase-shift circuit 43, an auto gain controller 44, a differential amplifier circuit 45, a synchronous detection circuit 46, and a smoothing circuit 47.

The pair of detection electrodes 106b and 106c of the vibrating gyroscopic sensor element 100 are connected to the adder circuit 41 and the differential amplifier circuit 45. The driving electrode 106a of the vibrating gyroscopic sensor element 100 is connected to the output terminal of the auto gain controller 44.

This angular rate sensor constitutes a phase-shift oscillator circuit including the adder circuit 41, the amplifier circuit 42, the phase-shift circuit 43, the auto gain controller 44, and the vibrating gyroscopic sensor element 100. This phase-shift self-excited circuit applies a voltage between the reference electrode 104a and the driving electrode 106a of the vibrating gyroscopic sensor element 100 so as to self-excite the vibration of the cantilever vibrator 110. The vibration direction of the cantilever vibrator 110 is the thickness direction of the cantilever vibrator 110.

In this angular rate sensor, the pair of detection electrodes 106b and 106c is connected to the adder circuit 41 and the differential amplifier circuit 45, the output terminal of the differential amplifier circuit 45 is connected to the synchronous detection circuit 46, and the synchronous detection circuit 46 is connected to the smoothing circuit 47. These circuits, together with the piezoelectric body 105a, function as a detection unit configured to detect the angular speed of the cantilever vibrator 110.

More specifically, if angular speed is generated around the longitudinal direction of the cantilever vibrator 110 while the cantilever vibrator 110 of the vibrating gyroscopic sensor element 100 is vibrated due to self-excitation by the above-described phase-shift oscillator circuit, the vibration direction of the cantilever vibrator 110 changes in accordance with the Coriolis force. In this case, one of the outputs of the detection electrodes 106b and 106c increases, and the other output decreases. The amount of change of at least one of the outputs is detected and measured by the IC 40 to determine the input angular speed around the longitudinal direction of the cantilever vibrator 110.

Figure 6:
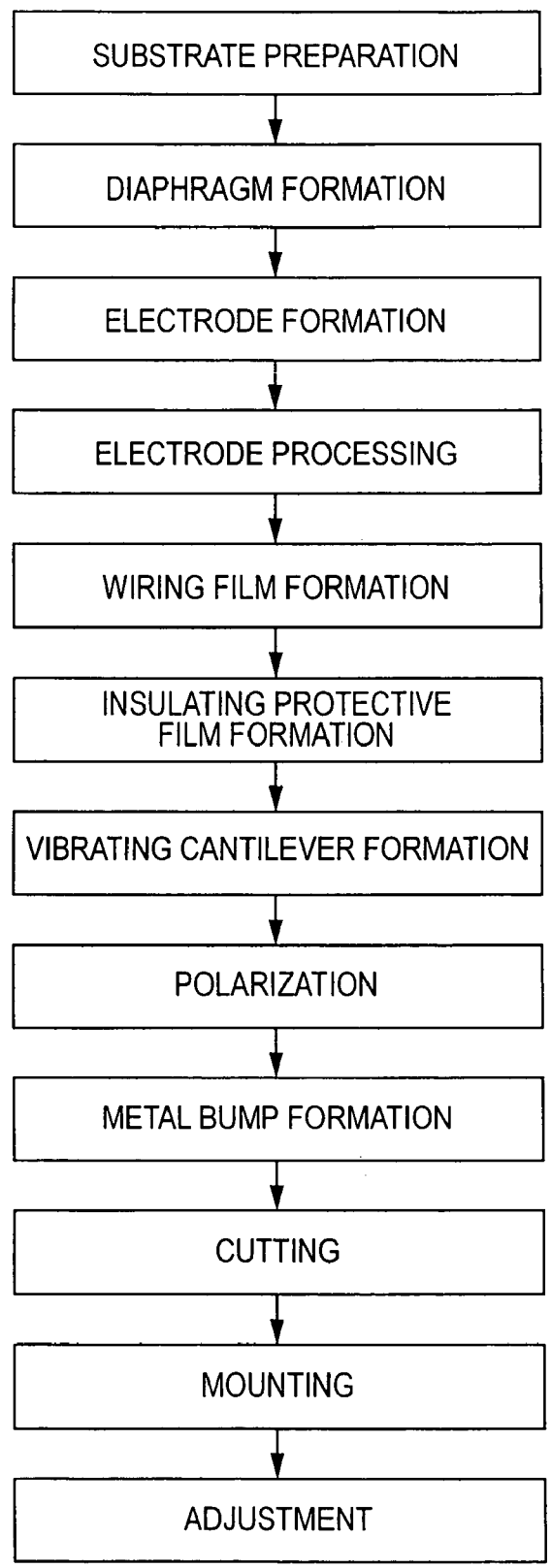
FIG. 6 illustrates a flow chart of the main steps in a process of producing the vibrating gyroscopic sensor element illustrated in FIG. 1.

Next, an example production process of the vibrating gyroscopic sensor element 100 according to this embodiment having the above-described structure will be described. FIG. 6 illustrates the main steps in a production process of the vibrating gyroscopic sensor element 100.

[Substrate Preparation]

Figure 7A:
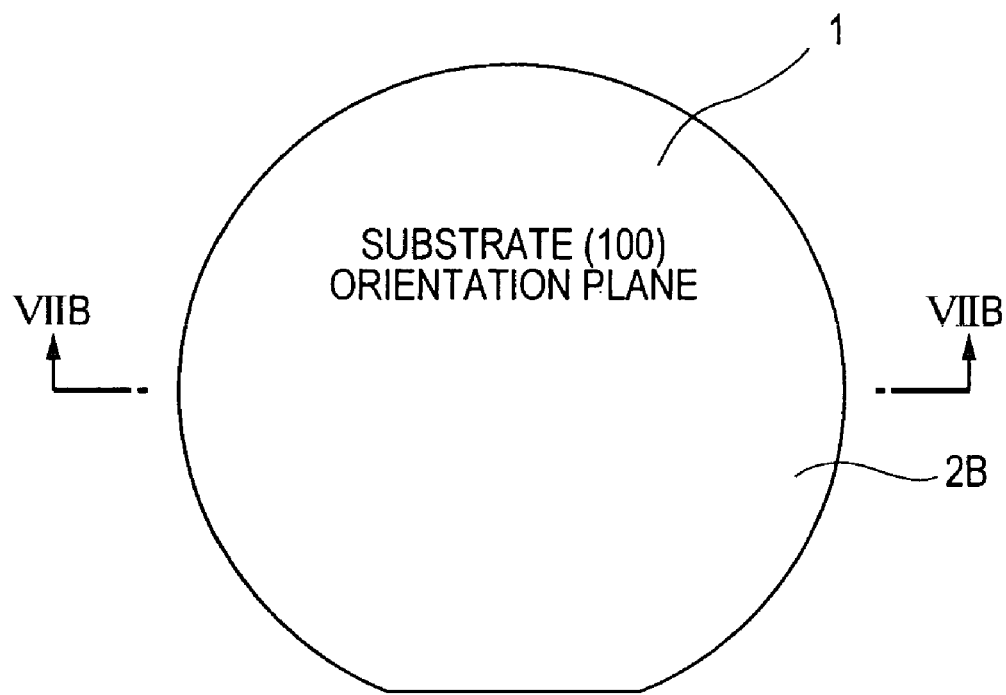
Figure 7B:
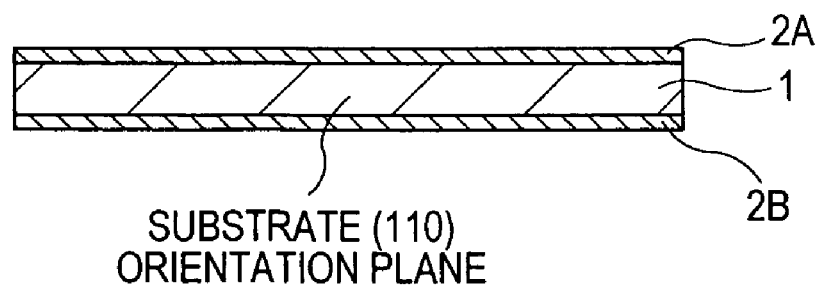

First, a silicon (Si) substrate 1, as shown in FIGS. 7A and 7B, is obtained. The size of the Si substrate 1 may be any size depending on the thin film processing line to be used. The Si substrate 1 according to this example was a wafer having a diameter of 4 inches. The thickness of the Si substrate 1 is determined on the basis of operability and cost and is greater than the thickness of the cantilever vibrator 110. The thickness of the Si substrate 1 according to this example was 300 μm.

Thermally-oxidized films ($SiO_2$ films) 2A and 2B that function as protective masks during anisotropic wet etching are disposed on both sides of the Si substrate 1. The thickness of the thermally-oxidized films 2A and 2B is not limited. The thickness of the thermally-oxidized films 2A and 2B according to this example was about 0.3 μm. The Si substrate 1 according to this example was an N-type substrate. However, the type of the substrate is not limited thereto. The substrate is cut out so that the flat surface of the Si substrate 1, illustrated in FIG. 7A, is a (100) orientation plane and the cross-section of the Si substrate 1, illustrated in FIG. 7B, is a (110) orientation plane.

[Diaphragm Formation]

Figure 8A:
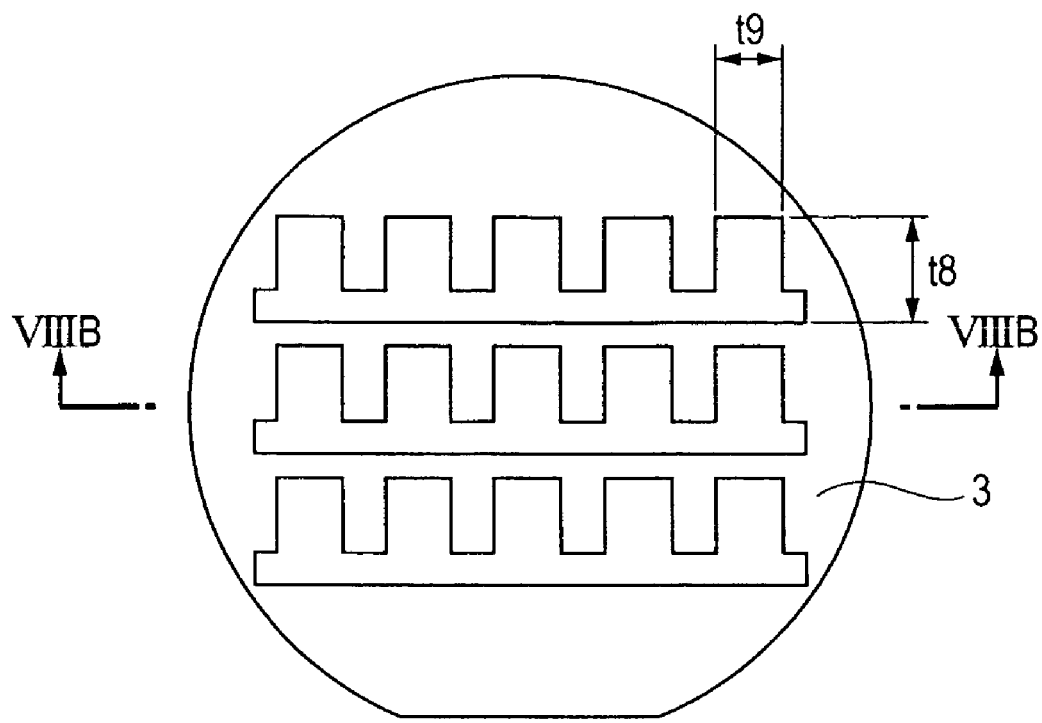
Figure 8B:
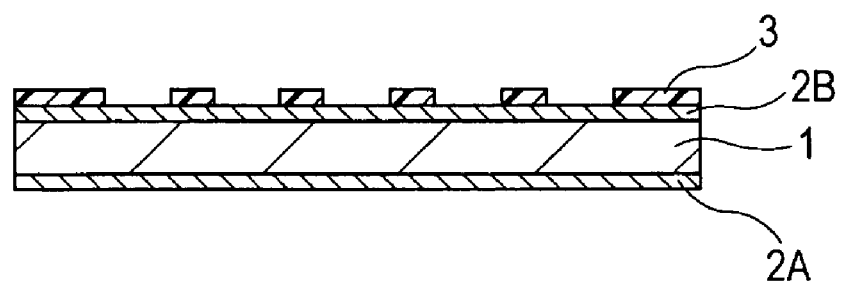

Next, as shown in FIGS. 8A and 8B, a resist pattern film 3 having openings corresponding to the areas to be removed from the thermally-oxidized film 2B disposed on the back surface of the Si substrate 1 is provided. As a method of forming the resist pattern film 3, a photolithographic technology used in a standard semiconductor thin film production process is employed. The resist material according to this example was OFPR-8600 manufactured by Tokyo Ohka Kogyo Co., Ltd. However, the type of resist material is not limited thereto. The photolithographic process including the steps of applying resist, pre-baking, exposing, and developing is the same as a standard thin film process. Here, details of the photolithographic process are not described. Photolithographic technology is also employed in other processes described below. In such cases, too, the photolithographic process will not be described in detail unless special photolithographic technology is employed to the photolithographic process.

A vibrating gyroscopic sensor element is formed at each opening illustrated in FIG. 8A. The shape of the opening is determined on the basis of the final shape of the cantilever, the thickness of the Si substrate 1, and the etching width t7 (shown in FIGS. 30 and 31) set to form the cantilever (cantilever vibrator 110). The etching width t7 will be described below. The etching width t7 according to this example was 200 μm.

Figure 11:
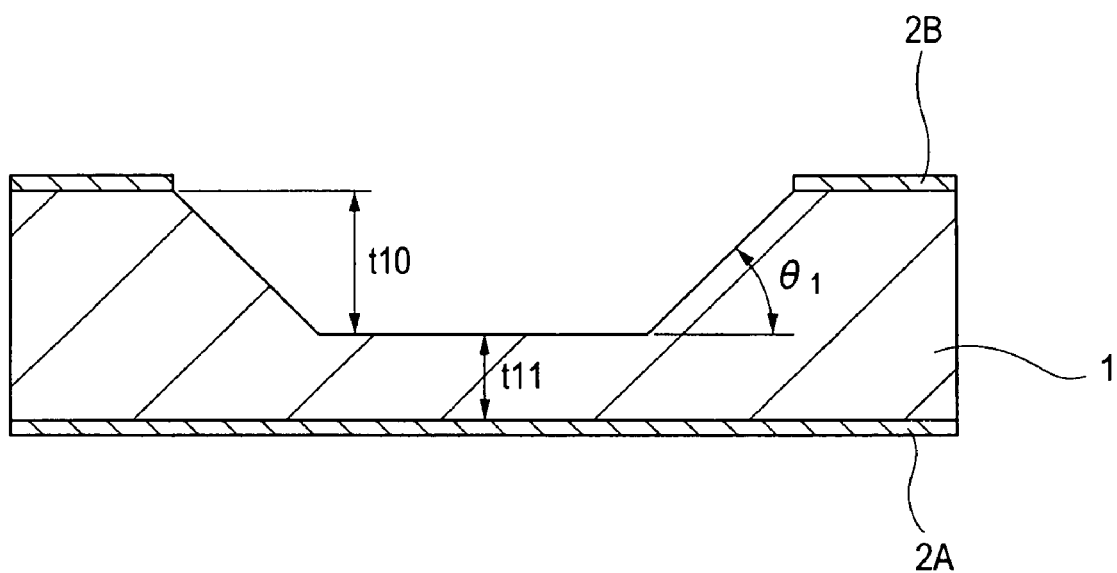
FIG. 11 illustrates an enlarged view of an area W in the substrate shown in FIG. 10B.

The required width (diaphragm width t9) of the opening equals [vibrating cantilever width t6]+[etching width t7]×2 (for left and right margins). If the thickness of the Si substrate 1 is 300 μm, the thickness of the vibrating cantilever is 100 μm, and the Si substrate 1 having a thickness of 300 μm is reduced to 100 μm to obtain the thickness of the vibrating cantilever by employing a wet etching method, the diaphragm depth t10 will be 200 μm, as shown in FIG. 11. At this time, the Si substrate 1 will be etched at an angle of θ1=55°. Therefore, it is necessary to compensate for this angle by adding a width of t10×1/tan 55°=140 μm on the left and right edges in the width direction. As a result, in this example, [diaphragm width t9]=t6+t7×2+140×2=100+200×2+140×2=780 μm. Similarly, [diaphragm length t8]=[vibrating cantilever length t5]+[etching width t7]+140×2=2, 500+200+140×2=2, 980 μm.

Figure 9A:
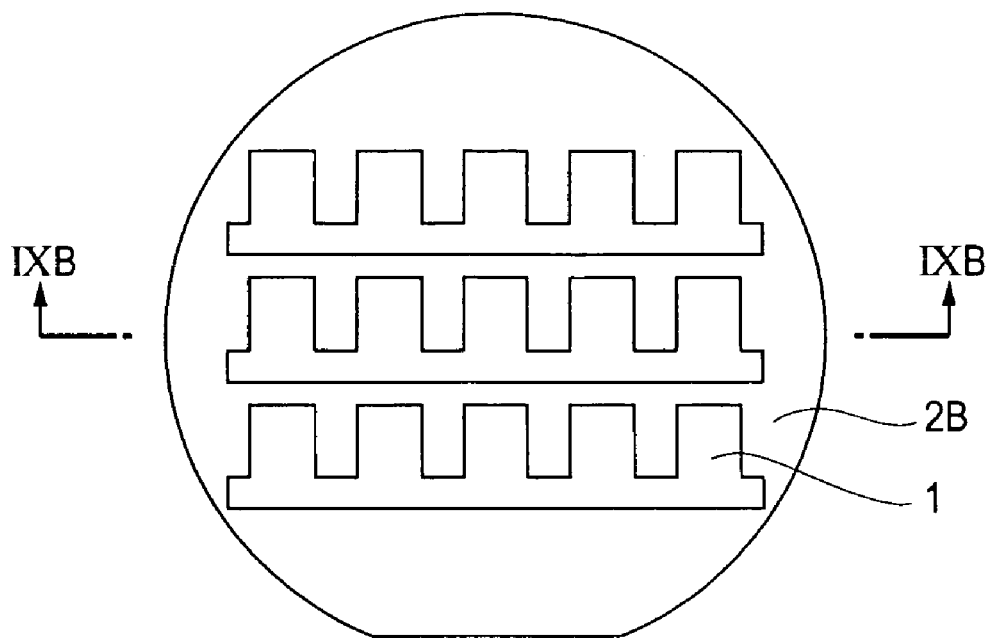
Figure 9B:
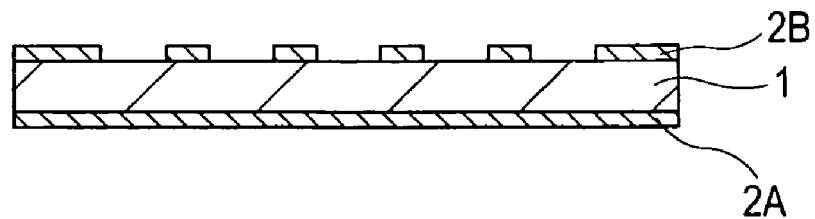

Next, as shown in FIGS. 9A and 9B, areas of the thermally-oxidized film 2B corresponding to the openings are removed. The method of removal may by either physical etching, such as ion etching, or wet etching. However, when considering the smoothness of the surface of the Si substrate 1, it is desirable to employ wet etching which only removes the thermally-oxidized film 2B. In this example, the chemical solution used for wet etching was ammonium fluoride. When wet etching is carried out for a long time, side etching, i.e., progression of etching at the side surfaces of an opening, becomes greatly noticeable. Thus, it is necessary to terminate the etching process at the moment an area of the thermally-oxidized film 2B corresponding to the opening is removed.

Figure 10A:
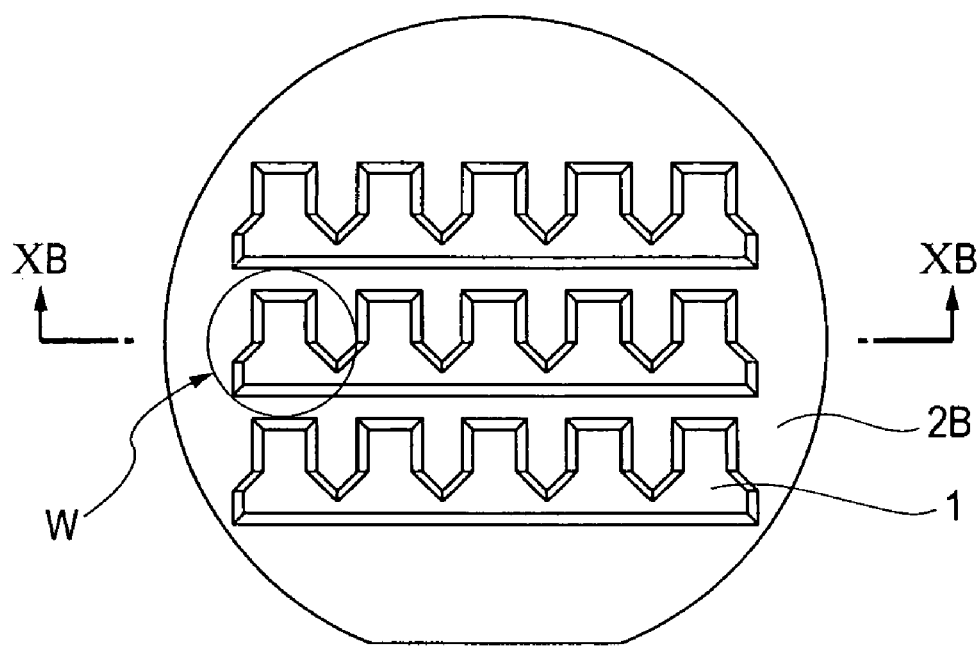
Figure 10B:
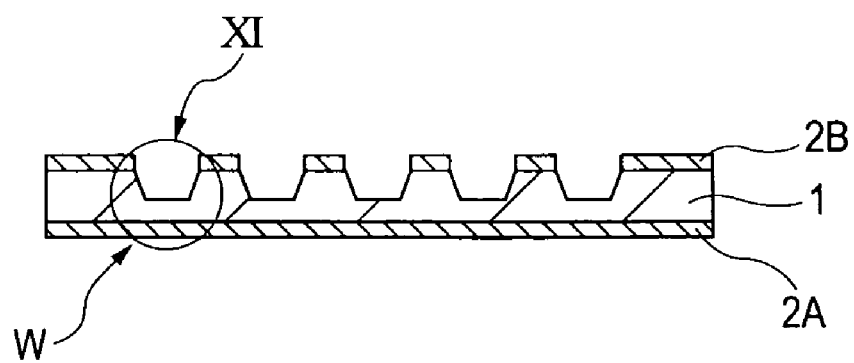

Next, as shown in FIGS. 10A, 10B, and 11, wet etching is carried out on the Si substrate 1 exposed from the openings to reduce the thickness of the Si substrate 1 at the openings to a predetermined vibrating cantilever thickness t4. In this example, a tetra-methyl ammonium (TMAH) 20% solution was used for etching the Si substrate 1. The temperature of the solution was maintained at 80° C., and immersion etching was carried out.

FIG. 11 illustrates an enlarged view of an area W shown in FIG. 10B. Etching was carried out for six hours to etch 200 µm of the Si substrate 1, i.e., reduce the diaphragm depth t10 to 200 µm, under the above-described conditions. As a result of carrying out etching, the sides of the openings in the Si substrate 1 were formed to have a wet etching angle θ1(=55°), as shown in FIG. 11. As a chemical solution for wet etching, a potassium hydroxide (KOH) solution or an ethylenediamine-pyrocatechol-water (EDP) solution may be used instead of TMAH. In this example, TMAH was used since the etching selectivity to the thermally-oxidized films 2A and 2B is greater.

Wet etching was employed in this example so as to reduce the thickness of the Si substrate 1 to correspond to the thickness of the vibrating cantilever 110. However, the method of reducing the thickness of the Si substrate 1 is not limited thereto.

A diaphragm is formed inside each of the openings by carrying out the above-described method. The final diaphragm thickness t11 obtained by carrying out wet etching equals the vibrating cantilever thickness t4.

In the following drawings, one of the elements included in the area W shown in FIGS. 10A and 10B is enlarged. For simplicity, the dimensions of the enlarged element may differ from the actual dimensions. Hereinafter, the element will be described with the opening of the diaphragm and the thermally-oxidized film 2B, provided as described above, facing downward, as shown in FIGS. 12A and 12B.

[Electrode Film Formation]

Figure 12A:
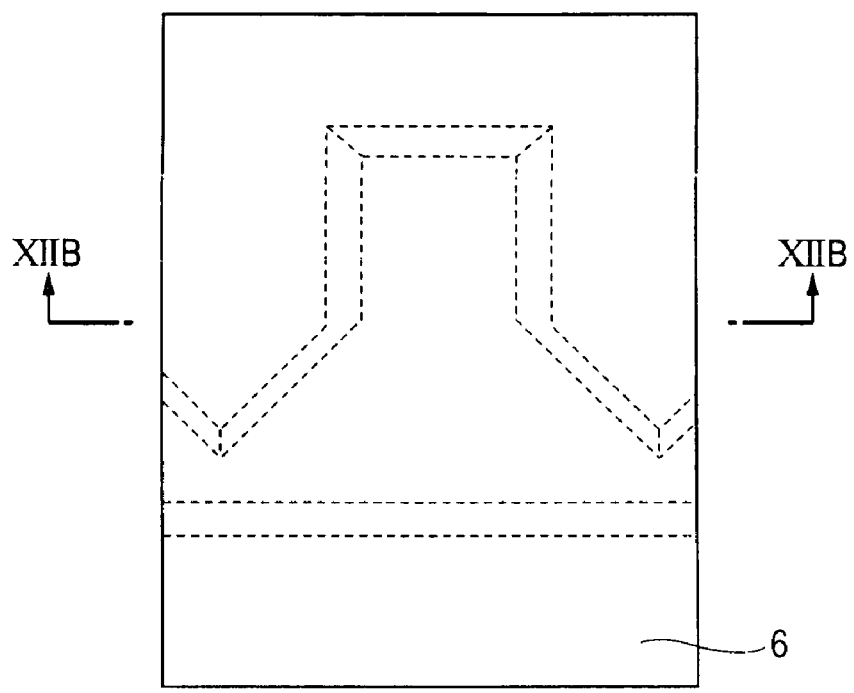
Figure 12B:
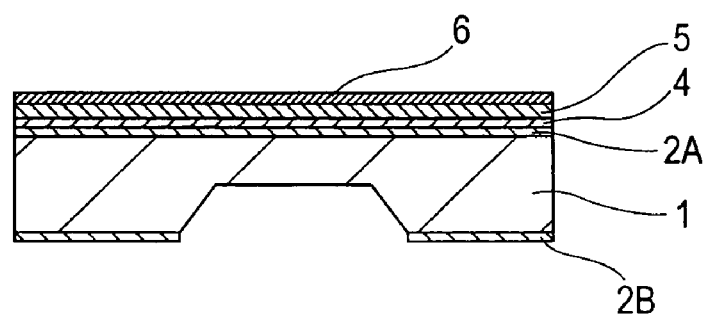

Next, a lower electrode film 4, a piezoelectric film 5, and an upper electrode film 6 are provided, as shown in FIGS. 12A and 12B. To improve the quality of the piezoelectric film 5, a film stack including a titanium (Ti) base film (film thickness is less than 50 nm, e.g., 20 nm) and a platinum (Pt) film (film thickness is 100 nm) stacked on the Ti base film is used as the lower electrode film 4. Instead of platinum, another metal, such as gold (Au), rhodium (Rh), or rhenium (Re), may be used, and, instead of titanium, tantalum may be used.

In the step of forming the lower electrode film 4, first, a Ti film is formed using a magnetron sputtering apparatus, and, then, a Pt film is formed. In the present example, the Ti film having a thickness of 20 nm and the Pt film having a thickness of 100 nm were formed under a 0.5 Pa gas pressure at a 0.5 kW radio frequency (RF) power. The Pt film is provided as a base film for the PZT, and the Ti film is provided to increase the adhesiveness of the Pt and the Ti film.

Next, the piezoelectric film 5 is formed. In the step of forming the piezoelectric film 5, the piezoelectric film 5 is formed. In the present example, the piezoelectric film 5 having a thickness of 1.4 µm was formed with a Pb1.02 (Zr0.53Ti0.47)O3 oxide target using a magnetron sputtering apparatus at room temperature, under 0.2 to 3 Pa of oxygen gas pressure, and at 0.1 to 5 kW of RF power. Details of the method of forming the piezoelectric film 5 are described below.

In the subsequent step of forming the upper electrode film 6, the Pt film is stacked on the surface of the piezoelectric film 5 that has been provided as described above. In the present example, the Pt film having a thickness of 200 nm was formed under a gas pressure of 0.5 Pa and at an RF power of 0.5 kW using a magnetron sputtering apparatus.

[Electrode Film Processing]

Figure 13A:
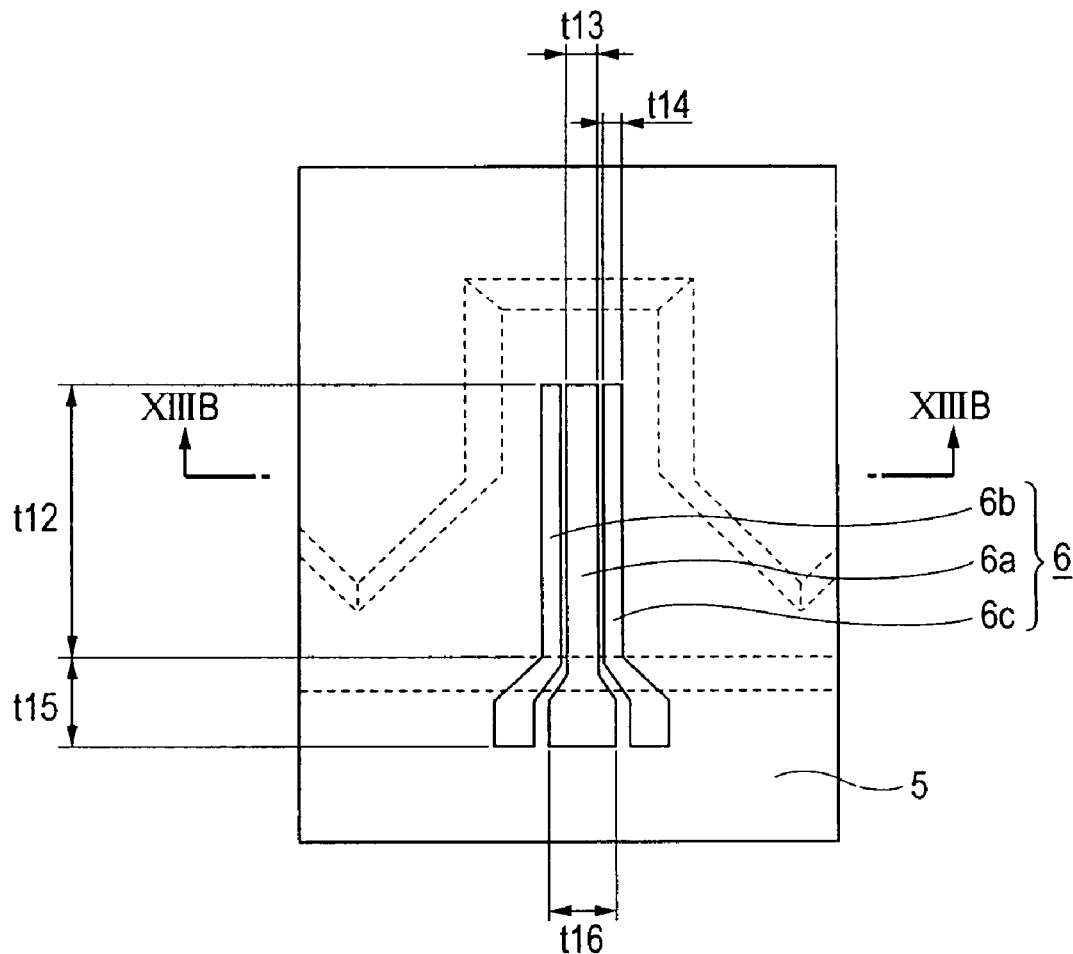
Figure 13B:
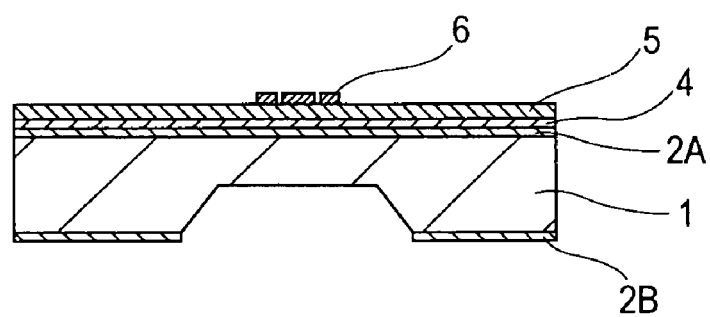

Next, as shown in FIGS. 13A and 13B, the upper electrode film 6 is processed into a predetermined shape. As shown in FIG. 13A, the upper electrode film 6 is divided into three sections. The middle section is a driving electrode 6a configured to generate power for driving the vibrating cantilever. On the left and right of the driving electrode 6a, detection electrodes 6b and 6c configured to detect Coriolis force are provided. The center of the driving electrode 6a in the width direction matches the center of the vibrating cantilever, and the detection electrodes 6b and 6c are provided symmetrically with respect to the driving electrode 6a. At the straight edges of the upper electrode films 6, connecting parts for connecting with the wiring are provided.

In the present example, the driving electrode width t13 was 50 µm, the detection electrode width t14 was 10 µm, the upper electrode length t12 was 2 mm, and the distances between the driving electrode 6a and the detection electrodes 6b and 6c were 5 µm each. These dimensions are not limited. However, the total size of the upper electrode films 6 must be smaller than the final size of the vibrating cantilever. The shape of the connection part with a wiring pattern, described below, is also not limited. In the present example, the connecting part width t16 was 50 µm and the connecting part length t15 was 50 µm.

As a method of processing the upper electrode films 6, first, photolithographic technology is employed to form a resist film having a predetermined pattern. Then, unnecessary areas of the upper electrode films 6 are removed by ion etching. The method of processing the upper electrode films 6 is not limited thereto.

Figure 14A:
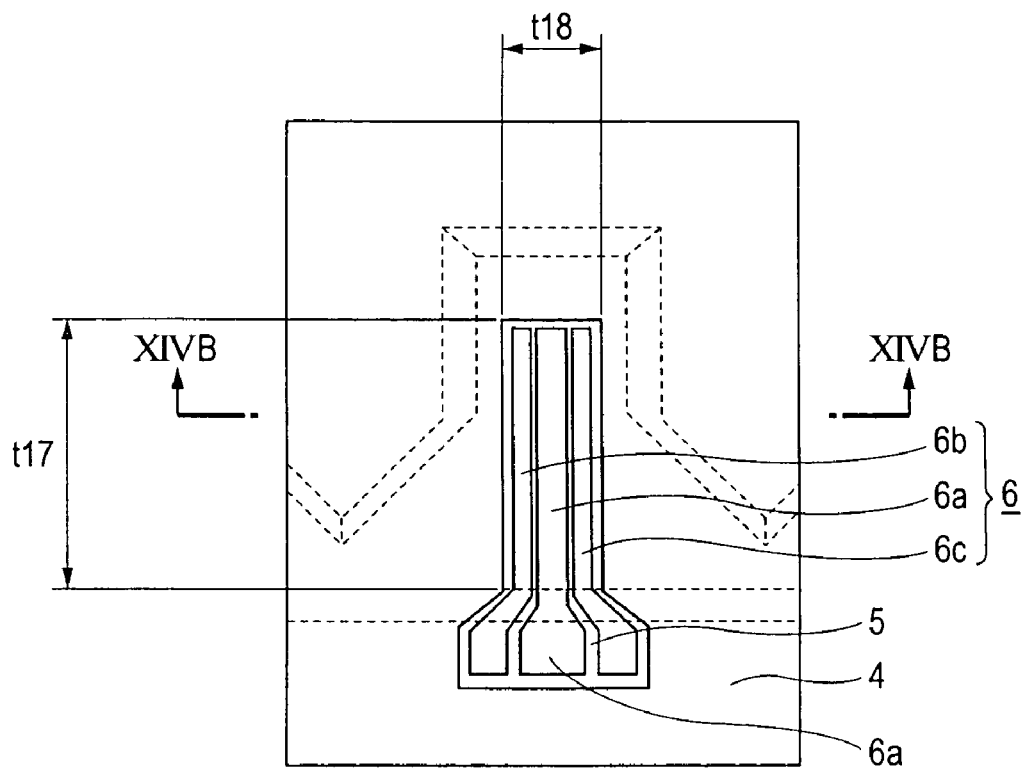
Figure 14B:
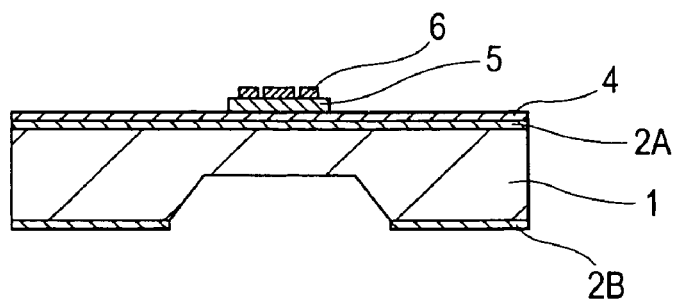

Next, as shown in FIGS. 14A and 14B, the piezoelectric film 5 is processed to form a predetermined shape. The shape of the piezoelectric film 5 is not limited so long as the piezoelectric film 5 completely covers the upper electrode films 6. In the present example, the piezoelectric film length t17 was 2.2 mm, and the piezoelectric film width t18 was 90 µm. The center of the piezoelectric film in the width direction is matched with the center of the vibrating cantilever. The piezoelectric film width t18 must be smaller than the vibrating cantilever width t4. In the present example, the piezoelectric film 5 was processed so that a 5-µm margin was provided around the outer periphery of the upper electrode films 6. This margin is determined on the basis of the shape of the entire element.

As a method of processing the piezoelectric film 5, first, photolithographic technology is employed to form a resist pattern film having the same shape as that of the piezoelectric film 5 to be obtained. Then, unnecessary areas of the piezoelectric film 5 are removed. In this example, piezoelectric film 5 was removed by wet etching using a mixture of hydrofluoric acid and nitric acid. The method of removal is not limited thereto, and other methods such as physical removal by ion etching and chemical removal by RIE, may be employed.

Figure 15A:
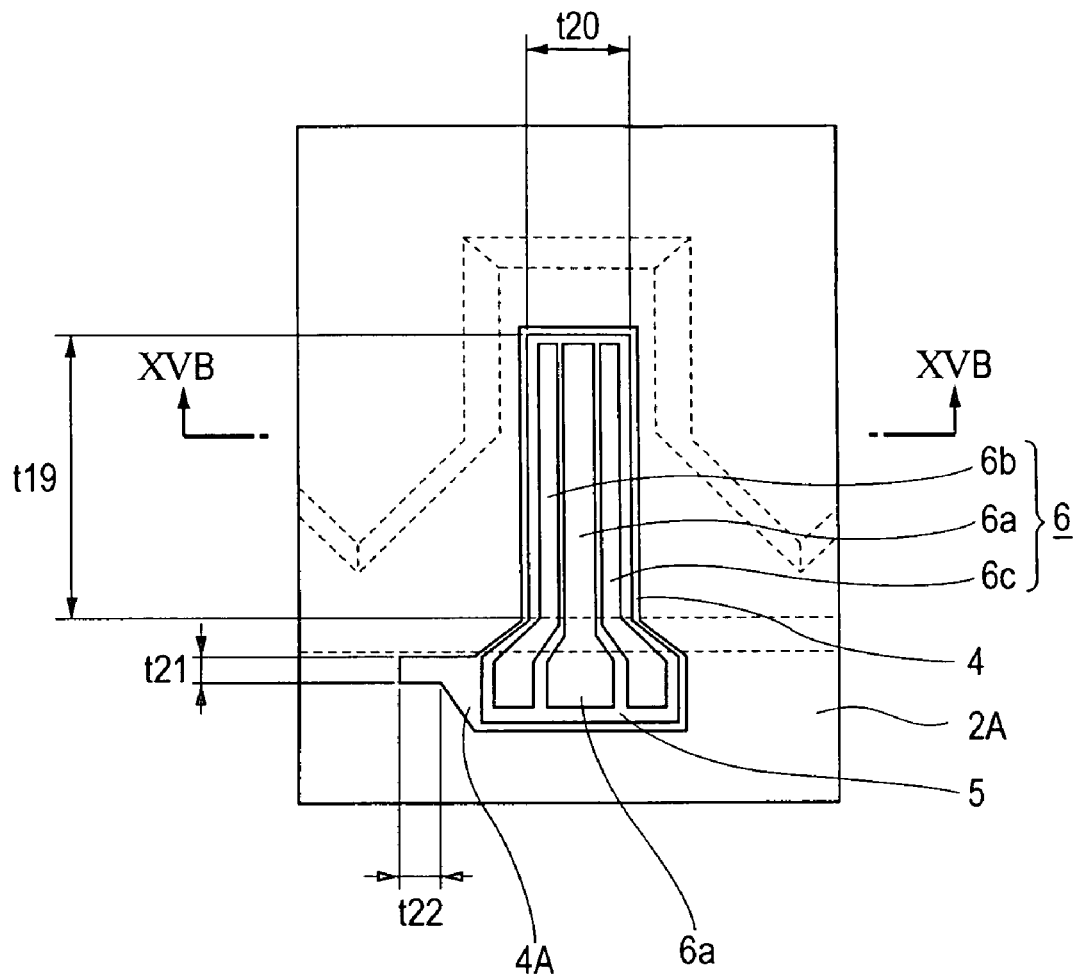
Figure 15B:
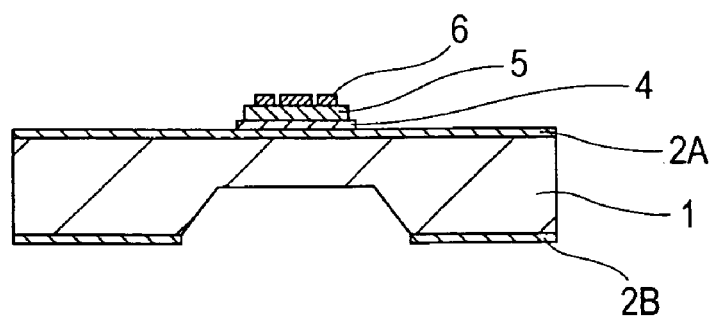

Next, as shown in FIGS. 15A and 15B, the lower electrode film 4 is processed to form a predetermined shape. The shape of the lower electrode film 4 is not limited so long as the lower electrode film 4 completely covers the piezoelectric film 5. In the present example, the lower electrode film length t19 was 2.3 mm, and the lower electrode film width t20 was 94 µm. The center of the lower electrode film in the width direction is matched with the center of the vibrating cantilever. The lower electrode film width t20 must be smaller than the vibrating cantilever width t4. In the present example, the lower electrode film 4 was processed so that a 5-µm margin was provided around the outer periphery of the piezoelectric film 5. This margin is determined on the basis of the shape of the entire element. To electrically join the lower electrode film 4 and the external component, a lower electrode joining section 4A, as shown in FIG. 15A, is provided. The lower electrode joining section 4A must have an area large enough to provide leads. In the present example, the lower electrode joining section length t21 was 200 μm, and the lower electrode joining section width t22 was 100 μm.

As a method of processing the lower electrode film 4, first, photolithographic technology is employed to form a resist pattern film having the same shape as that of the lower electrode part. Then, unnecessary areas of the lower electrode film 4 are removed by ion etching. The method of processing is not limited thereto, and methods other than ion etching may be employed.

[Wiring Film Formation]

Figure 16:
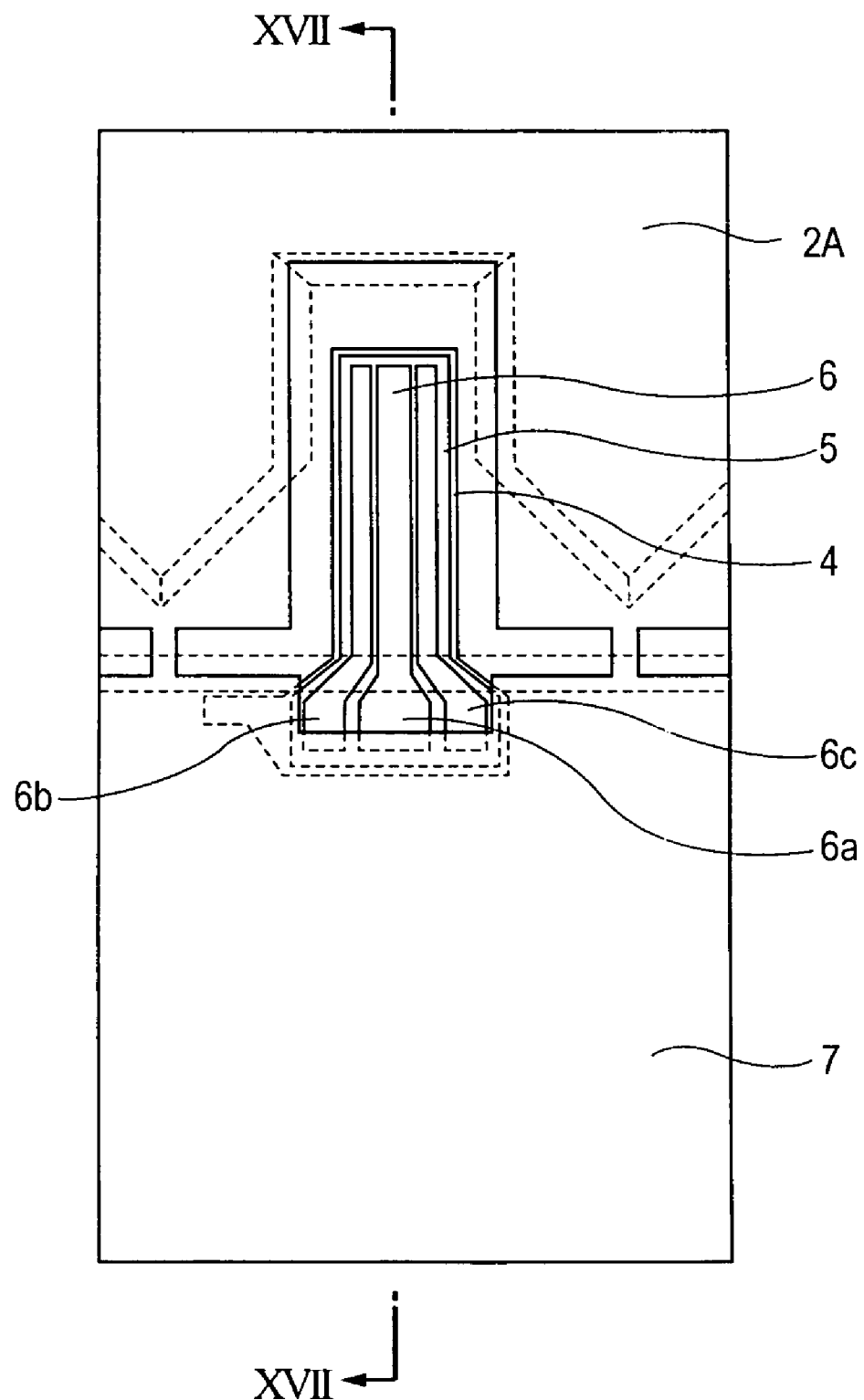
FIG. 16 illustrates an enlarged plan view of the substrate shown in FIG. 10B, where a wiring base film is provided.
Figure 17:
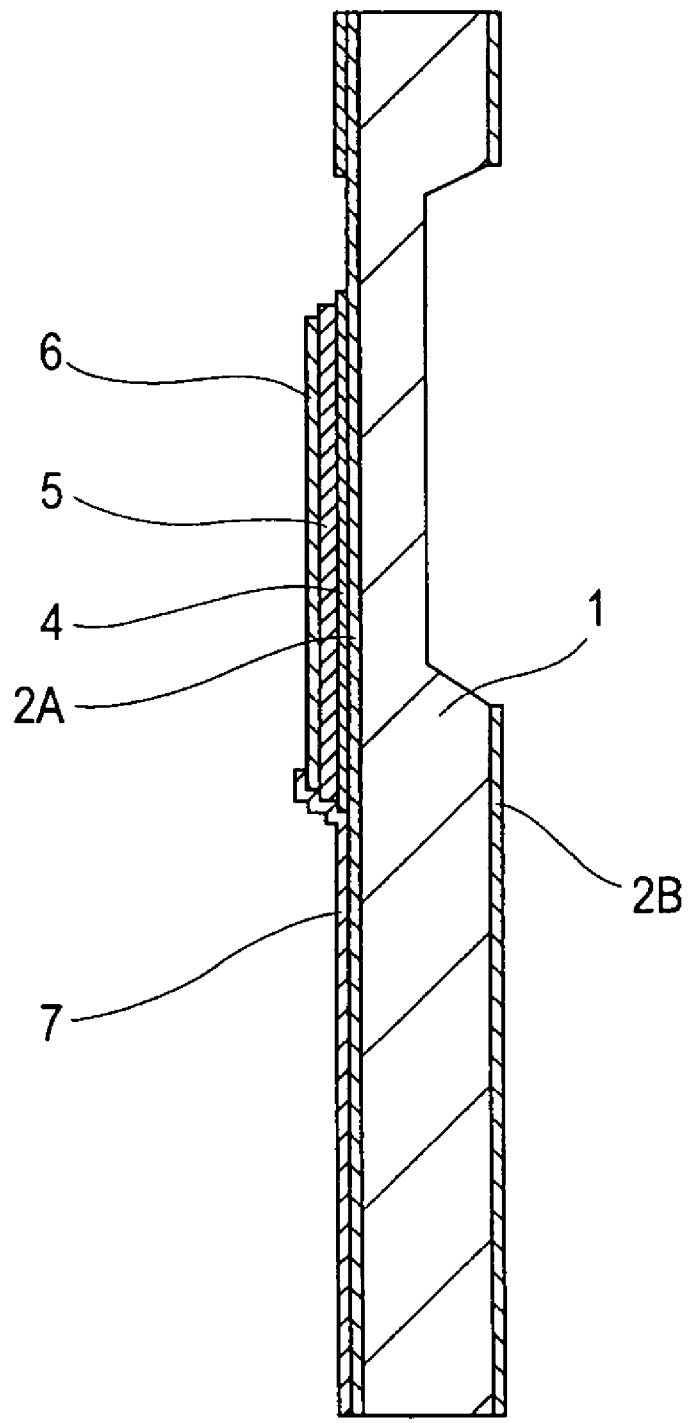
FIG. 17 illustrates a cross-sectional view taken along line XVII-XVII in FIG. 16.

Next, as shown in FIGS. 16 and 17, a wiring base film 7 is provided. The wiring base film 7 is provided to maintain adhesiveness of wiring films 9, described below. The wiring base film 7 is composed of an insulating material. The shape of the wiring base film 7 is not limited so long as the vibrator, the electrode connecting parts of the driving electrode 6a and the detection electrodes 6b and 6c, and the etched areas in the vicinity of the vibrators are not covered. In the present example, the wiring base film 7 overlaps by 5 μm with the upper electrode films 6 and with the lower electrode film 4 to improve the adhesiveness of the electrode films.

As a method of forming the wiring base film 7, first, photolithographic technology is employed to form a resist pattern film having openings with a predetermined shape. Then, the wiring electrode film is formed by sputtering, and unnecessary areas of the lower electrode film 4 are removed by liftoff etching. In the present example, alumina was selected as the material of the wiring base film 7 and was deposited to a thickness of 75 nm. However, the material and formation method of the wiring base film 7 is not limited thereto.

Figure 18:
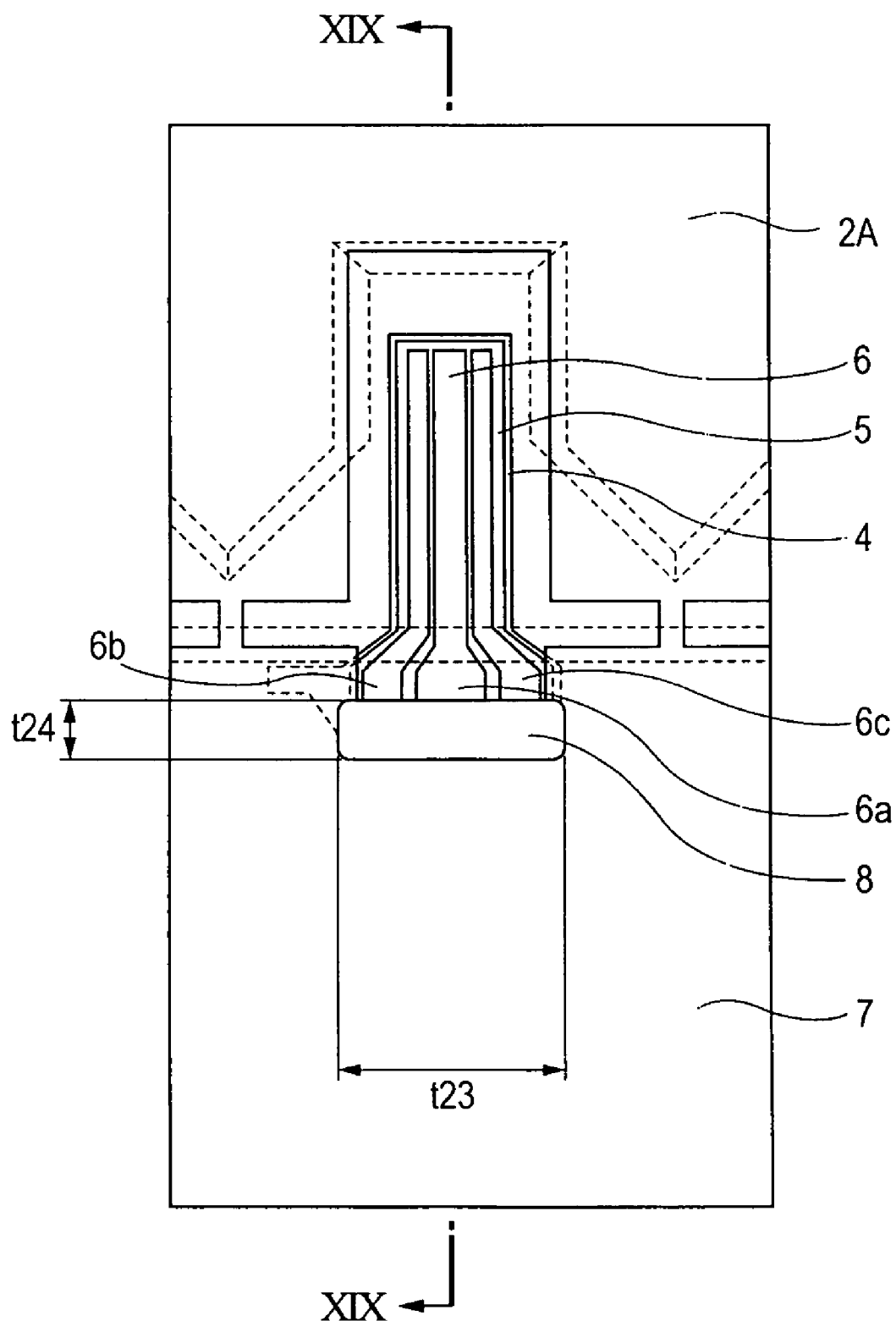
FIG. 18 illustrates an enlarged plan view of the substrate shown in FIG. 10B, where a flattening resist film is provided.
Figure 19:
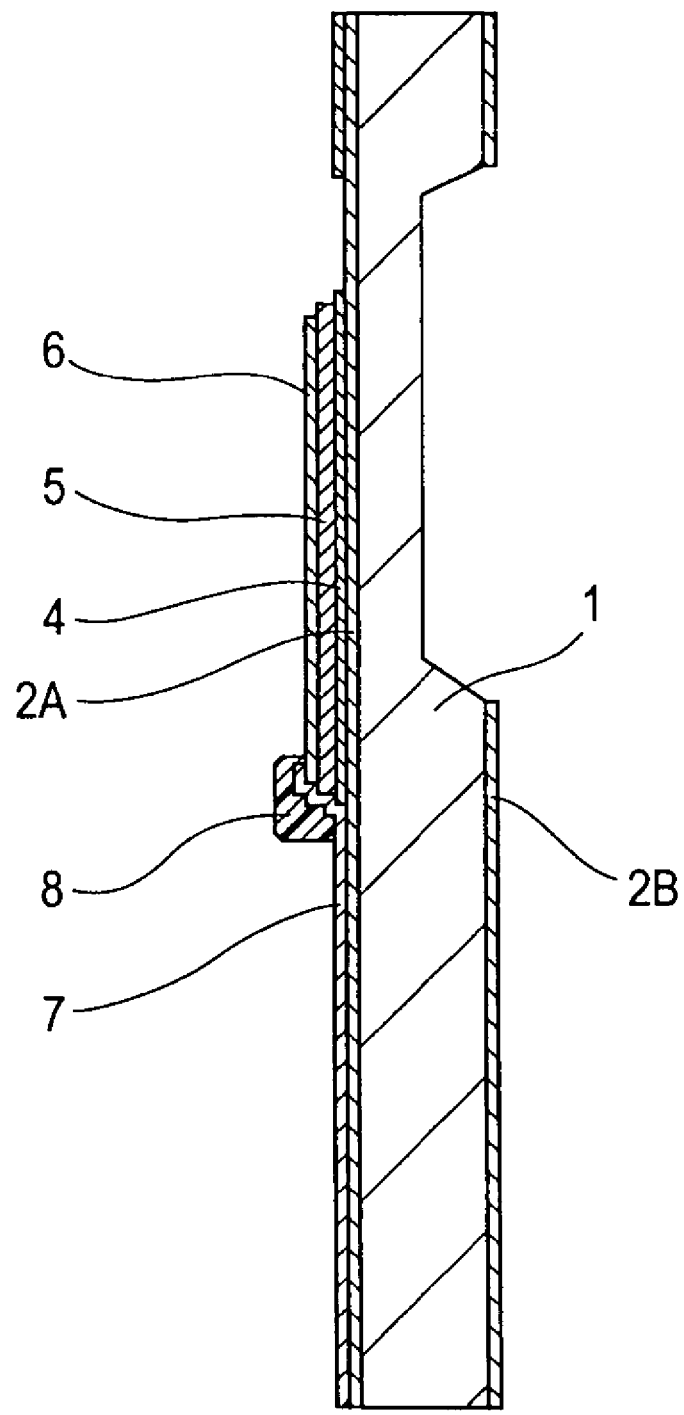
FIG. 19 illustrates a cross-sectional view taken along line XIX-XIX in FIG. 18.

Next, as shown in FIGS. 18 and 19, a flattening resist film 8 is provided on the electrode connecting parts of the driving electrode 6a and the detection electrodes 6b and 6c. The flattening resist film 8 is provided to allow smooth electrical connection between the wiring films 9, described below, and the upper electrode films 6. When the wiring films 9 and the upper electrode films 6 are physically connected, lines must be passed through the edges of the piezoelectric film 5 and the lower electrode film 4. Since, according to the present example, the piezoelectric film 5 is formed by wet etching, the edges of the piezoelectric film 5 are inversely tapered or substantially perpendicular. Therefore, if wiring is provided without providing the flattening resist film 8, the lines may break at these edges. Moreover, since the lower electrode film 4 is exposed, electrical short-circuiting may occur if the flattening resist film 8 is not provided for insulation. For these reasons, the flattening resist film 8 is provided.

The shape of the flattening resist film 8 is not limited so long as the flattening resist film 8 covers the wiring films 9, described below. In the present example, the flattening resist film width t23 was 200 μm, and the flattening resist film length t24 was 50 μm.

As a method of forming the flattening resist film 8, first, photolithographic technology is employed to form a predetermined pattern on a resist film. Then, the patterned resist film is hardened by heating the resist film to 280° C. to 300° C. In the present example, the thickness of the resist film was about 2 μm. It is desirable to change the thickness of the resist film so that it is greater than the total thickness of the piezoelectric film 5 and the lower electrode film 4.

In the present example, a photosensitive resist film was used as the flattening resist film 8. However, the material of the flattening resist film 8 is not limited thereto. Any non-conductive material and formation method thereof may be employed.

Figure 20:
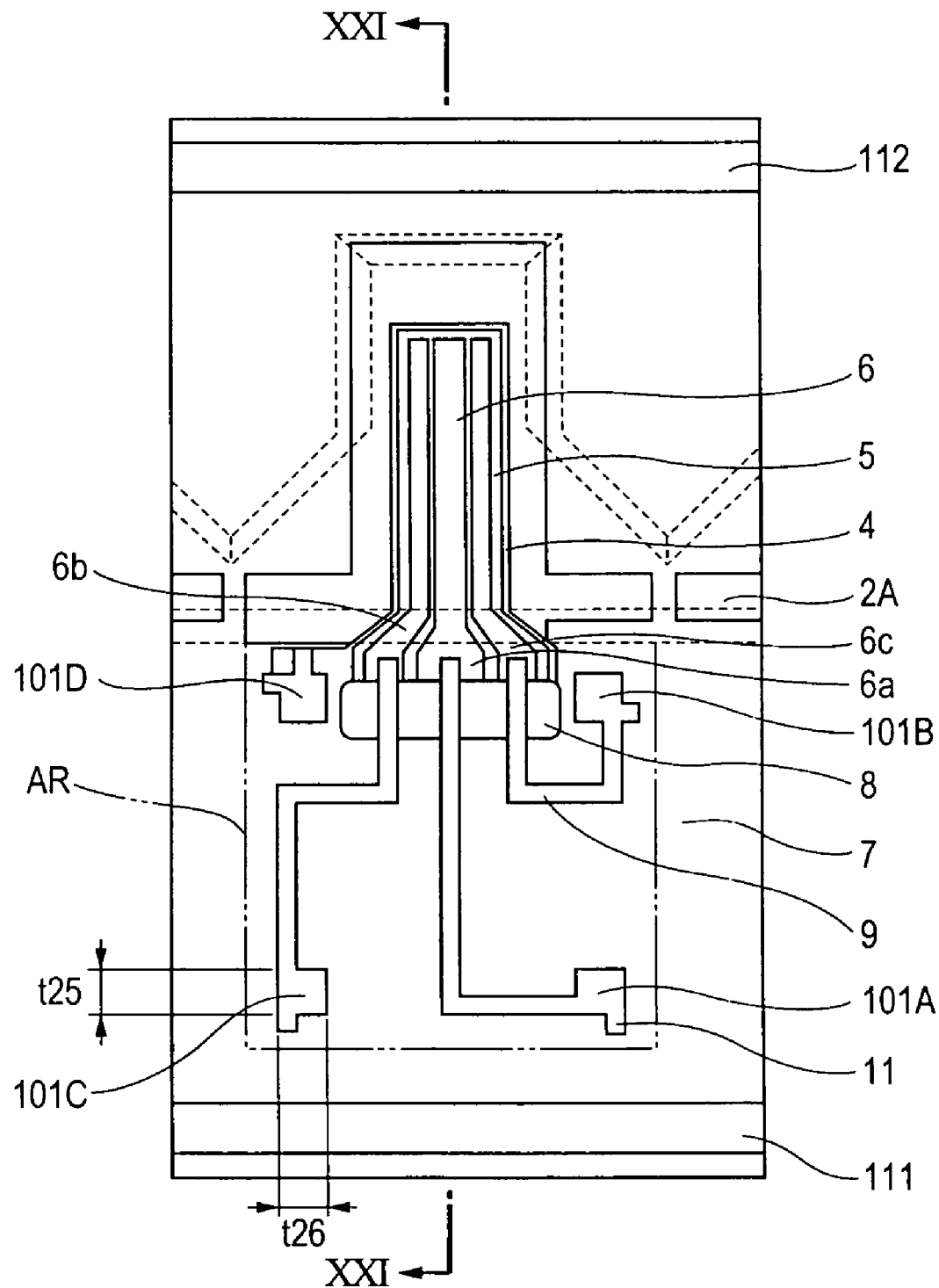
FIG. 20 illustrates an enlarged plan view of the substrate shown in FIG. 10B, where a wiring connection terminal is provided.
Figure 21:
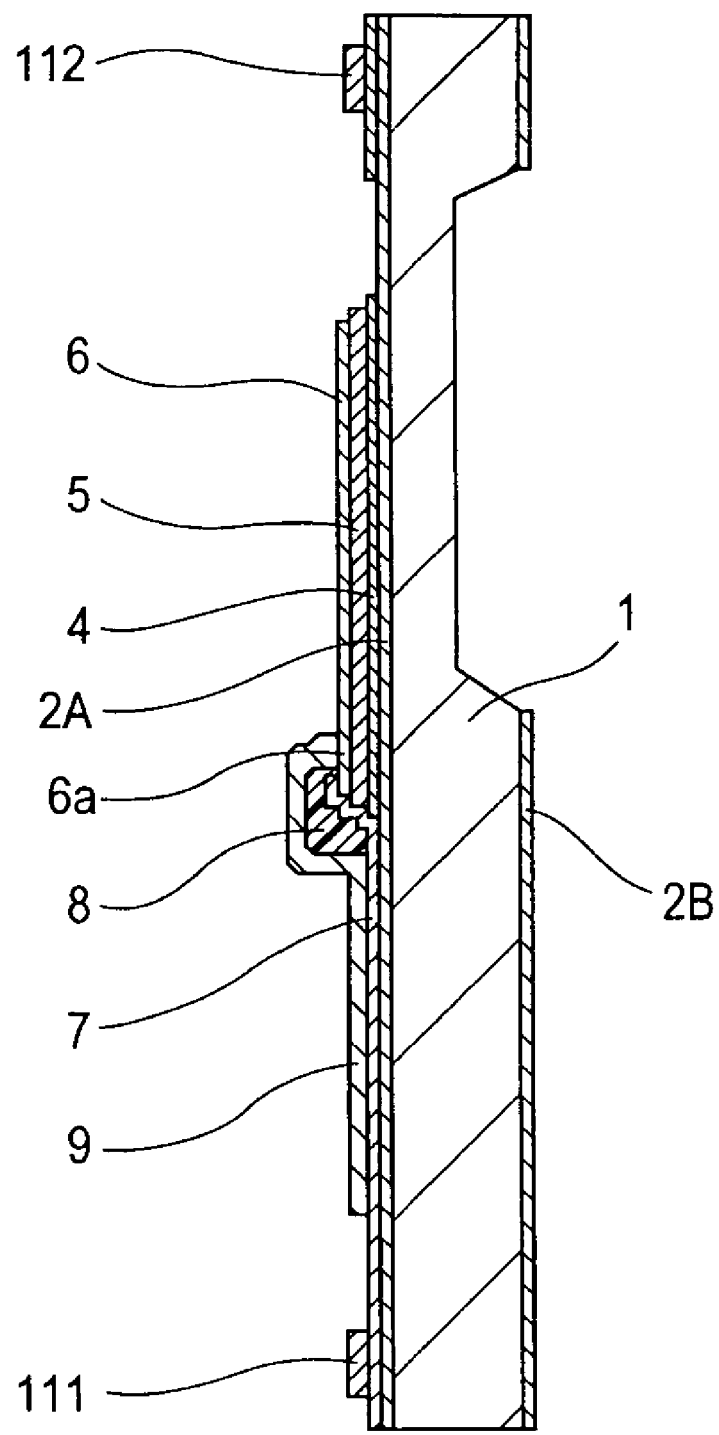
FIG. 21 illustrates a cross-sectional view taken along line XXI-XXI in FIG. 20.

Next, as shown in FIGS. 20 and 21, the wiring films 9 are provided to connect the upper electrode films 6 with external components. The wiring films 9 are provided to facilitate the electrical connection with external components. The wiring films 9 are passed through the upper surface of the flattening resist film 8 and are connected to the connecting parts of the wiring films 9. The shapes of the upper electrode films 6 (driving electrode 6a and detection electrodes 6b and 6c) are not limited. However, it is desirable that they are greater than 5 μm² so that electrical resistance is reduced. In this example, the electrical connection with external components is established through a flip-chip with Au bumps. As shown in FIG. 20, Au bump areas are defined by providing electrical pads 101A, 101B, 11C, and 101D.

The size of the electrical pads 101A, 101B, 101C, and 101D must be large enough so that Au bumps can be formed. In the present example, the electric pad length t25 was 120 μm, and the electric pad width t26 was 120 μm. Since the driving electrode 6a, the detection electrodes 6b and 6c, which are included in the upper electrode films 6, and the lower electrode film 4 each require an electrical connection with external components, it is necessary to provide independent wiring films 9 for the driving electrode 6a, the detection electrodes 6b and 6c, and the lower electrode film 4. The electrical pads 101A, 101B, 101C, and 101D are positioned within an element area AR.

Figure 22:
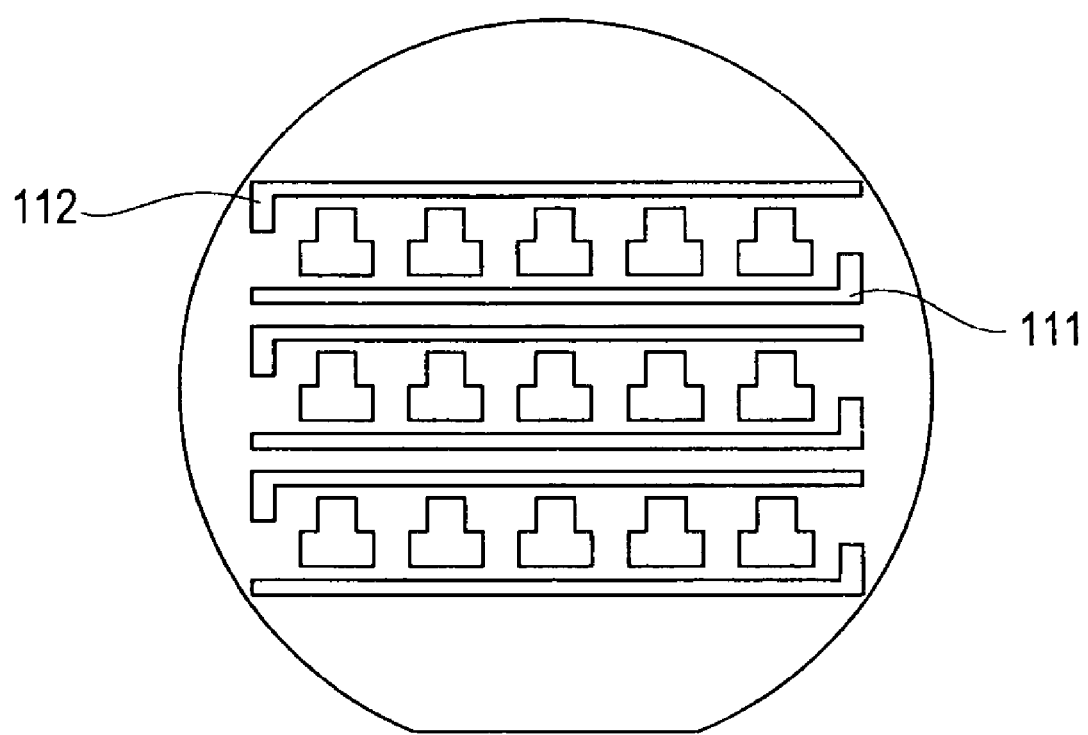
FIG. 22 illustrates a plan view of the substrate shown in FIG. 10B, where polarization rails are provided.

In this step, polarizing rails 111 and 112 are also provided. The vibrator according the present embodiment is polarized to stabilize the piezoelectric characteristics. The polarizing process is efficiently carried out by polarizing the vibrating gyroscopic sensor elements 100 in the same row on the Si substrate 1. To simultaneously polarize these vibrating gyroscopic sensor elements 100, electrical lines for applying voltage and a ground (GND) lines must be provided in advance. In the present example, the electrical lines are provided in a linear fashion as the polarizing rails 111 and 112, as shown in FIG. 22. At this point in process, the vibrating gyroscopic sensor elements 100 and the polarizing rails 111 and 112 are electrically independent. However, the electrical lines for applying voltage and the GND lines are connected by providing copper (Cu) leads 11, as described below.

As a method of forming the wiring films 9, first, photolithographic technology is employed to form a resist pattern film having openings of a predetermined shape. Then, the wiring films 9 are formed by sputtering, and unnecessary areas were removed by liftoff etching. To form the wiring films 9, titanium (Ti), which improves the adhesive force, was deposited to a thickness of 20 nm. Then, on the Ti layer, copper (Cu), which has a low electrical resistance and is inexpensive, was deposited to a thickness of 300 nm. Finally, on the Cu layer, gold (Au), which improves the connection with the Au bumps, was deposited to a thickness of 500 nm. The material and formation method of the wiring films 9 are not limited thereto.

[Insulating Protective Film Formation]

Figure 23:
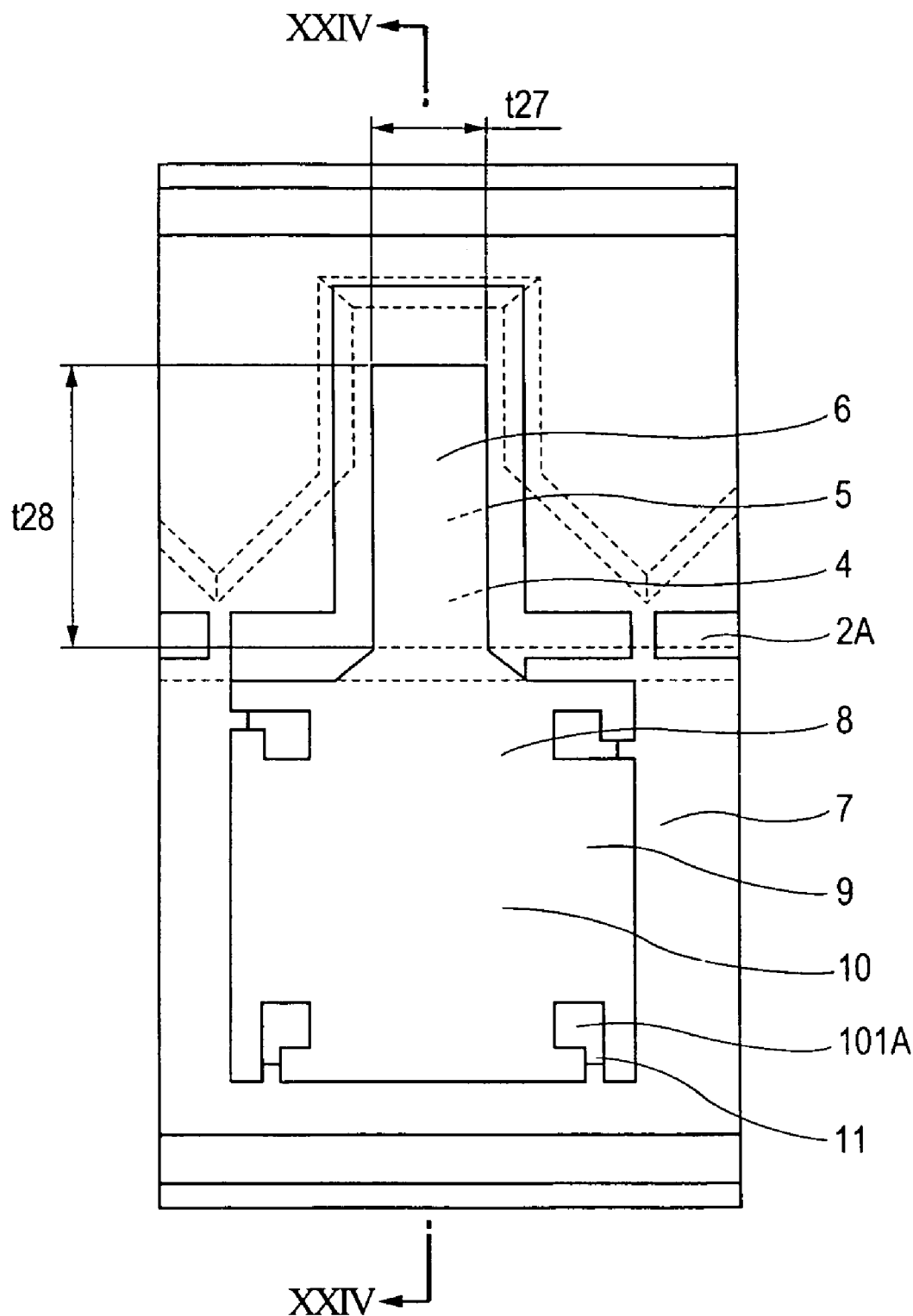
FIG. 23 illustrates an enlarged plan view of the substrate shown in FIG. 10B, where an insulating protective film is provided.
Figure 24:
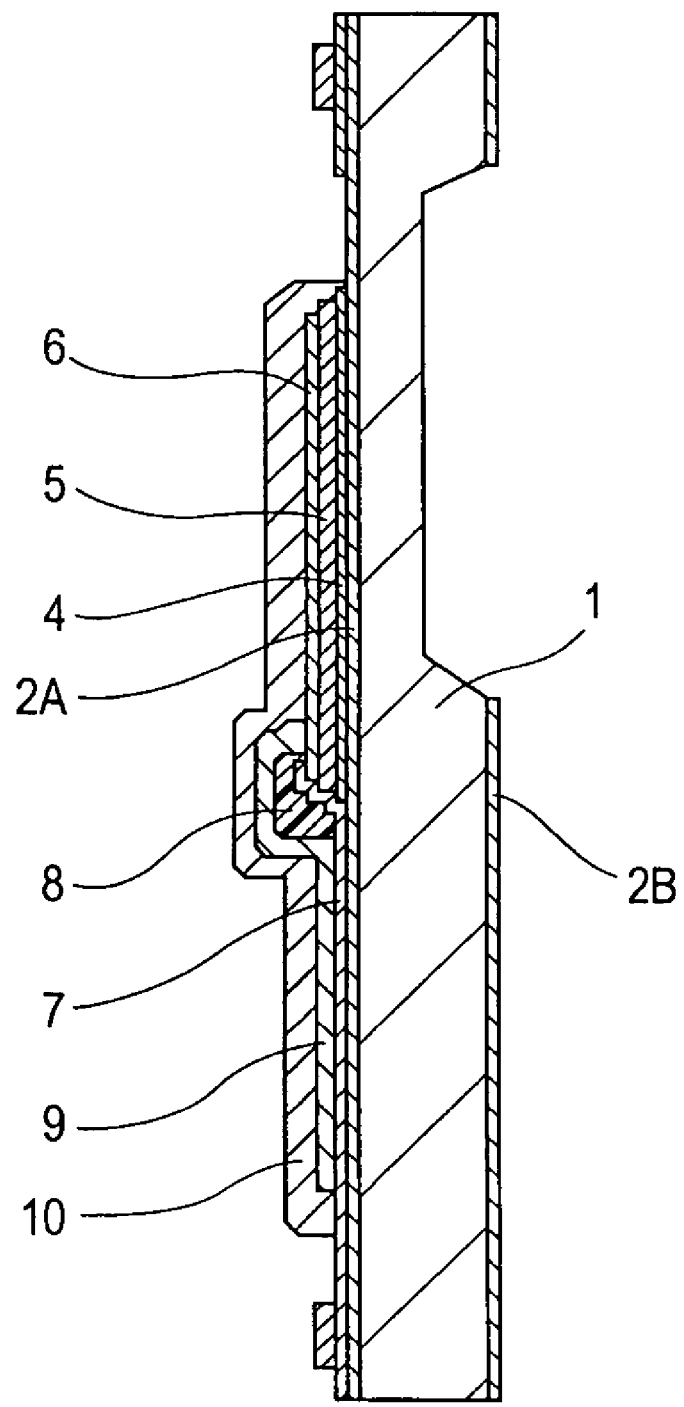
FIG. 24 illustrates a cross-sectional view taken along line XXIV-XXIV in FIG. 23.

Next, as shown in FIGS. 23 and 24, an insulating protective film 10 is provided on the vibrating cantilever and the electrical lines. The insulating protective film 10 is provided to prevent electrical leakage between the electrodes due to external factors, such as humidity, and to prevent oxidation of the electrode films. The protective film width t27 on the vibrator 110 is greater than the lower electrode width t20 and is smaller than the vibrating cantilever width t6. In the present example, the protective film width t27 was 98 µm. The protective film length t28 on the vibrator 110 is greater than the lower electrode length t19 and is smaller than the vibrator length t5. In the present example, the vibrator protective film length t28 was 1.95 nm. The insulating protective film 10 covers the all of the wiring films 9. However, the insulating protective film 10 must not cover the four electrode pads where Au bumps are formed and the four connecting parts for the Cu leads 11.

As a method of forming the insulating protective film 10, first, photolithographic technology is employed to form a resist pattern film having openings having predetermined shapes. Then, the insulating protective film 10 is formed by sputtering, and unnecessary areas of the insulating protective film 10 are removed by liftoff etching. In the present example, to form the wiring films 9, $Al_2O_3$, which improves the adhesiveness, was deposited to a thickness of 50 nm. Then, on the $Al_2O_3$ layer, $SiO_2$, which has a high electrical resistance, was deposited to a thickness of 750 nm. Finally, as a top layer, $Al_2O_3$, which improves the adhesiveness of the resist film during formation of the vibrating cantilever, was deposited to a thickness of 50 nm. The deposited $SiO_2$ layer that functions as an insulating protective layer must have a thickness at least twice as great as that of the upper electrode films 6. However, since burrs are easily formed during liftoff etching if the thickness exceeds 1 µm, in the present example, the thickness was set to 750 nm. Moreover, in the present example, the $SiO_2$ layer was formed under an argon (Ar) pressure of 0.4 Pa, which is the lower limit for electrical discharge, to improve the density of the layer.

Figure 25:
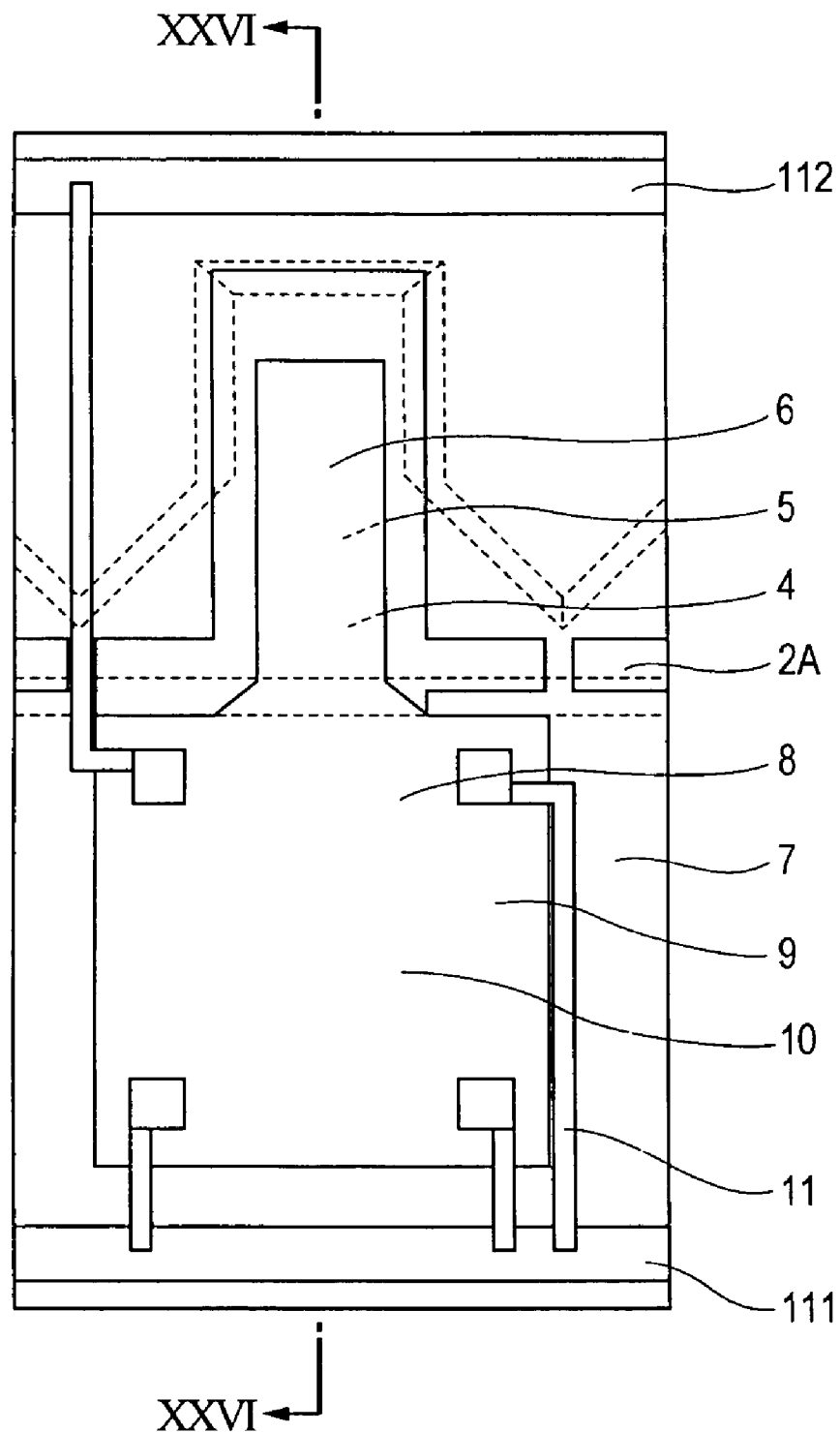
FIG. 25 illustrates an enlarged plan view of the substrate shown in FIG. 10B, where Cu leads are provided.
Figure 26:
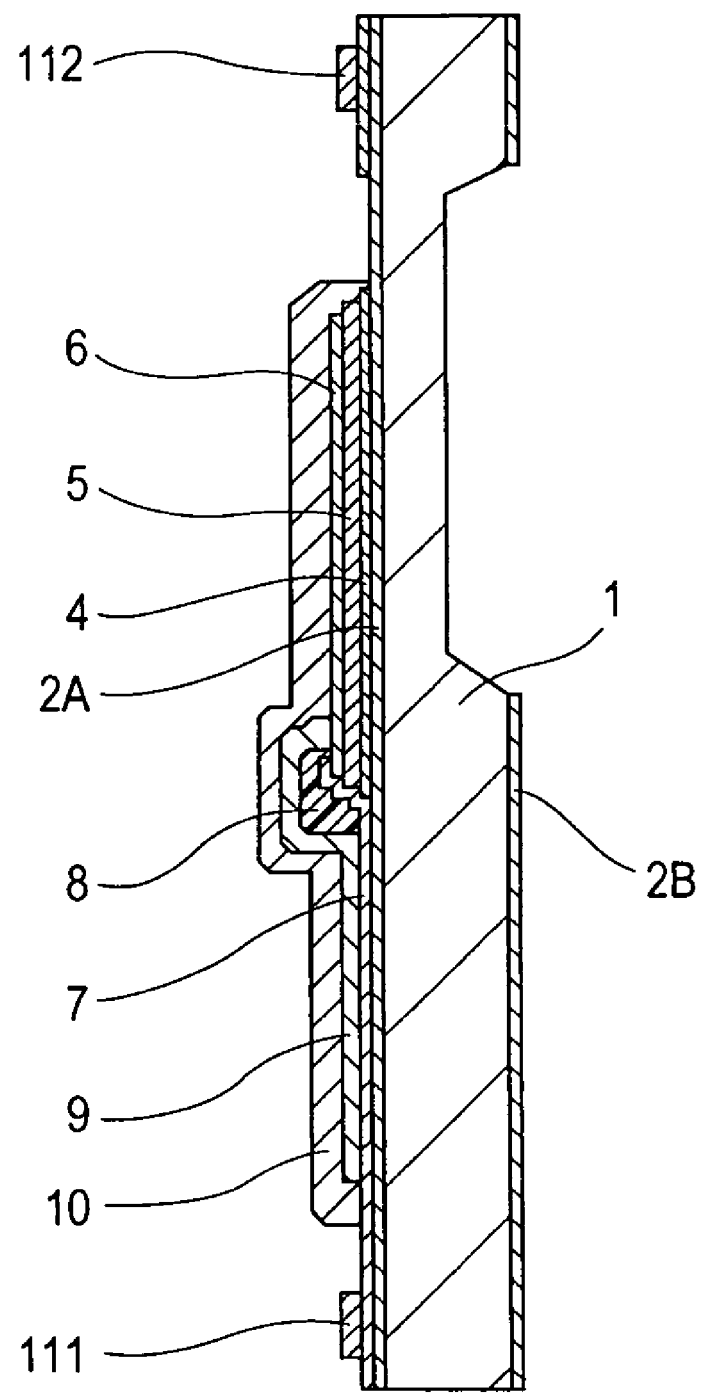
FIG. 26 illustrates a cross-sectional view taken along line XXVI-XXVI in FIG. 25.
Figure 27:
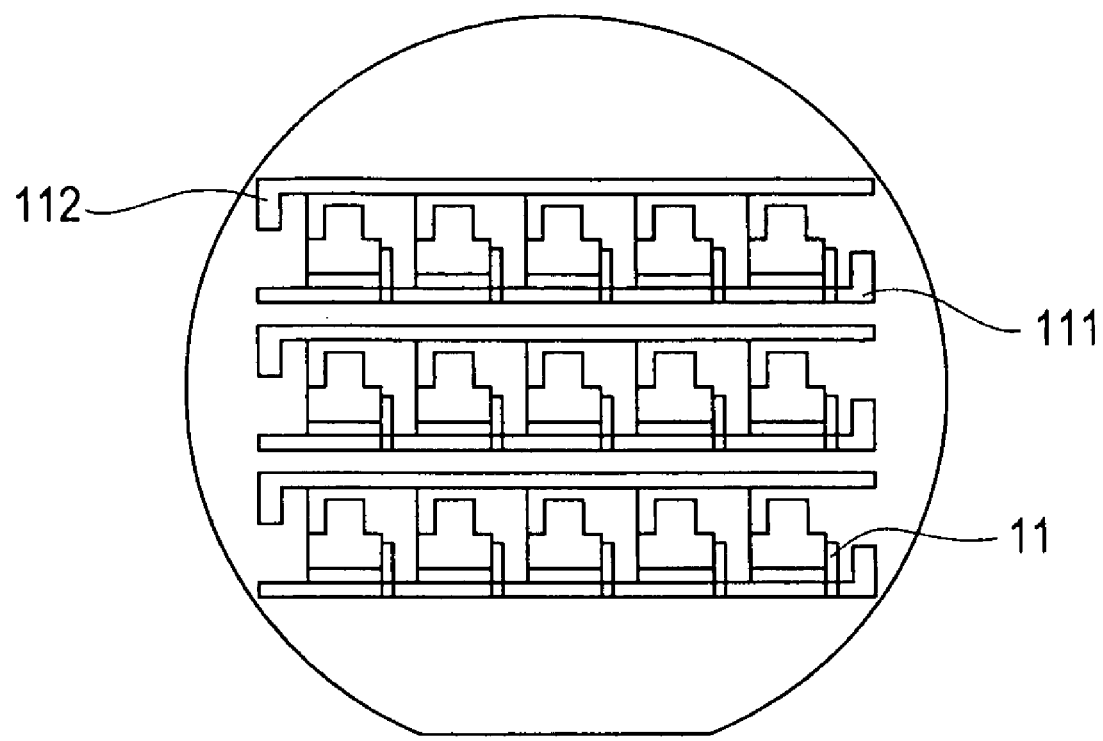
FIG. 27 illustrates a plan view of the entire substrate shown in FIG. 10B, where Cu leads are provided.

Next, the Cu leads 11 are provided as shown in FIGS. 25 and 26. One of the Cu leads 11 is provided to connect the driving electrode 6a and the detection electrodes 6b and 6c of the upper electrode films 6 to the polarizing rail 111 for voltage application, and the other Cu lead 11 is provided to connect the lower electrode film 4 to the polarizing rail 112 connected to the GND. Connections of the Cu leads 11 are established in each vibrating gyroscopic sensor element 100 on the Si substrate 1, as shown in FIG. 27. Copper is used for the leads because copper easily melts when wet etching is carried out after polarization, and, thus, the vibrating gyroscopic sensor elements 100 can be electrically disconnected again without being damaging. The material of the leads is not limited to copper so long as the material is electrically conductive and can be easily removed with out damaging the vibrating gyroscopic sensor elements 100. It is desirable to set the lead width t29 (FIG. 29) to 30 µm or great so that conductivity is maintained during polarization.

As a method of forming the Cu leads 11, first, photolithographic technology is employed to form a resist pattern film having openings with predetermined shapes. Then, the Cu leads 11 are formed by sputtering, and unnecessary areas of the Cu leads 11 are removed together with the resist film by liftoff etching. In the present example, the thickness of the Cu layer was set to 400 nm to maintain conductivity during polarization. The method of forming the Cu leads 11 is not limited thereto.

Figure 28:
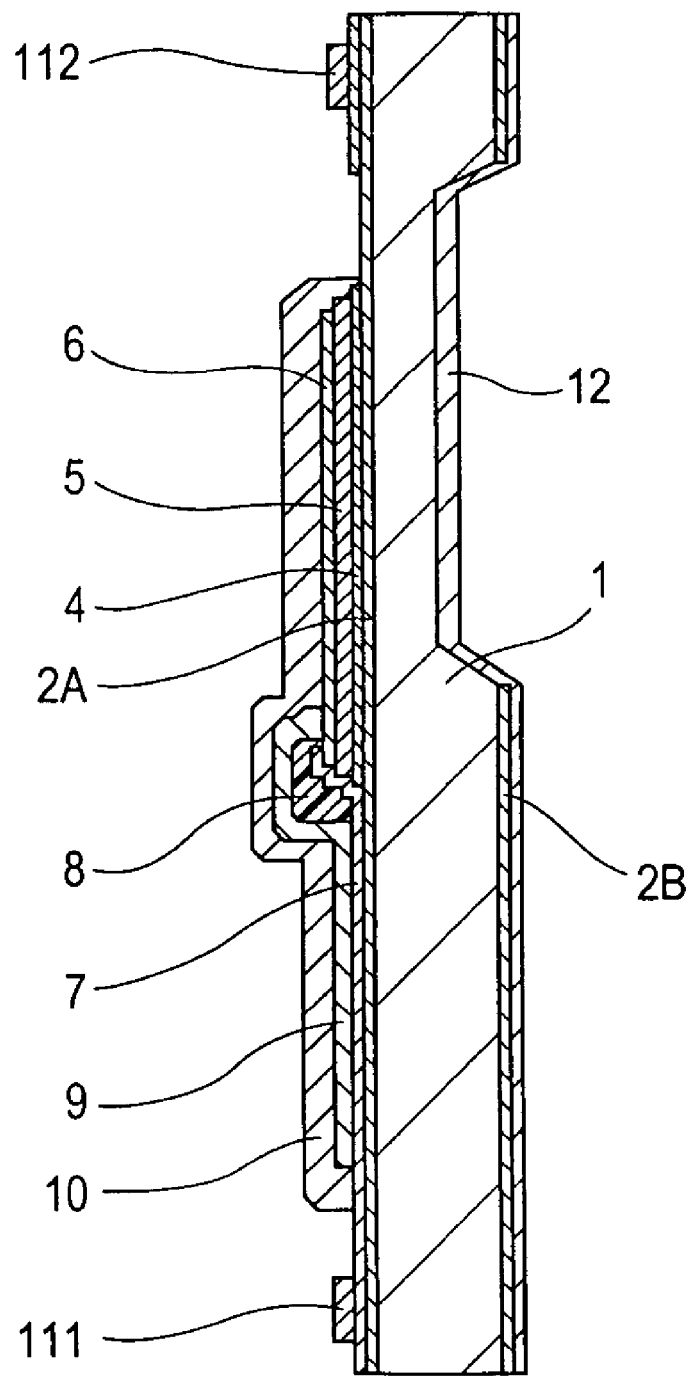
FIG. 28 illustrates a cross-sectional view of the substrate when a backside stopper film is provided on the substrate.

Next, as shown in FIG. 28, a backside stopper film 12 is formed. The backside stopper film 12 is provided to prevent deformation of the edge areas of the vibrating cantilever due to concentration of plasma to the bottom surface when through-etching is carried out during formation of the vibrating cantilever, as described below. In the present example, $SiO_2$ was deposited to a thickness of 500 nm on the entire backside by sputtering.

[Vibrating Cantilever Formation]

Figure 29:
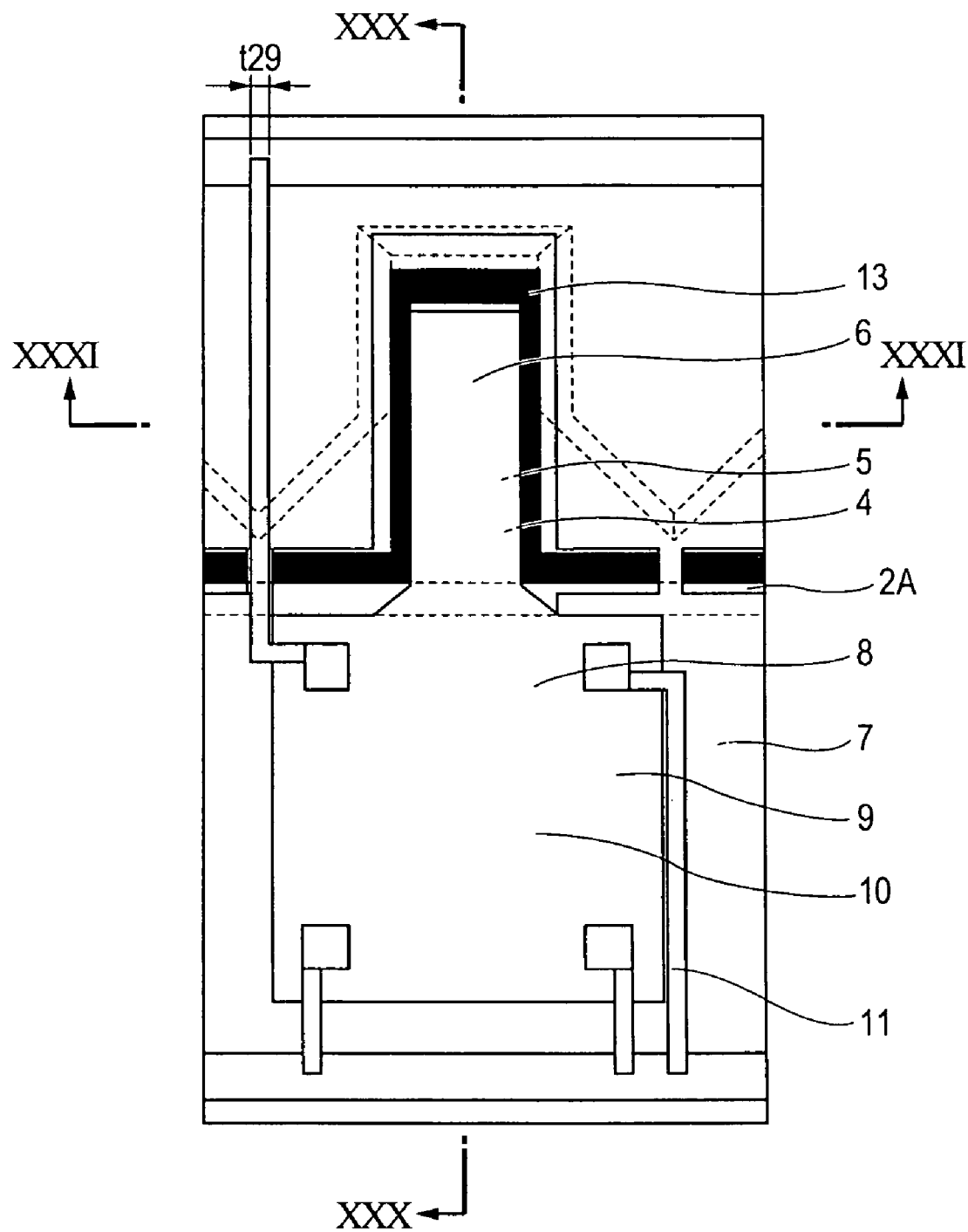
FIG. 29 illustrates an enlarged plan view of the substrate on which a vibrator cantilever is defined by grooves formed by removing the substrate.
Figure 30:
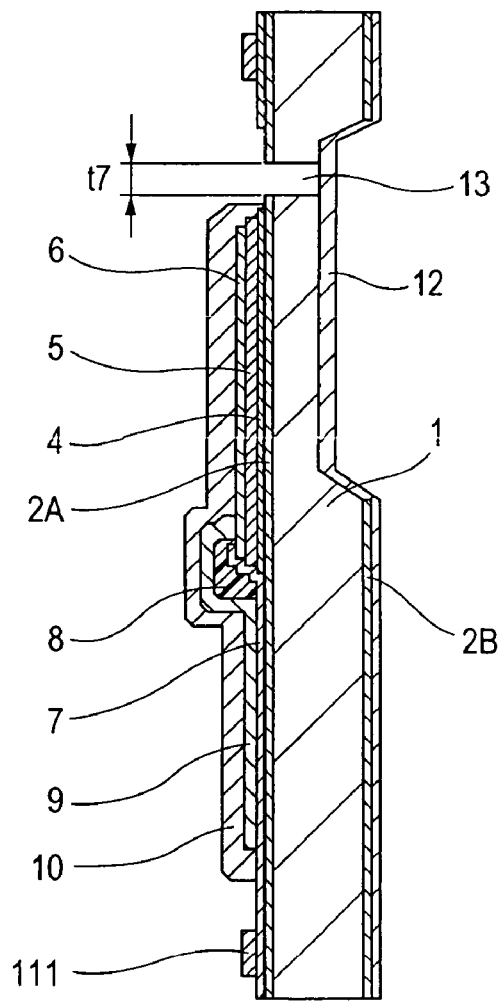
FIG. 30 illustrates a cross-sectional view taken along line XXX-XXX in FIG. 29.
Figure 31:
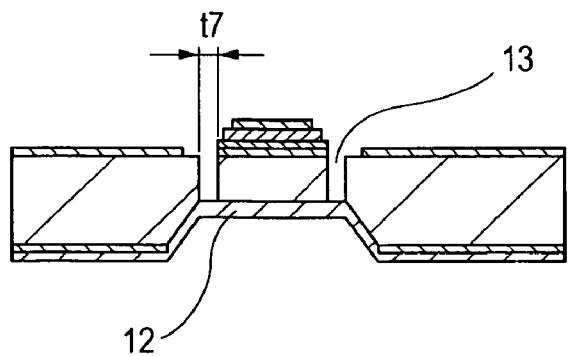
FIG. 31 illustrates a cross-sectional view taken along line XXXI-XXXI in FIG. 29.

Next, as shown in FIGS. 29, 30, and 31, the vibrating cantilever is formed by removing the films to create a groove around the cantilever. FIG. 30 illustrates a cross-sectional view taken along line XXX-XXX in FIG. 29. FIG. 31 illustrates a cross-sectional view taken along line XXXI-XXXI in FIG. 29.

As a method of forming the groove defining the cantilever, first, a resist pattern film having openings that are the same shape as a penetration part 13 is formed by employing photolithographic technology. Then, ion etching is carried out to remove the thermally-oxidized film 2A. Subsequently, the Si substrate 1 is etched until the Si substrate 1 is penetrated. Wet etching may be employed for removing the thermally-oxidized film 2A. However, ion etching is desirable when the dimensional error due to side etching is taken into consideration.

In the present example, the vibrating cantilever thickness t14 (diaphragm thickness t11) was set to 100 µm. Therefore, to penetrate the Si substrate 1 according to the present example, a thickness of 100 µm must be removed by etching. Standard ion etching does not have the selectivity that matches the resist film. In addition, when ion etching is employed, the resulting side walls are not perpendicular. Accordingly, in the present example, an apparatus using inductively coupled plasma (ICP) was used to carrying out a Bosch process (using SF6 gas during etching and C4F8 gas during film formation) in which etching and formation of a side wall protection film are repeated. In this way, a vibrating cantilever having perpendicular side walls are formed. The technology for etching a silicon material so that the resulting side walls will be perpendicular has already been generally established. In the present example, a commercially available apparatus was used. However, the method of creating a groove defining the driving cantilever is not limited thereto. The etching width t7 must be great enough to enable etching using ICP. In the present example, the etching width t7 was set to 200 µm. The Cu leads 11 should not be penetrated.

Figure 32:
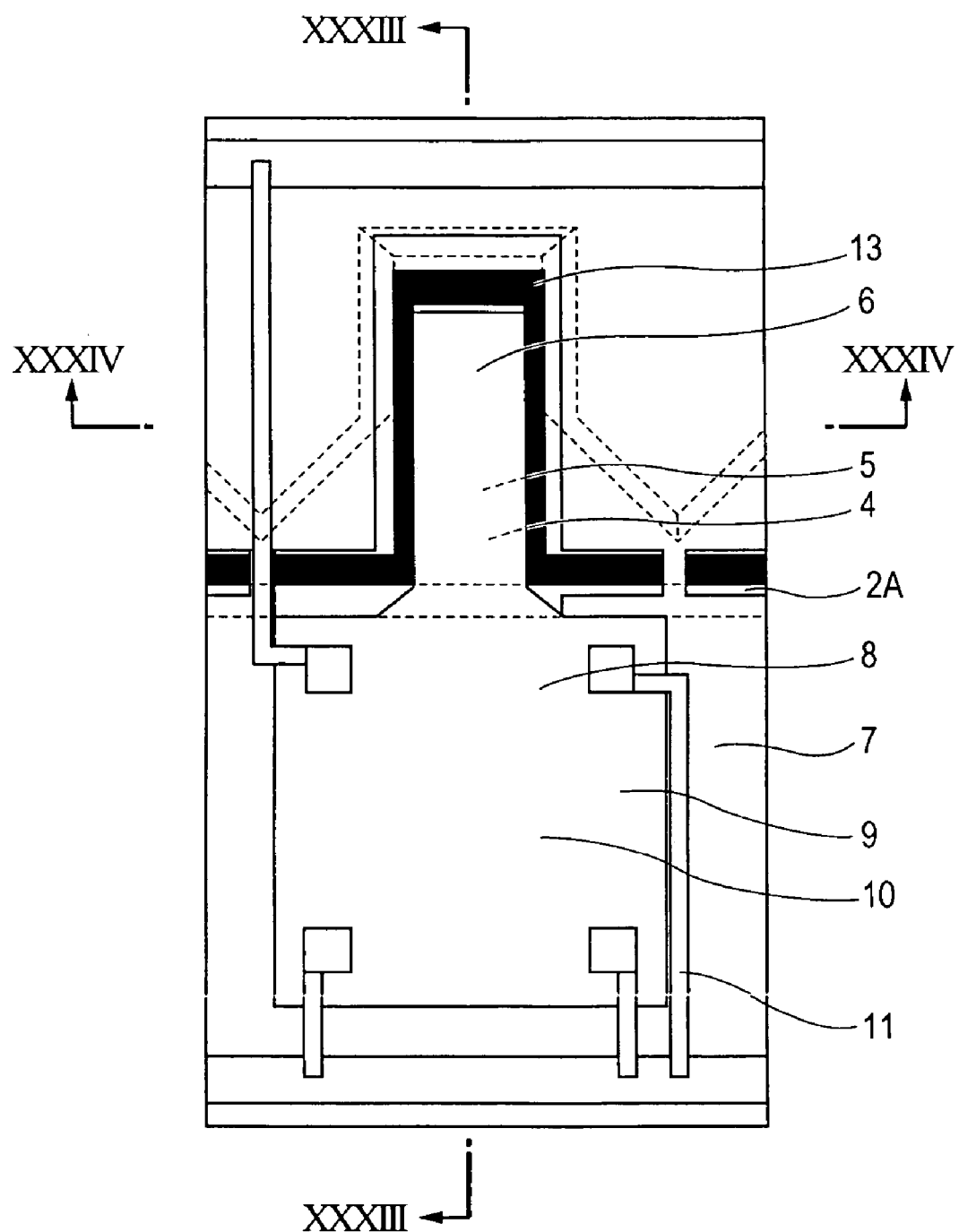
FIG. 32 illustrates an enlarged plan view of the substrate when the backside stopper film is removed.
Figure 33:
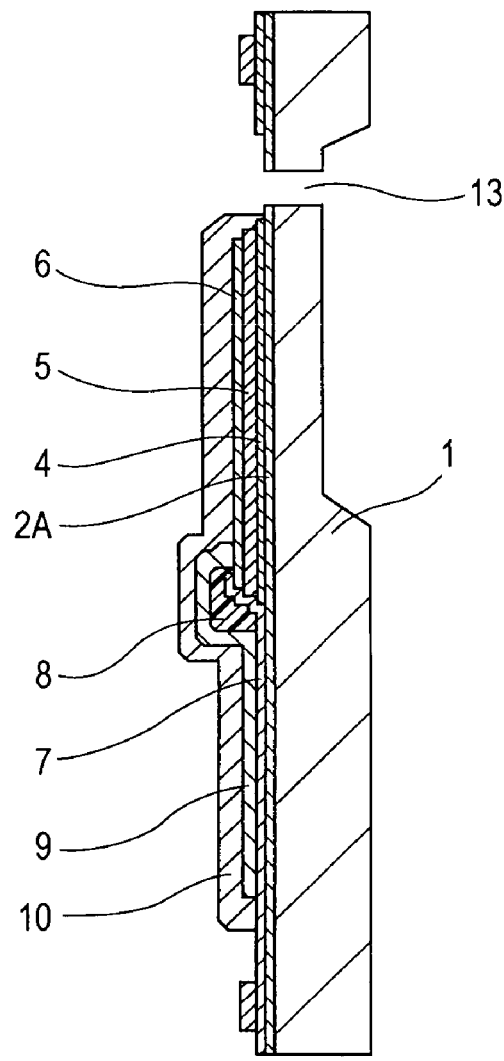
FIG. 33 illustrates a cross-sectional view taken along line XXXIII-XXXIII in FIG. 32.
Figure 34:
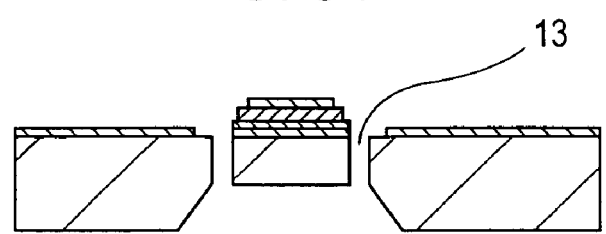
FIG. 34 illustrates a cross-sectional view taken along line XXXIV-XXXIV in FIG. 32.

After completing etching with ICP, the backside stopper film 12 is removed. The method of removing the backside stopper film 12 is not limited. However, in the present example, wet etching using ammonium fluoride was employed. If the resist film defining the penetration pattern is removed before removing the backside stopper film 12, the insulating protective film 10 will also be removed. Therefore, the backside stopper film 12 is removed before removing the resist film. The Si substrate 1 after removing both the backside stopper film 12 and the resist film is illustrated in FIGS. 32 to 34.

[Polarization]

Figure 35A:
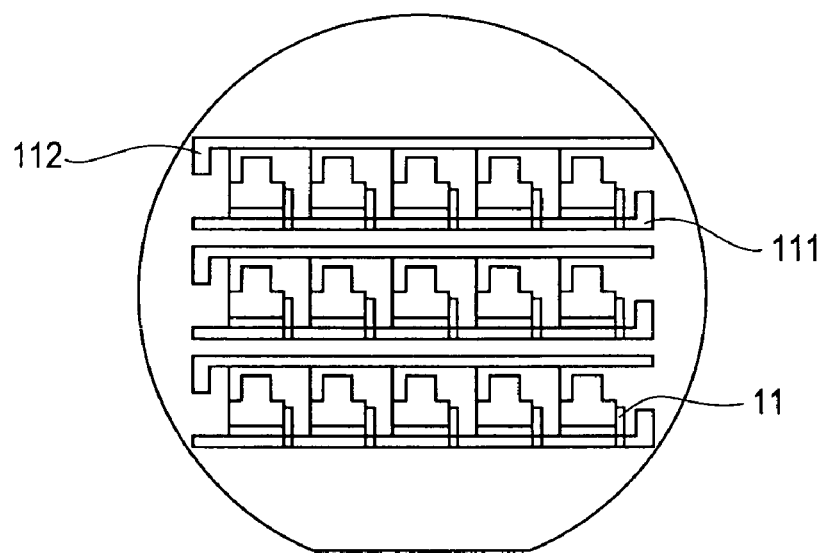
Figure 35B:
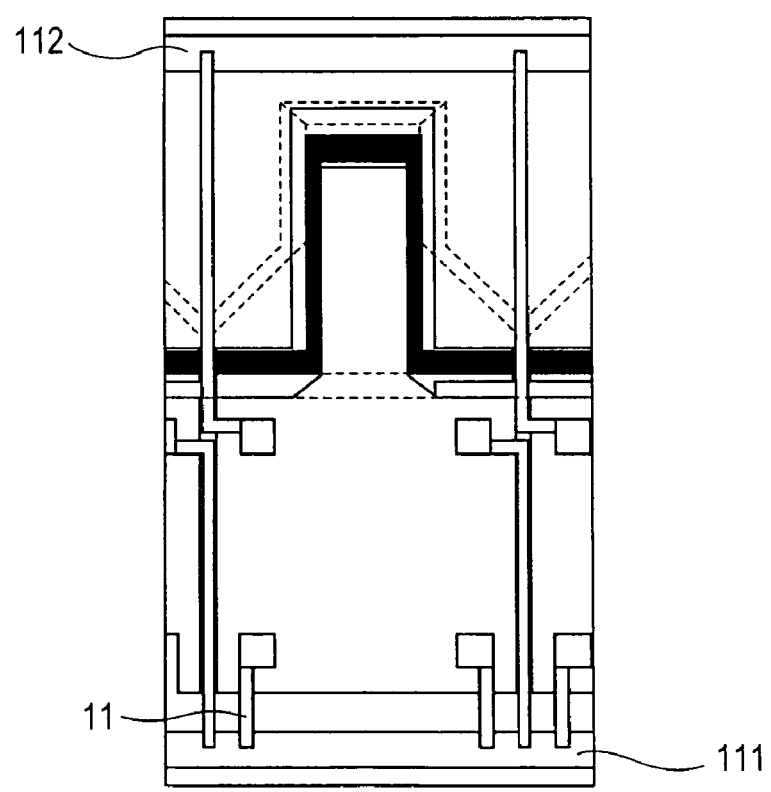

Next, polarization is carried out on the vibrating gyroscopic sensor elements 100 illustrated in FIGS. 35A and 35B to stabilize the piezoelectric characteristic. To polarize all of the vibrating gyroscopic sensor elements 100 in the same row, the vibrating gyroscopic sensor elements 100 are connected to an external power source via application pads and GND pads. The methods of connection and polarization are not limited. However, in the present example, the vibrating gyroscopic sensor elements 100 were connect an external power source by wire bonding, and, then, polarization was carried out.

Figure 36A:
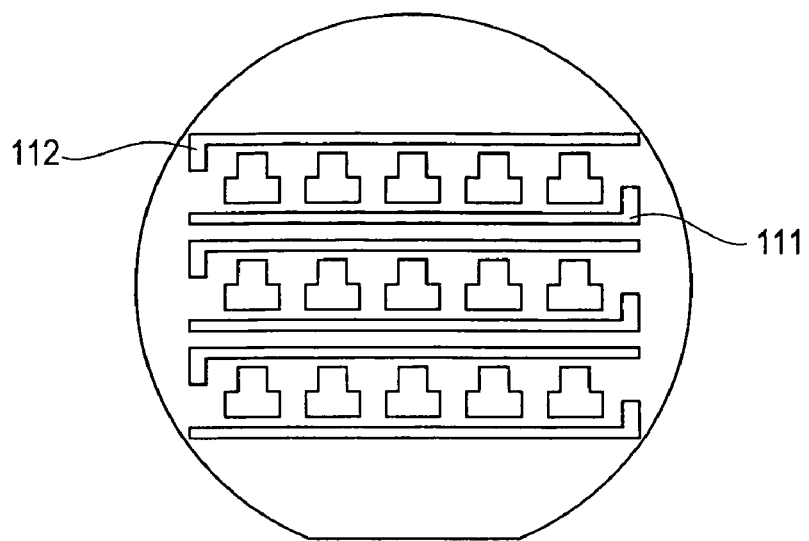
Figure 36B:
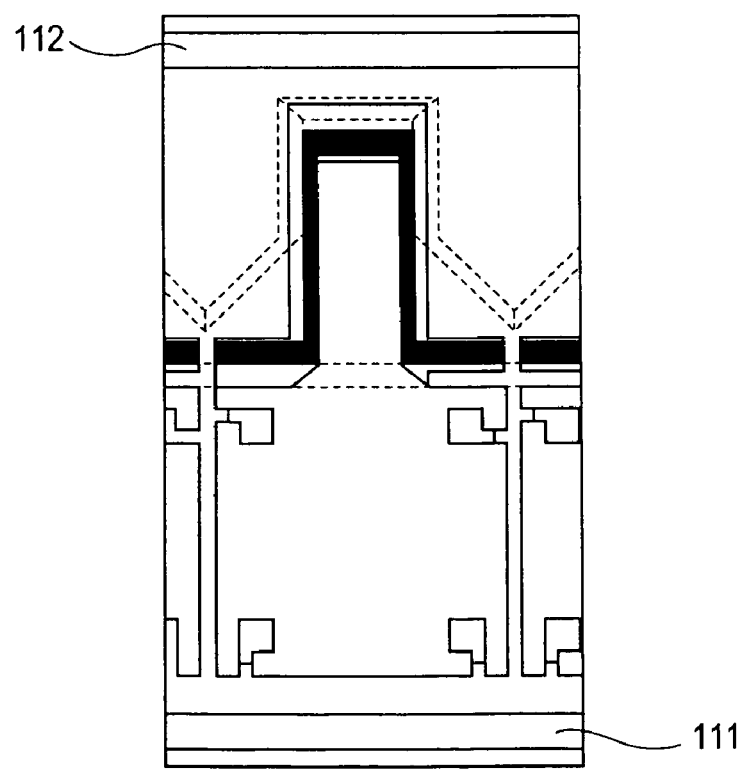

Next, as shown in FIGS. 36A and 36B, the Cu leads 11 that are no longer required after polarization are removed. If the elements are separated without removing the Cu leads 11, the Cu leads 11 and the Si substrate 1 will undergo electrical leakage at the cutting surfaces. Therefore, it is desirable to chemically remove the Cu leads 11. In the present example, the Cu leads 11 were dissolved by wet etching using an Enstrip solution (product of Meltex Inc.) so that the vibrating gyroscopic sensor elements 100 are not damaged.

By employing a thin film formation process to form the vibrating gyroscopic sensor elements 100 and polarizing the vibrating gyroscopic sensor elements 100 through the electrical line provided in the thin film formation process, a large number of vibrating gyroscopic sensor elements 100 can be produced stably at low costs.

The method of removing the Cu leads 11 is not limited to dissolution by wet etching, as described above. In the step of separating the vibrating gyroscopic sensor elements 100, described below, the vibrating gyroscopic sensor elements 100 are cut along the Cu leads 11. Therefore, the Cu leads 11 may be ground away when separating the elements with a dicer. In this case, the lead width t29 of the Cu leads 11 must be smaller than the width of the grinding stone. In the present example, since the vibrating gyroscopic sensor elements 100 were separated by using a dicer having a grinding stone width of 40 μm, the lead width t29 of the Cu leads 11 had to be set between 20 μm and 40 μm. If the width of the Cu leads 11 were smaller than 20 μm, the Cu leads 11 might have broke because of the heat generated due to resistance to the applied polarization voltage. If the width of the Cu leads 11 were greater than 40 μm, which is greater than the width of the grinding stone, the Cu leads 11 might have been left behind after the vibrating gyroscopic sensor elements 100 were separated.

[Gold Bump Formation]

Figure 37A:
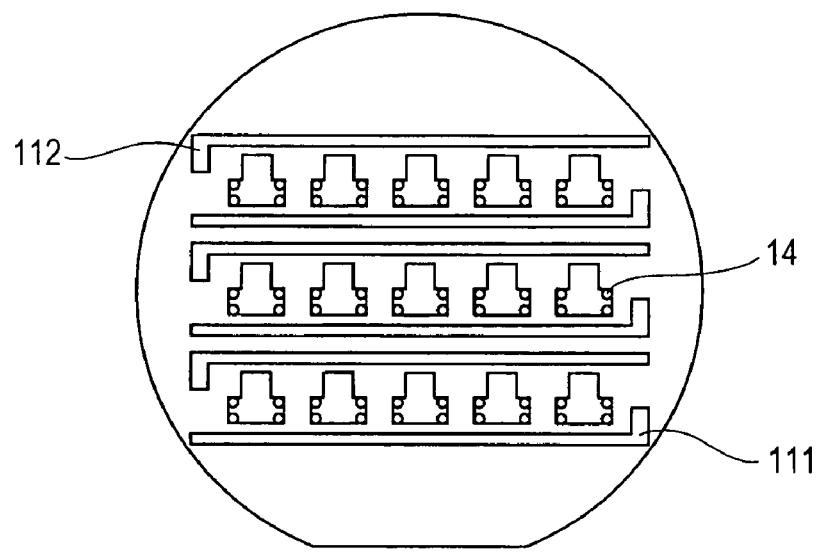
Figure 37B:
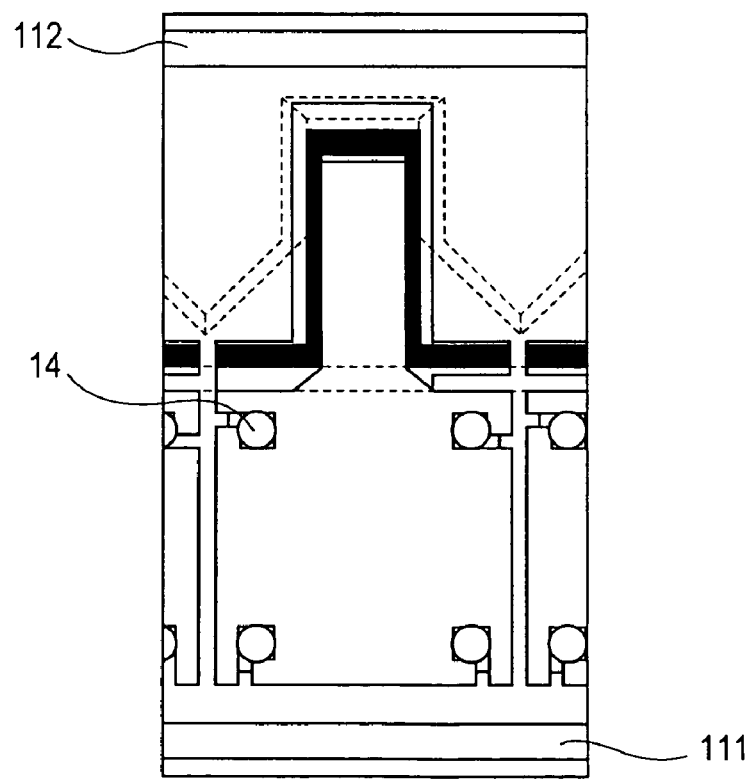

Next, as shown in FIGS. 37A and 37B, Au bumps 14 are provided for flip-chip. The Au bumps 14 are provided on the four electrode pads.

[Cutting]

Figure 38A:
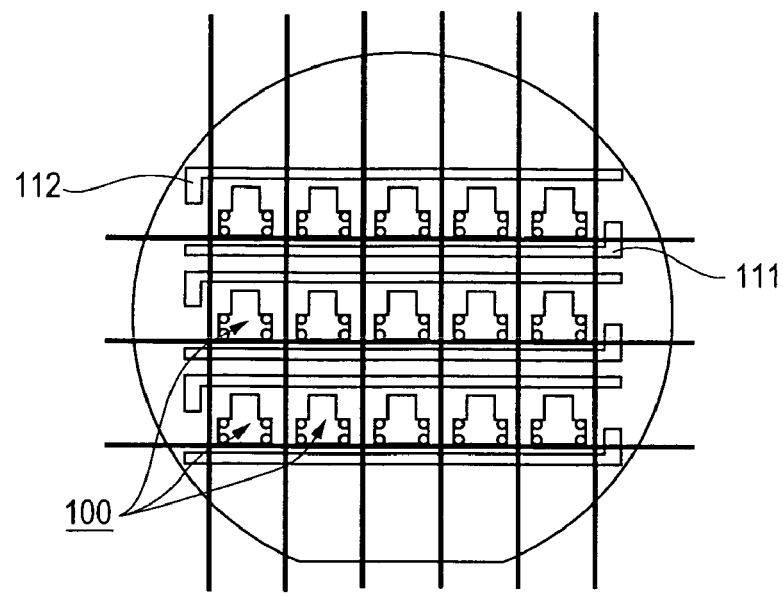
Figure 38B:
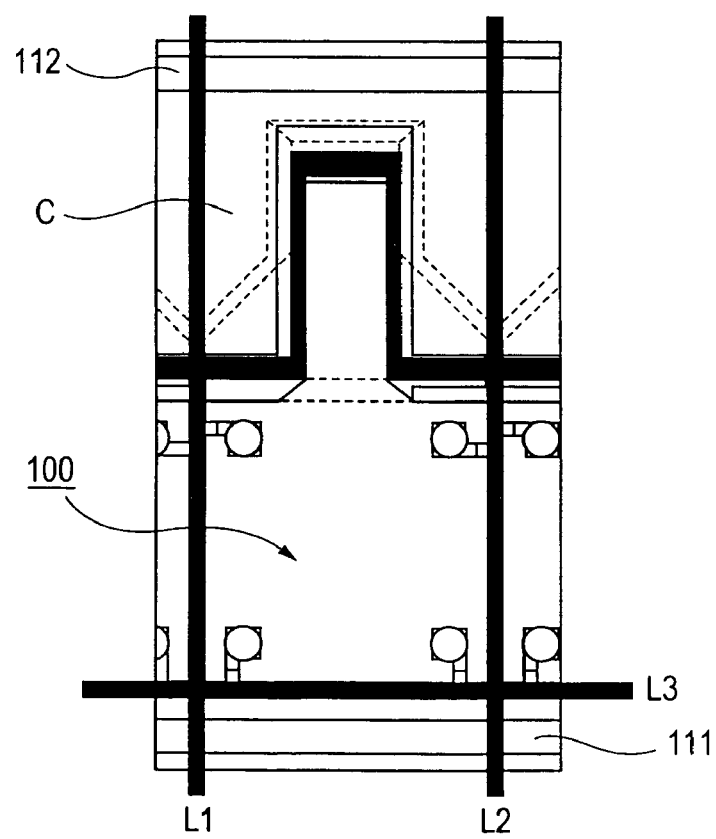
Figure 39:
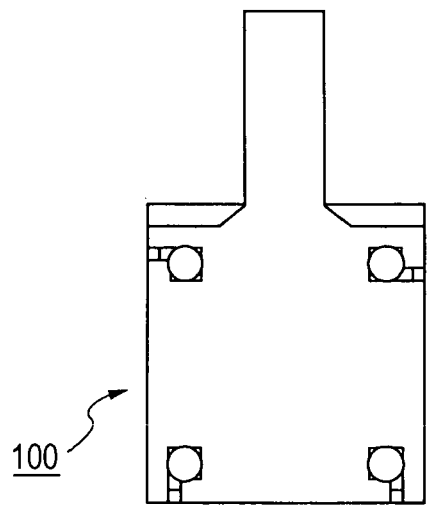
FIG. 39 illustrates a plan view of a vibrating gyroscopic sensor element that functions as a piezoelectric thin film sensor.

Next, as shown in FIGS. 38A and 38B, the fifteen vibrating gyroscopic sensor elements 100 each capable of functioning as a piezoelectric thin film sensor are formed on the Si substrate 1 and are separated from each other. When separating the vibrating gyroscopic sensor elements 100, a grinding stone having a width greater than the width of the bridge portion of the Cu leads 11 is used. In the present example, the width of the bridge portion of the Cu leads 11 was 32 μm. Therefore, the Si substrate 1 was diced using a cutting stone having a width of 40 μm. As shown in FIG. 38B, the Si substrate 1 is diced along cutting lines L1 to L3 in accordance with the size of each vibrating gyroscopic sensor element 100. The cutting lines L1 and L2 are provided so that the bridge portions of the Cu leads 11 are cut. In this way, the vibrating gyroscopic sensor element 100 that is capable of functioning as a piezoelectric thin film sensor is outlined by the penetration part 13 and the cutting surfaces, as shown in FIG. 39. As a result, an area C of the Si substrate 1, shown in FIG. 38B, is left as an unwanted part.

[Mounting]

Figure 40:
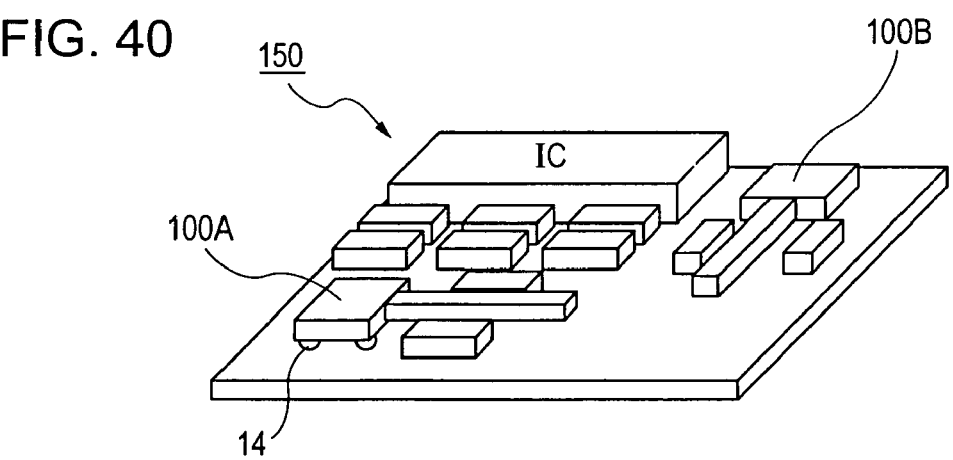
FIG. 40 illustrates a schematic perspective view of a vibrating gyroscopic sensor element mounted on an IC substrate.

As shown in FIG. 40, for example, each of the separated vibrating gyroscopic sensor element 100 is mounted on a support substrate, such as an IC substrate, by flip-chip technology. The IC substrate is designed in advance so that electrical connections can be established in accordance with the predetermined positions where the vibrating gyroscopic sensor elements 100 are to be disposed. In the example illustrated in FIG. 40, two vibrating gyroscopic sensor elements 100A and 100B are mounted in the X direction and the Y direction. In this way, a biaxial angular rate sensor 150 including the two vibrating gyroscopic sensor element 100A and 100B is configured.

Figure 41:
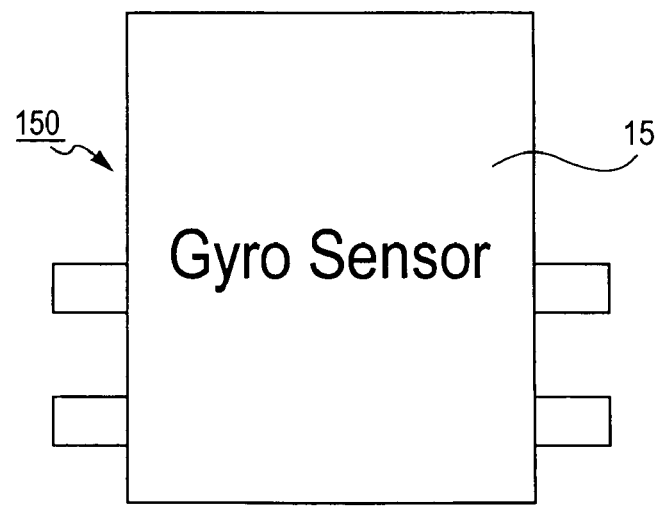
FIG. 41 illustrates a plan view of an angular rate sensor including a vibrating gyroscopic sensor element that is covered.

As shown in FIG. 41, the angular rate sensor 150 is maintained air-tight and protected by a cover material 15 that prevents the vibrating gyroscopic sensor elements 100A and 100B and circuits from coming into contact with external components. The material of the cover material 15 is not limited. However, it is desirable to take into consideration the effect of external noise and use a material, such as metal, that has a shield effect. The cover material 15 is shaped so that the vibration of the vibrating cantilever is not hindered.

[Adjustment]

For the vibrating gyroscopic sensor element 100 according to this embodiment, the external shape of the cantilever vibrator 110 is defined by RIE using ICP, as described above. However, not always all of the vibrating gyroscopic sensor elements 100 included in the Si substrate 1 are produced with perfect symmetry with respect to the centerline of the cantilever vibrator 110.

Figure 42A:
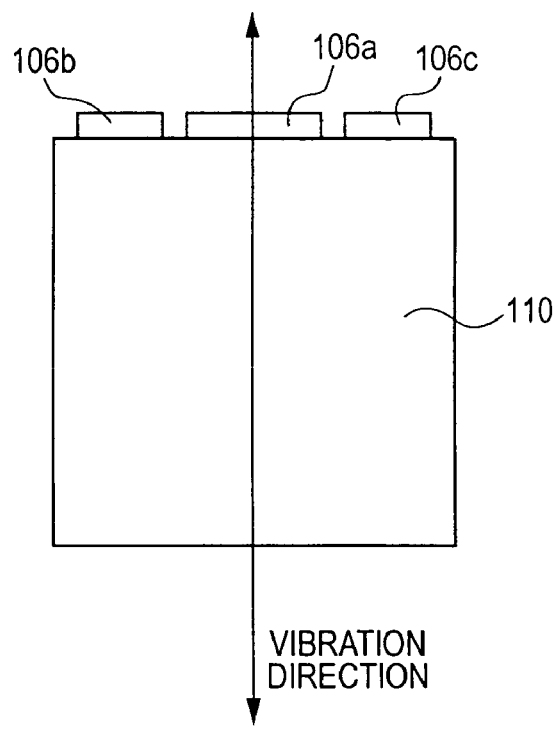
Figure 42B:
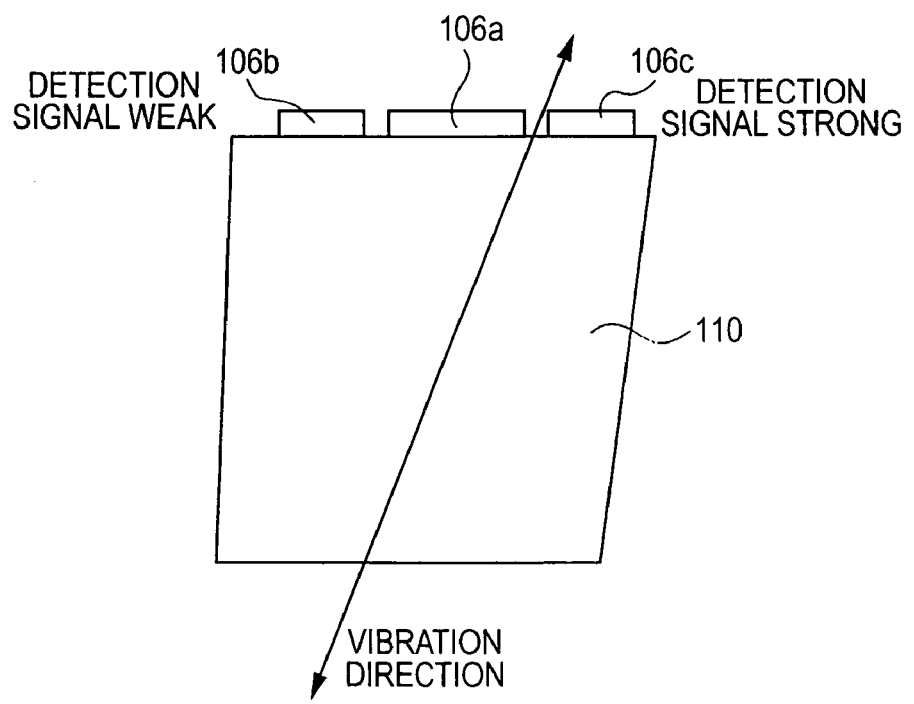

Therefore, for example, as shown in FIGS. 42A and 42B, if the cross-sectional shape of the cantilever vibrator 110 is a trapezoid, the vibration direction will be tilted toward a side with less mass with respect to the vibration center line although the direction of a desirable vertical vibration of the cantilever vibrator 110 is the direction perpendicular to the surface on which the piezoelectric film is provided. If the cantilever vibrator 110 is vibrated at a vertical resonance frequency when the vibration direction is tilted, the magnitudes of the output detection signals from the detection electrodes 106b and 106c provided symmetric with respect to the center line of the cantilever vibrator 110 will differ. This difference is caused because the detection signal from the detection electrode provided toward the tilt direction of the cantilever vibrator 110 will be strong and the detection signal from the detection electrode on the opposite side will be weak.

According to this embodiment, to compensate for this difference, adjustment is carried out to achieve vertical vibration. To adjust the vibration, laser processing is carried out on each of the separated vibrating gyroscopic sensor elements 100 to obtain to trim off some of the cantilever vibrator 110 from whichever side with respect to the center line having greater mass. In this way, the mass on the left side and mass on the right sides of the cantilever vibrator 110 are balanced and vertical vibration is obtained.

Although it is difficult to determine the actual shape of the cross-section of the cantilever vibrator 110, the magnitudes of the detection signals output from the left and right detection electrodes when the cantilever vibrator 110 is vibrated at a vertical resonance frequency can be compared. In this way, adjustment is possible by carrying out laser processing to form depressions by trimming off a section of the cantilever vibrator 110 on whichever side with the detection electrode that outputs a weaker detection signal.

Figure 43C:
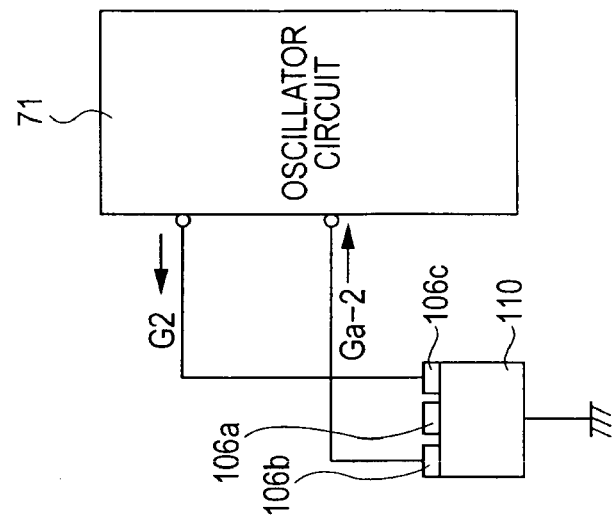
FIG. 43 illustrates the adjustment of a vibrating gyroscopic sensor.
Figure 43B:
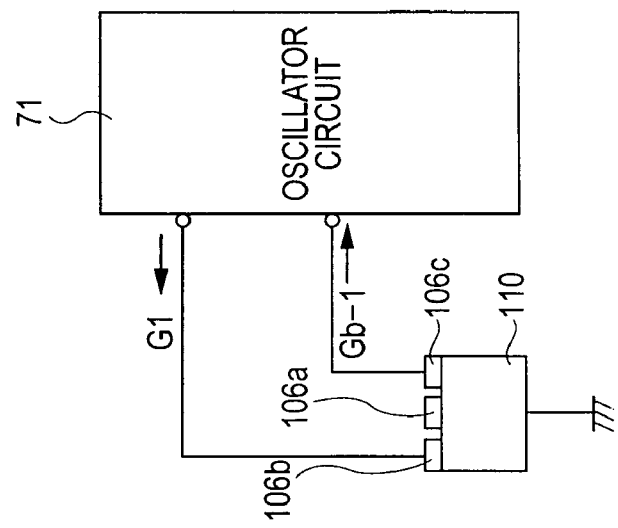
Figure 43A:
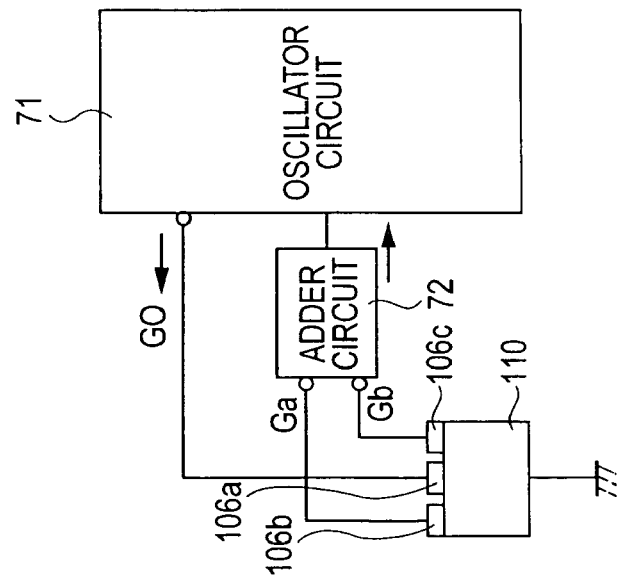

Before actually carrying out the adjustment, an oscillating output G0 from an oscillator circuit 71 is applied to the driving electrode 106a so as to drive the vibrating gyroscopic sensor element 100 in a vertical resonance state, as shown in FIG. 43A. Adjustment is carried out by adding detection signals Ga and Gb from the pair of detection electrodes 106b and 106c at an adder circuit 72. The added signal is returned to the oscillator circuit 71. Then, based on the detection signals Ga and Gb from the detection electrodes 106b and 106c, the oscillation frequency of the oscillator circuit 71 is detected as a vertical resonance frequency f0, and the difference between the detection signals Ga and Gb is output as a differential signal.

Adjustment is carried out by applying an oscillating output G1 from an oscillator circuit 71 to the driving electrode 106a so as to drive the vibrating gyroscopic sensor element 100 in a horizontal resonance state, as shown in FIG. 43B. A detection signal Gb-1 from the detection electrode 106b is returned to the oscillator circuit 71. Based on the detection signal Gb-1, the oscillation frequency of the oscillator circuit 71 is detected as a horizontal resonance frequency f1. Adjustment is carried out by applying an oscillating output G2 from an oscillator circuit 71 to the driving electrode 106a so as to drive the vibrating gyroscopic sensor element 100 in a horizontal resonance state, as shown in FIG. 43C. A detection signal Ga-2 from the detection electrode 106b is returned to the oscillator circuit 71. Based on the detection signal Ga-2, the oscillation frequency of the oscillator circuit 71 is detected as a horizontal resonance frequency f2.

Since the horizontal resonance frequency f1 detected from the detection signal Gb-1 is equal to the horizontal resonance frequency f2 detected from the detection signal Ga-2, detection can be carried out so long as either one of detection electrodes 106b and 106c is connected.

The frequency difference between the vertical resonance frequency f0 and the horizontal resonance frequencies f1 and f2 obtained above is defined as a level of detuning. For adjustment, it is determined whether or not the level of detuning is within a predetermined range. In addition, for adjustment, it is determined whether or not the differential signal obtained from the signals from the detection electrodes 106b and 106c when the cantilever vibrator 110 vibrates at a vertical resonance frequency is within a predetermined range. Adjustment is carried out by determining a laser processing area on the cantilever vibrator 110 on the basis of the determination results concerning the level of detuning and the differential signal and irradiating the laser processing area with a laser beam so as to trim off a section of the cantilever vibrator 110. For adjustment, measurement and laser processing are repeated until target values of the level of detuning and the differential signal are obtained.

A processing region where the depressions 80 are formed by carrying out laser processing on the cantilever vibrator 110 is a region excepting the front surface of the cantilever vibrator 110 where the piezoelectric film and other electrode films are provided. The processing region may be the rear surface 110b or the side surfaces of the cantilever vibrator 110, the end surfaces of the cantilever vibrator 110, as shown in FIG. 3, or the ridge line area that is the boundary between the rear surface 110b and a side surface of the cantilever vibrator 110, as shown in FIG. 44. The ridge line area connecting the front surface of the cantilever vibrator 110 and a side surface of the cantilever vibrator 110 can be included in the processing region. However, in such a case, measures should be taken, such as providing a predetermined distance between the piezoelectric film and the ridge line area of the front surface of the cantilever vibrator 110, so the piezoelectric film provided on the front surface of the cantilever vibrator 110 will not be affected by the laser processing carried out to form the depressions 80. Any number of depressions provided for adjusting the level of detuning and the differential signal (i.e., balance) may be formed. When forming a plurality of depressions 80, the number of depressions and the positions of the depressions 80 can be selected while confirming the effect on the vibration. In this way, adjustment can be gradually carried out until the target values are finally achieved.

The effectiveness of adjustment by laser processing is determined by the positions and range to be processed. As shown in FIG. 44, laser processing areas A, B, and C where the depressions 80 are formed may be defined on the ridge line area from the tip to the base of the cantilever vibrator 110. Since the amounts of change in the level of detuning and the balance of the detection signals become smaller from the base to the tip of the cantilever vibrator 110, course adjustment can be carried out by forming the depressions 80 in a laser processing area closer to the base of the cantilever vibrator 110 and fine adjustment can be carried out by forming the depressions 80 in a laser processing area closer to the tip. Here, the total amount of processing carried out in the depth direction and the longitudinal direction of the cantilever vibrator 110 is defined as an "amount of laser processing." Accordingly, the amount of laser processing is great if a large but shallow area is processed. Similarly, the amount of laser processing is great if a small but deep area is processed.

Figure 45:
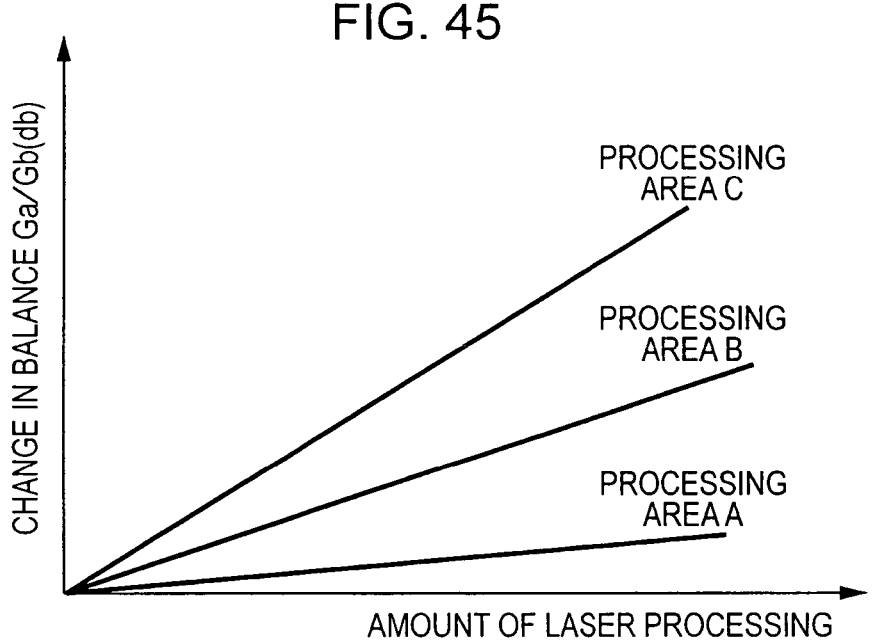
FIG. 45 illustrates the relationship between the amount of laser processing carried out at a laser processing area and the change in signal balance.
Figure 46:
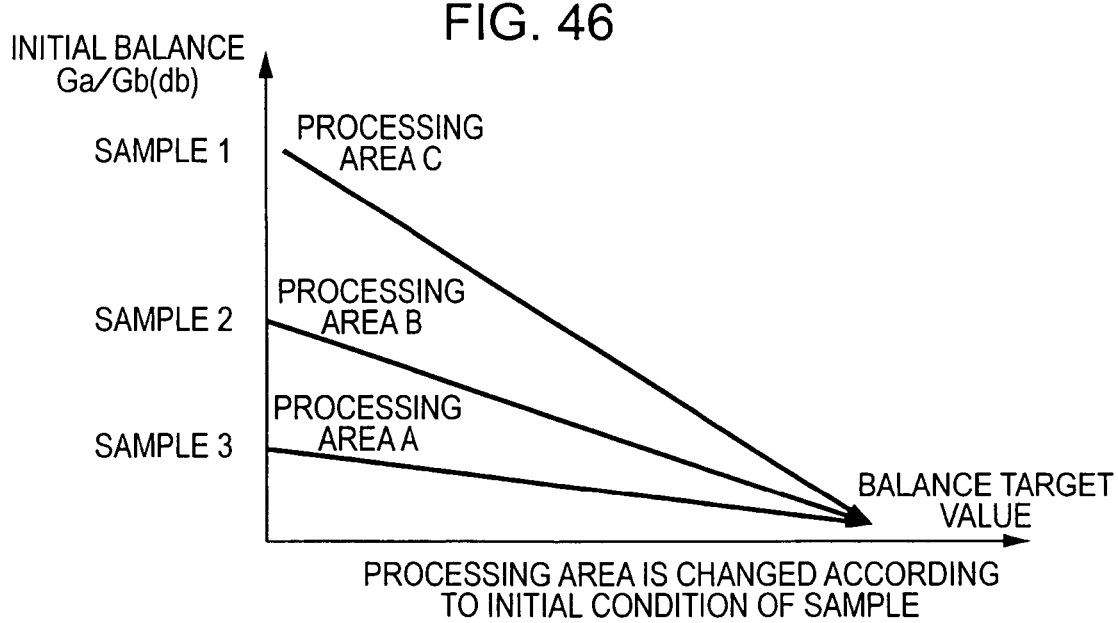
FIG. 46 illustrates the change in balance when balance is adjusted to a target value by determining a laser processing area on the basis of the initial conditions of the samples and by carrying out laser processing.

FIG. 45 illustrates the relationship between the amount of laser processing carried out for forming the depressions 80 and the change in balance [(Ga/Gb)db] at the laser processing areas A, B, and C. FIG. 46 illustrates the changes in balance [(Ga/Gb)db] when the balance is adjusted to a target value by selecting one of the laser processing areas A, B, and C to form the depression 80 on basis of the initial conditions of samples 1, 2, and 3 and then carrying out laser processing.

It is most effective to select a laser processing area for forming the depression 80 on the cantilever vibrator 110 by laser processing in the vicinity of the fixed end of the cantilever vibrator 110. However, the shape of the laser processing area is not limited. The shape and mass of the section of the cantilever vibrator 110 to be removed by laser processing may be gradually adjusted by comparing the left and right detection signals.

Figure 47:
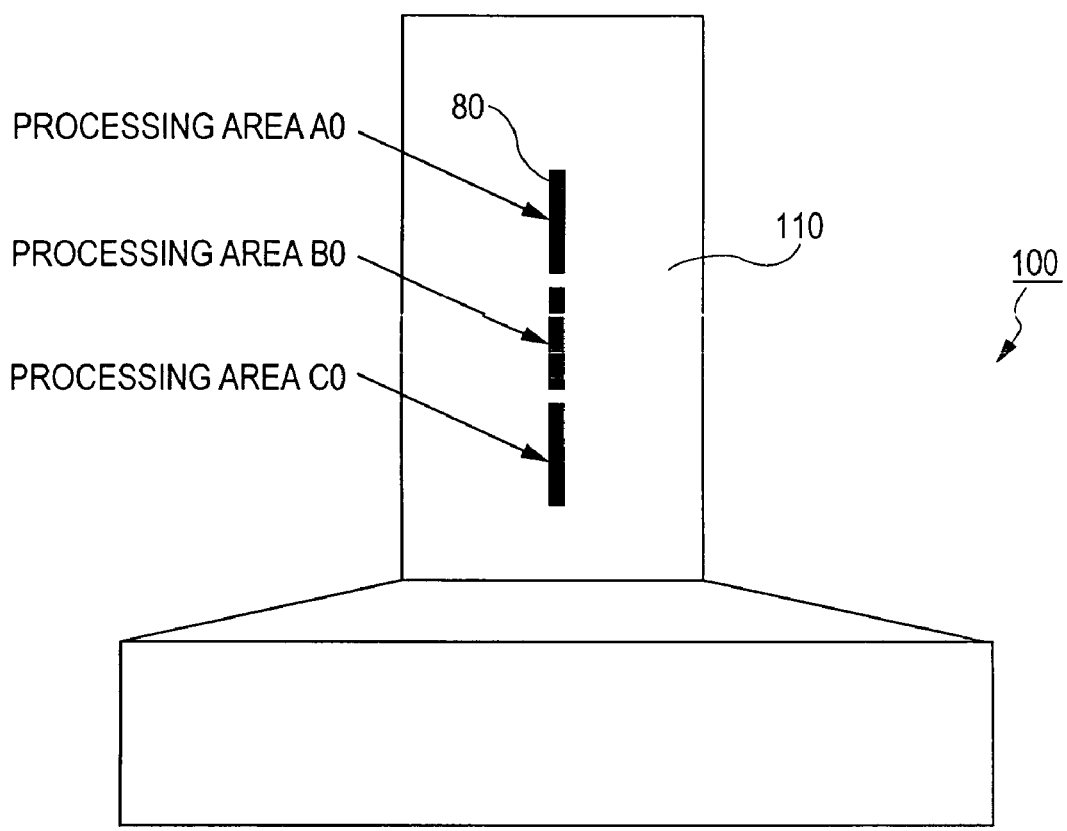
FIG. 47 illustrates a schematic plan view of laser processing areas provided at the center of the rear surface of a cantilever vibrator for laser processing.
Figure 48:
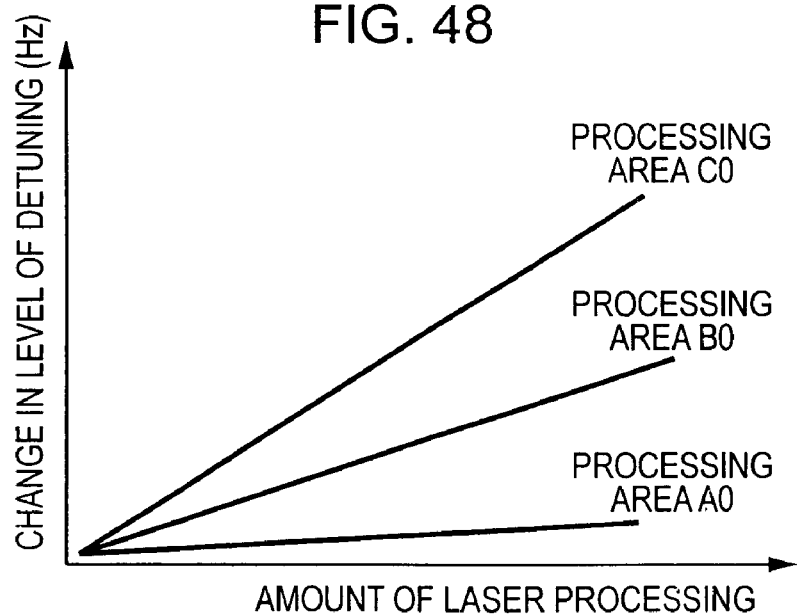
FIG. 48 illustrates the relationship between the amount of laser processing and the change in the level of detuning at laser processing areas.
Figure 49:
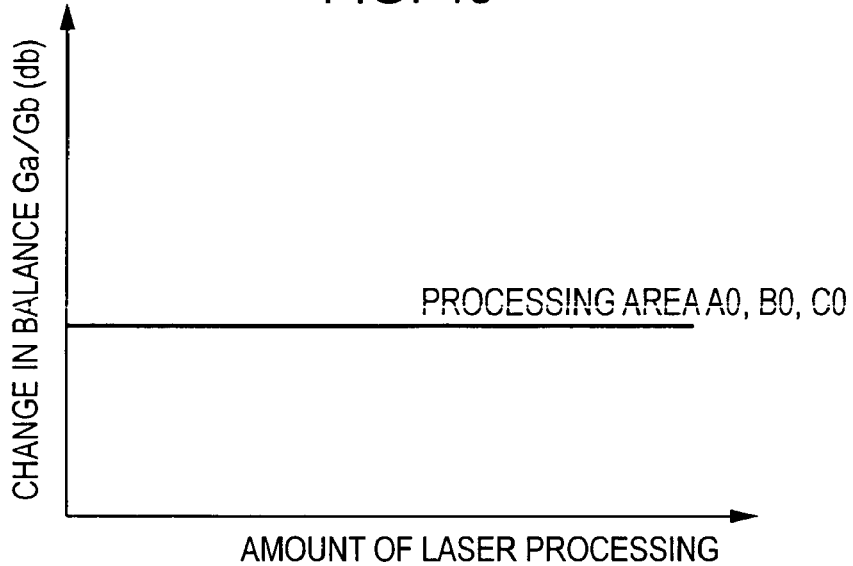
FIG. 49 illustrates the relationship between the amount of laser processing and the change in balance at laser processing areas.
Figure 50:
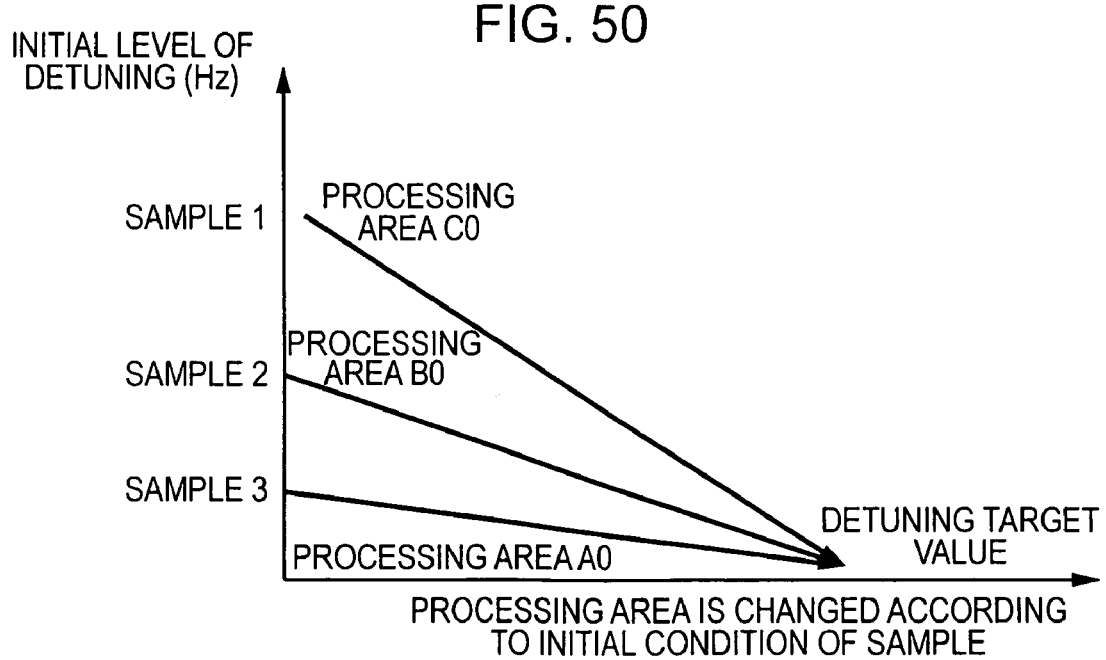
FIG. 50 illustrates the change in the level of detuning when the level of detuning is adjusted to a target value by determining a laser processing area on the basis of the initial conditions of the samples and by carrying out laser processing.

Next, as shown in FIG. 47, laser processing areas A0, B0, and C0 where the depressions 80 are formed are defined from the top to the base of the cantilever vibrator 110 along the center of the rear surface 110b (i.e., along the center axial line) of the cantilever vibrator 110. The relationship between the amount of laser processing and the change in the level of detuning [Hz] at each laser processing areas A0, B0, and C0 is illustrated in FIG. 48. The closer the laser processing area is to the base of the cantilever vibrator 110, the greater the change in the level of detuning. The relationship between the amount of laser processing and the change in balance [(Ga/Gb)db] at each laser processing areas A0, B0, and C0 is illustrated in FIG. 49. Regardless of the laser processing area, the balance [(Ga/Gb)=1] does not change. FIG. 50 illustrates the change that occurs when the balance is adjusted to a target value by selecting one of the laser processing areas A0, B0, and C0 on basis of the initial conditions of samples 1, 2, and 3 and then carrying out laser processing.

Figure 51:
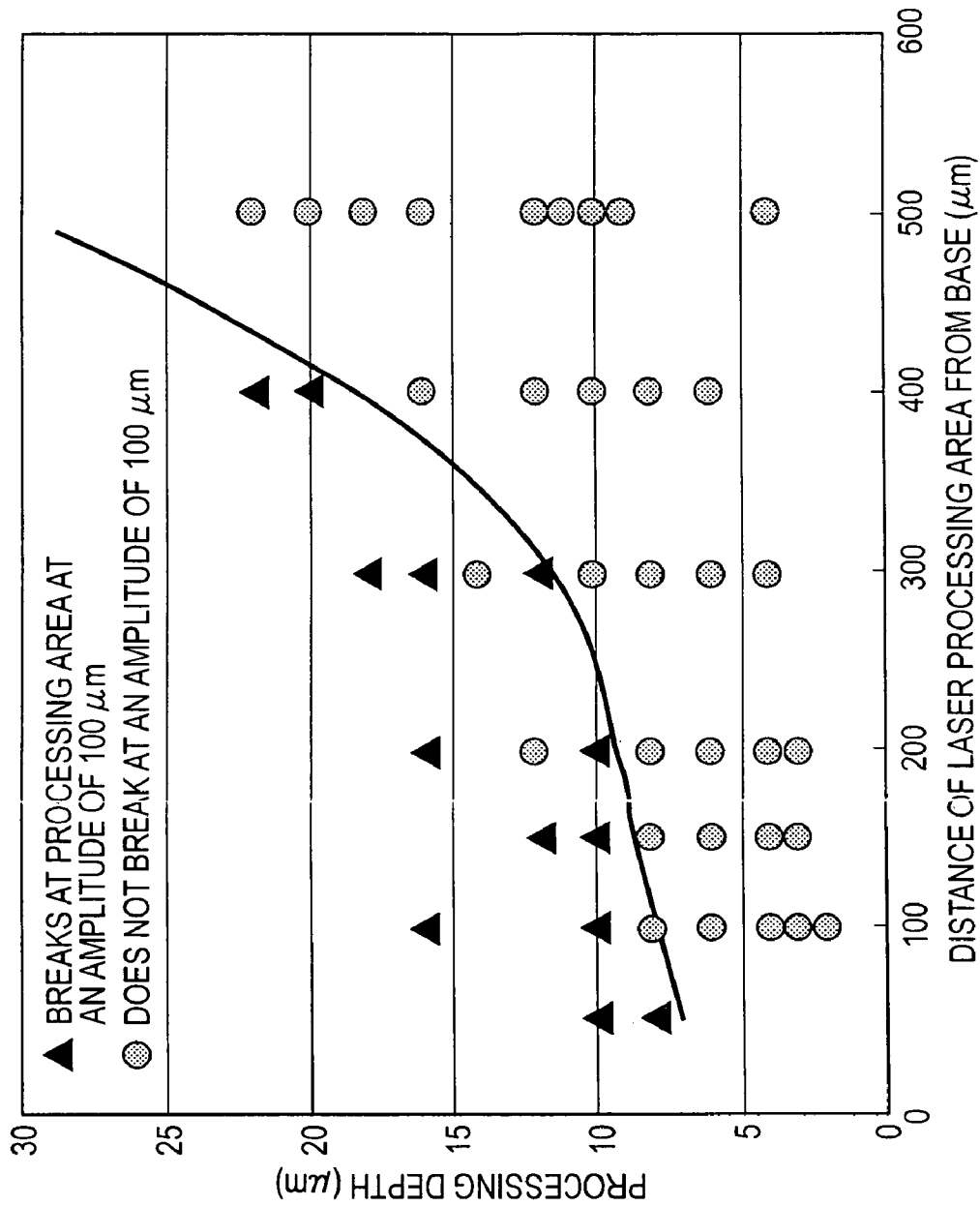
FIG. 51 illustrates the results of an experiment conducted to determine whether or not a cantilever vibrator that has been adjusted by laser processing breaks at the spot formed by a laser processing when the vibrator is vibrated at an amplitude of 100 μm.

FIG. 51 illustrates the results of an experiment conducted to determining whether or not the cantilever vibrator 110 will break at a laser processing area that has been processed by a laser beam for adjustment when the cantilever vibrator 110 is driven at a vibration amplitude of 100 μm.

In FIG. 51, the triangular points plotted on the graph the cantilever vibrator 110 broke from the laser processing area when driven at a vibration amplitude of less than 100 μm. The results illustrated in FIG. 51 indicate that the cantilever vibrator 110 breaks easier when deep processing is carried out near the base of the cantilever vibrator 110.

Figure 52:
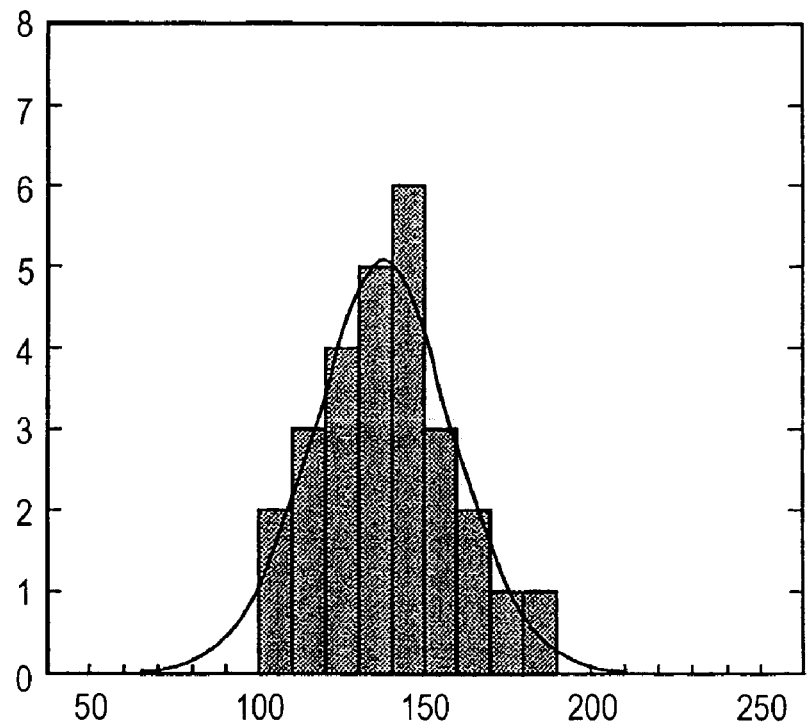
FIG. 52 illustrates a histogram showing the heights at which the vibrator breaks when a gyroscopic sensor including a non-processed vibrator is attached to a 200-g rigid body and dropped.
Figure 53:
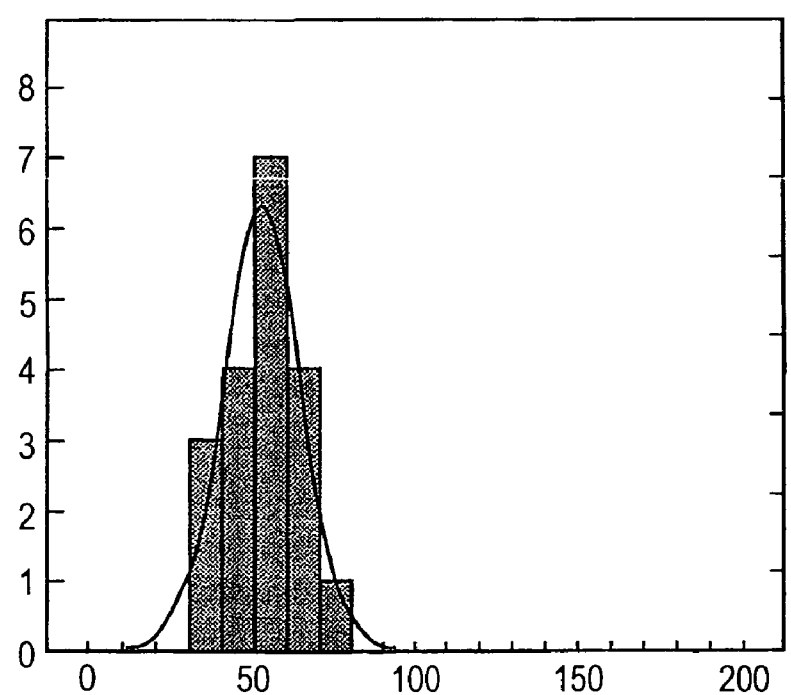
FIG. 53 illustrates a histogram showing the heights at which the vibrator breaks when a gyroscopic sensor including a cantilever vibrator processed with a laser within the range including the triangular points shown in FIG. 51 is attached to a 200-g rigid body and dropped.
Figure 54:
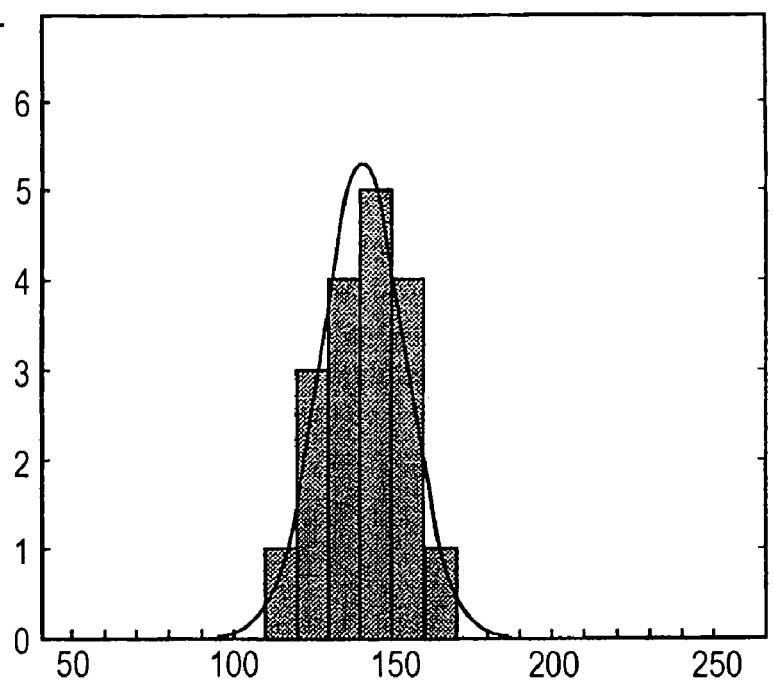
FIG. 54 illustrates a histogram showing the heights at which the vibrator breaks when a gyroscopic sensor including a cantilever vibrator processed with a laser within the range including the circular points shown in FIG. 51 is attached to a 200-g rigid body and dropped.

FIGS. 52, 53, and 54 illustrate histograms showing the heights at which the cantilever vibrator 110 breaks when a 200-g rigid body on which a gyroscopic sensor including the cantilever vibrator 110 is attached is dropped for vibrators not processed, vibrators on which laser processing is carried out within the range including the triangular points in FIG. 51, and vibrators on which laser processing is carried out within the range including the circular points in FIG. 51.

As shown in FIG. 52, for a cantilever vibrator not processed with a laser beam breaks when dropped from a height about 150 cm. In other words, a 100-μm prism of silicon, which constitutes a cantilever vibrator, has the strength represented by FIG. 52. For a cantilever vibrator processed with a laser beam within the range including the triangular points in FIG. 51, the cantilever vibrator breaks when dropped from a height of about 50 cm. In other words, the strength against external impact of this cantilever vibrator is reduced by half when compared to an unprocessed cantilever vibrator. The breaking originates from the laser processing area of the cantilever vibrator.

For the cantilever vibrator processed with a laser beam within the range including the circular points in FIG. 51, the cantilever vibrator does not break until a height of about 150 cm is reached, and the same strength as that of an unprocessed cantilever vibrator is maintained.

In this case, the cantilever vibrator 110 does not break at a laser processing area but breaks from the base of the cantilever vibrator 110 where there is maximum stress concentration. In other words, FIG. 54 indicated that the breaking occurred at an area where no more increase in strength can be expected so long as a cantilever vibrator 110 having a size according to the present example is used.

Figure 55:
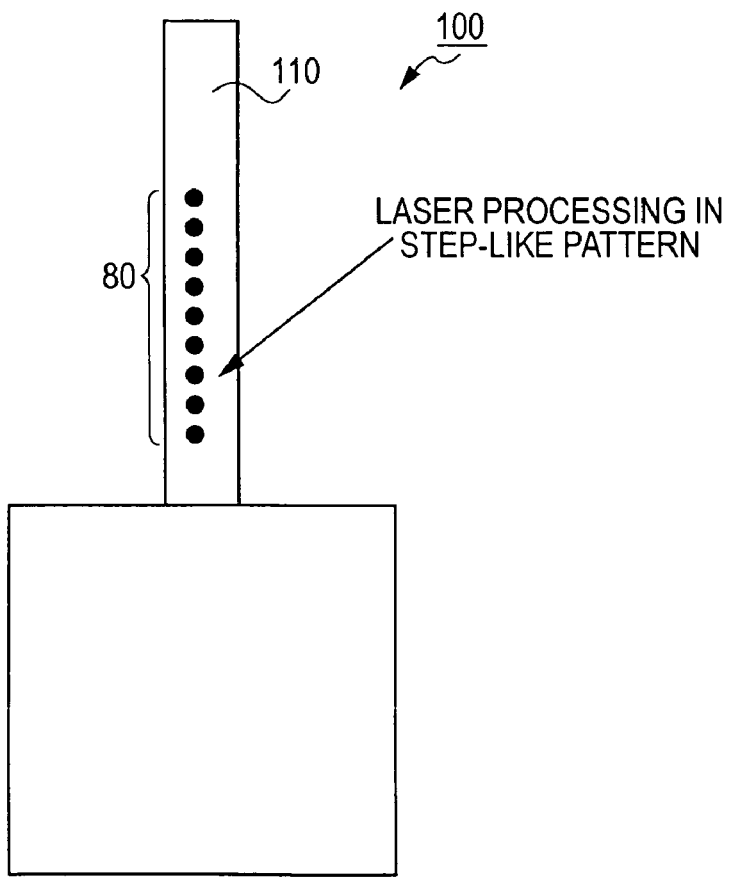
FIG. 55 illustrates a cantilever vibrator having laser-processed spots that do not overlap each other in a step-like pattern.
Figure 56:
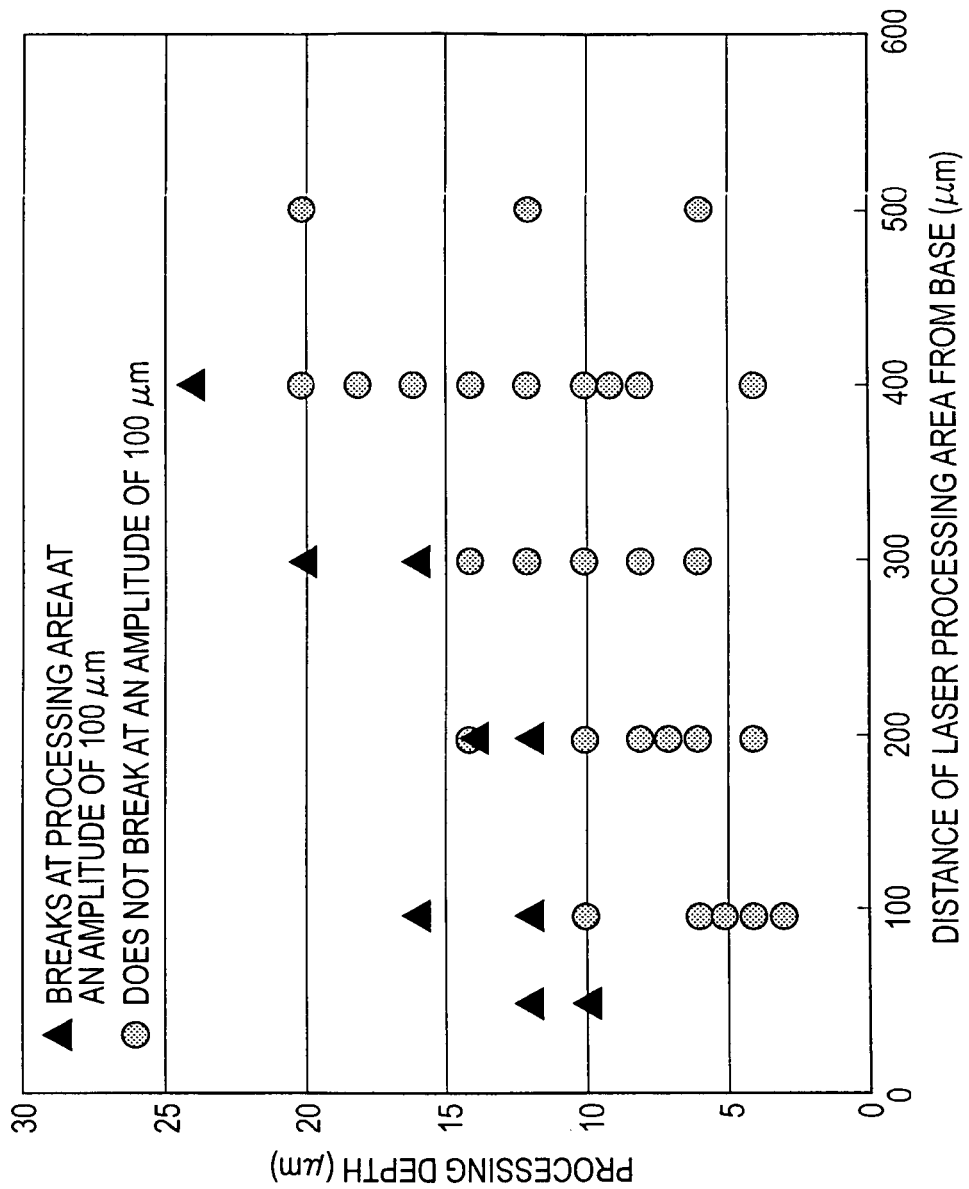
FIG. 56 illustrates a histogram showing the heights at which a cantilever vibrator having laser-processed spots provided in a step-like pattern breaks when a gyroscopic sensor including a non-processed vibrator is attached to a 200-g rigid body and dropped.

When the laser-processed spots do not overlap and are provided in a step-like pattern, as shown in FIG. 55, the area where the cantilever vibrator 110 breaks when driven at a vibration amplitude of 100 μm or less becomes smaller, as shown in FIG. 56. Unlike the case shown in FIG. 51, the cantilever vibrator 110 does not break at the position indicated in FIG. 51 even when the depth of the laser processing is increased. In other words, the strength of the cantilever vibrator 110 increases by processing the cantilever vibrator 110 in a step-like pattern.

However, even when the cantilever vibrator 110 is processed in a step-like pattern, the strength of the cantilever vibrator 110 against breaking does not change when an area within 100 μm from the base of the cantilever vibrator 110 is processed. It is assumed that this area within 100 μm from the base has a significantly low tolerance against laser processing. Therefore, it is desirable not to carrying out laser processing in the area within 100 μm from the base of the cantilever vibrator 110.

According to the results described above, it is desirable not to carry out laser processing in an area within 100 μm from the base of the cantilever vibrator 110, and it is desirable to carry out deeper laser processing as the laser processing area is provided further away from the base of the cantilever vibrator 110. If laser processing is carried out in such a manner, the strength of the cantilever vibrator 110 will be substantially the same as that of a non-processed cantilever vibrator. A stress of about 0.5 GPa is applied to the base of the cantilever vibrator 110 when the vibration amplitude of the cantilever vibrator 110 is 100 μm.

Since the laser processing area and the depth of laser processing depend on the size of the cantilever vibrator, tests are carried out on a cantilever vibrator having the same shape as the cantilever vibrator to be used. Then, based on the test results indicating the positions and depth of laser processing that can be carried out without causing the cantilever vibrator to break, laser processing can be carried out on the actual cantilever vibrator to be used.

Figure 57:
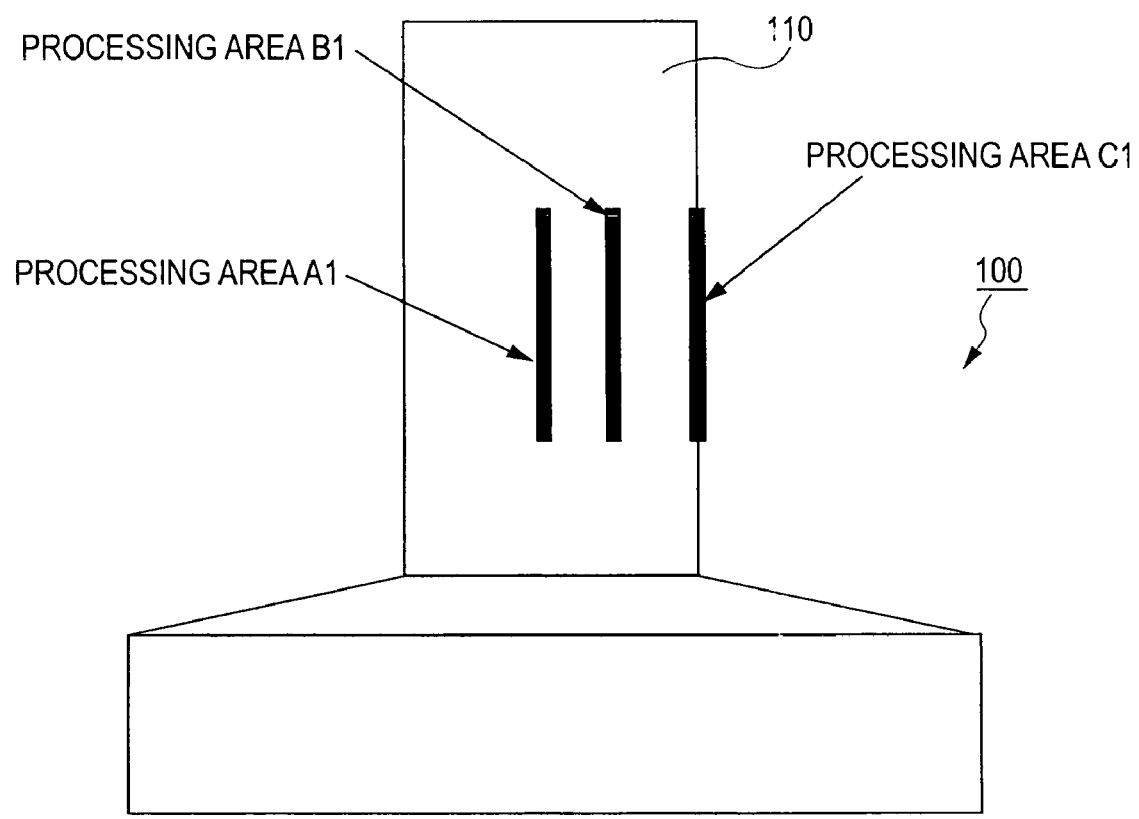
FIG. 57 illustrates a schematic plan view of laser processing areas provided at positions misaligned with the center of the rear surface of a cantilever vibrator for laser processing.
Figure 58:
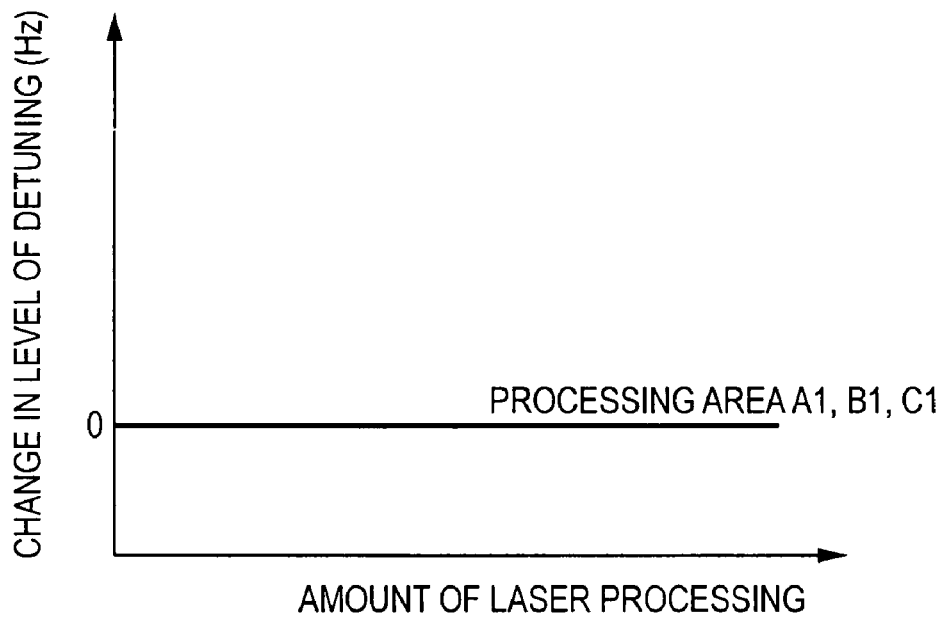
FIG. 58 illustrates the relationship between the amount of laser processing carried out at a laser processing area and the change in the level of detuning.
Figure 59:
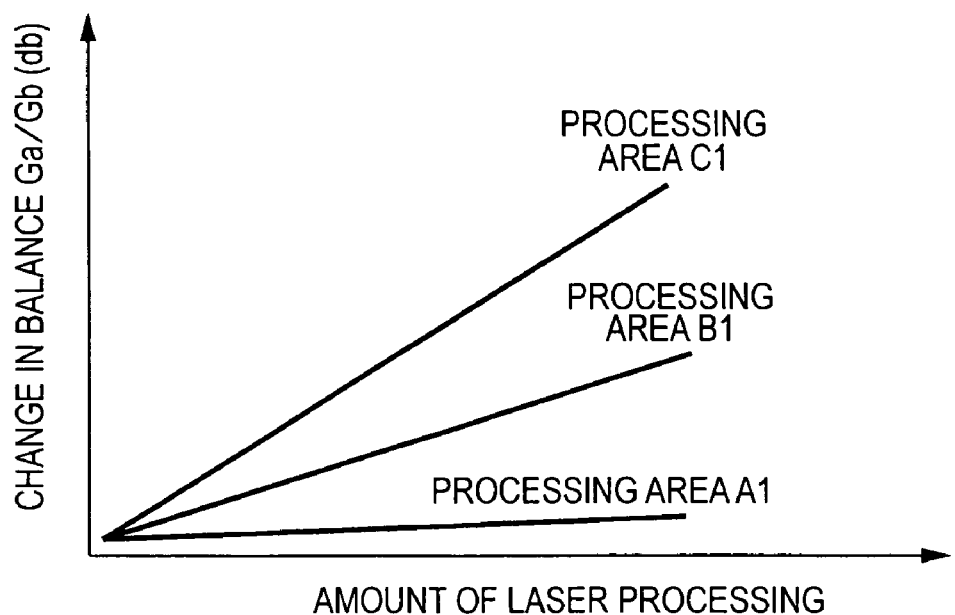
FIG. 59 illustrates the relationship between the amount of laser processing carried out at a laser processing area and the change in the signal balance.

Next, as shown in FIG. 57, laser processing areas A1, B1, and C1 are defined from the center toward the outer side (along the center axial line) of the rear surface 110*b* of the cantilever vibrator 110. The relationships between the amount of laser processing and the change [Hz] in the levels of detuning at the laser processing areas A1, B1, and C1 are illustrated in FIG. 58. Regardless of the laser processing area, the level of detuning does not change. However, the level of detuning changes when laser processing is carried out for a substantial length in the longitudinal direction of the cantilever vibrator 110. In such a case, the change in the levels of detuning at the laser processing areas is the same between any of the laser processing areas A1, B1, and C1. The relationship between the amount of laser processing and the change in balance [(Ga/Gb)db] at each of the laser processing areas A1, B1, and C1 is illustrated in FIG. 59. The change in balance becomes greater from the center toward the outer side of the cantilever vibrator 110.

Figure 60:
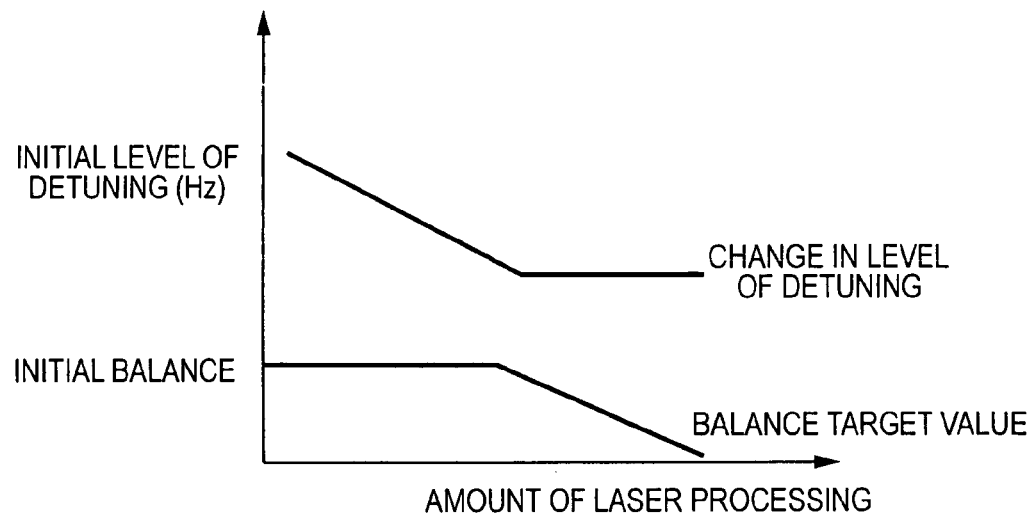
FIG. 60 illustrates the change in the level of detuning and balance due to laser processing.
Figure 61:
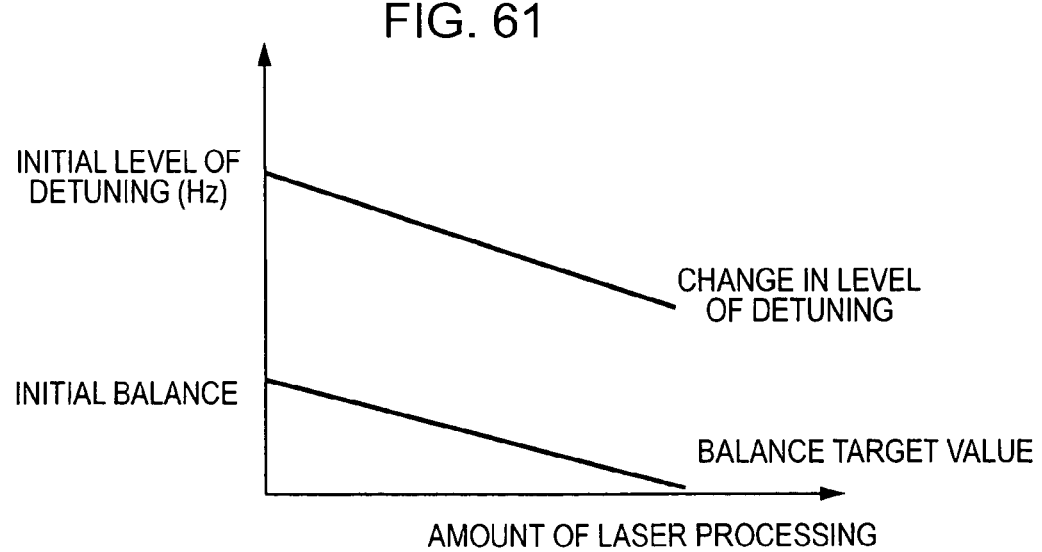
FIG. 61 illustrates the change in the level of detuning and balance due to laser processing.

FIG. 60 illustrates the changes in the level of detuning and the balance due to laser processing carried out on each of the laser processing areas A1, B1, and C1. FIG. 61 illustrates the changes in the level of detuning and the balance due to laser processing carried out on the laser processing area B1. The case shown in FIG. 61 indicates that adjustments of the level of detuning and adjustments of the balance between the left and right detection signals can be carried out simultaneously with common depressions. More specifically, adjustment of the level of detuning and adjustment of the balance between the left and right detection signals can be carried out simultaneously by forming a first depression for adjusting the level of detuning and a second depression for adjusting the balance with common depressions. According to this method, since adjustment of the level of detuning and adjustment of the balance between the left and right detection signals can be carried out simultaneously, the time required for adjustment can be reduced, and also the number of depressions can be reduced, preventing a decrease in the mechanical strength of the cantilever vibrator 110.

The shape of the depressions 80 for adjusting the level of detuning and balance is not limited to a straight line as shown in FIG. 57. Instead, depressions 80 may be provided as a plurality of laser-processed spots in a step-like pattern, as shown in FIG. 55. By providing the depressions 80 in a step-like pattern, the above-mentioned mechanical strength of the vibrator may be increased and highly accurate adjustment will be possible since the laser processing area and the amount of laser processing can be increased. By proving the laser processing area for the depressions 80 on a side surface of the cantilever vibrator 110, not only adjustment of balance but also adjustment of the level of detuning can be carried out at the same time. The processing region is not limited to one side surface of the cantilever vibrator 110 and, for example, one depression 80 may be formed on at least one of the rear surface, the side surfaces, and the ridge line area to adjust the vibration. When a plurality of depressions 80 are provided as spots in a step-like pattern, the depressions 80 do not have to be commonly used for both adjustment of the level of detuning and adjustment of the balance, as described above. Instead, a plurality of depressions 80 for adjusting only the level of detuning or only the balance may be formed.

According to this embodiment, even when the cantilever vibrator 110 vibrates at a tilted angle, the vibration can be adjusted so that a desirable vertical vibration is obtained and the magnitudes of the left and right detection signals at a vertical resonance frequency can be controlled and adjusted to equal each other. More specifically, by adjusting the differences in frequencies and the differences in the magnitudes of left and right detection signals at a vertical resonance frequency due to a shape defection of the cantilever vibrator 110, a vibrating gyroscopic sensor element 100 having a stable detection ability can be easily obtained. By carrying out adjustment by changing the laser processing area, the number of times laser processing is carried out and the time required for adjustment can be reduced. By reducing the number of times laser processing is carried out, a highly reliable cantilever vibrator for an angular rate sensor can be produced. By employing an algorithm for the adjustment process, and automatic adjustment apparatus may be manufactured to improve productivity.

Second Embodiment

As described above, to adjust a vibrating gyroscopic sensor element according to an embodiment of the present invention, laser processing is carried out on the rear surface 110b of a cantilever vibrator 110 included in a vibrating gyroscopic sensor element 100 mounted on a support substrate 20, as shown in FIG. 3, to a degree so that the target vibration characteristics are obtained.

There are mainly two items of the cantilever vibrator 110 to be adjusted: the frequency difference between the vertical resonance frequency and the horizontal resonance frequency and the difference in the magnitudes of the left and right detection signals. By adjusting the frequency difference, the sensitivity of the sensor can be improved, whereas by adjusting the difference in left and right detection signals, noise of the sensor can be reduced.

In the above-described first embodiment, the magnitudes of the left and right detection signals when the cantilever vibrator 110 vibrates at a vertical resonance frequency are compared, and depressions are formed by laser processing on the section of the cantilever vibrator 110 including the detection electrode outputting the detection signal with the smaller magnitude. In this way, the cantilever vibrator 110 is adjusted to a vibration mode in the perpendicular direction. In other words, according to the first embodiment, the amplitudes and the phases of the left and right detection signals are matched only based on the operating frequency (vertical resonance frequency). When the left and right detection signals match, the cantilever vibrator 110 is considered to be adjusted to a vibrate mode in the perpendicular direction.

Figure 62A:
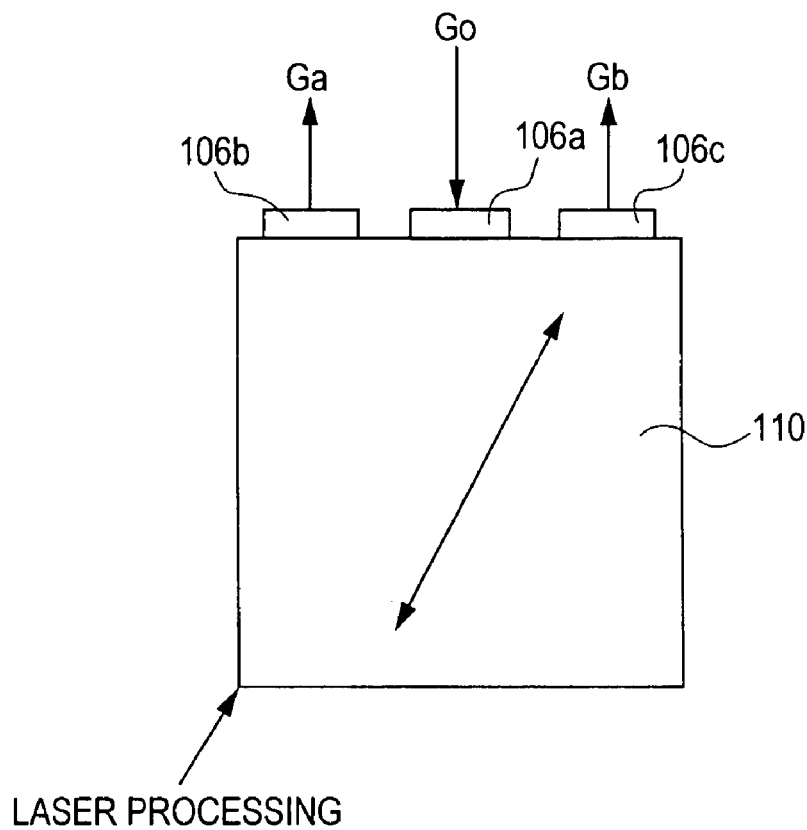
Figure 62B:
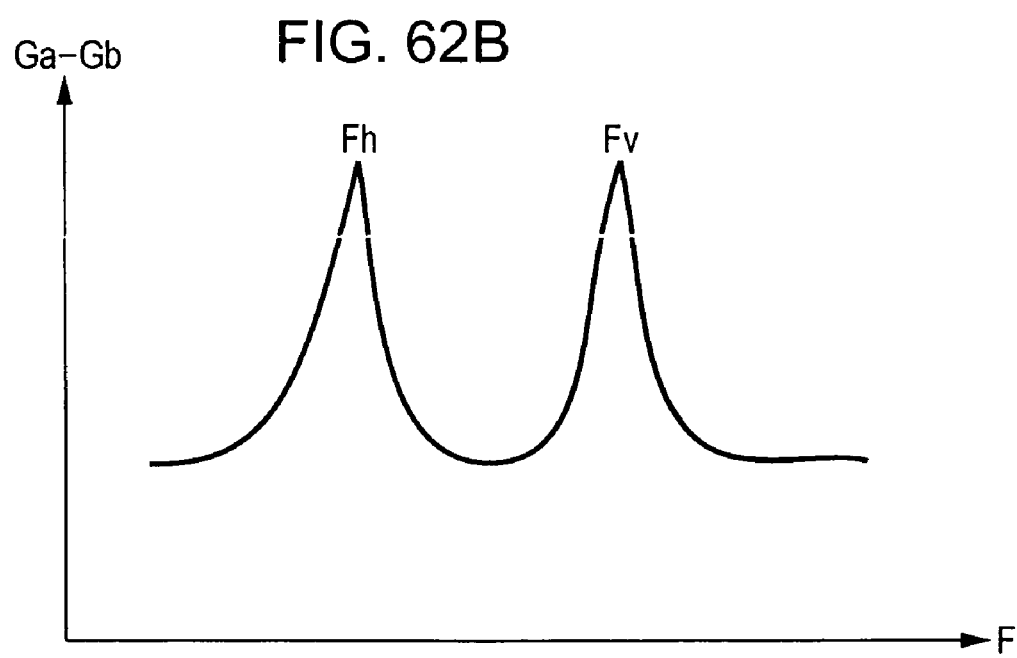
Figure 63A:
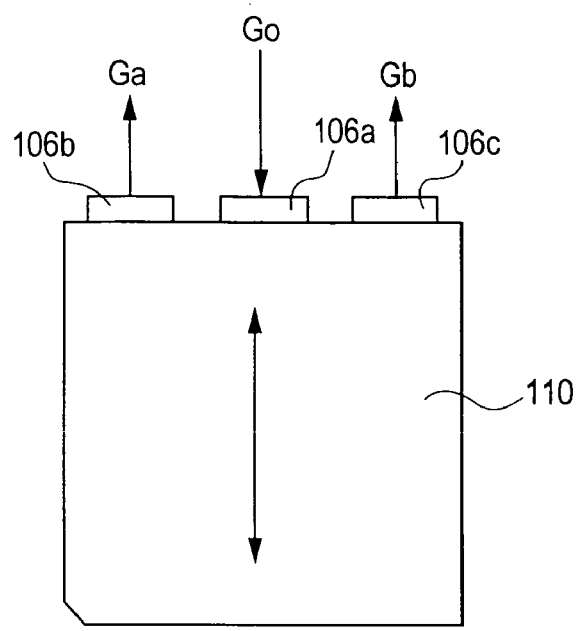
Figure 63B:
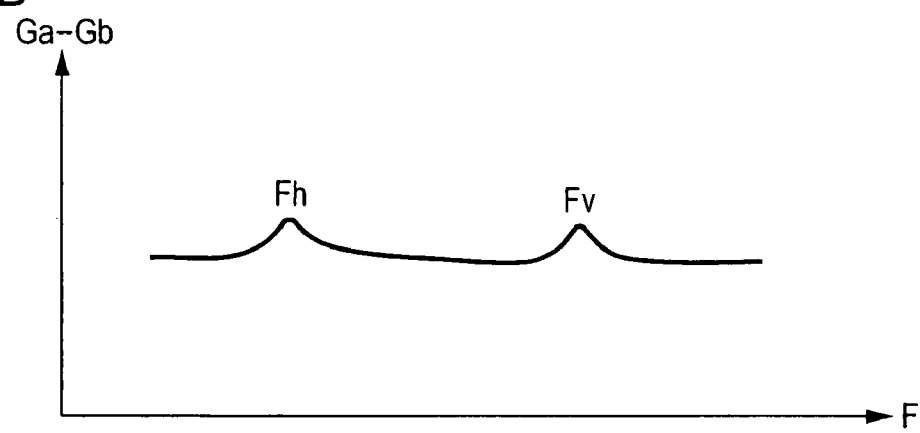

AF shown in FIG. 62A, when the cantilever vibrator 110 vibrates in a tilted angle, there is a difference between the left and right detection signals (Ga<Gb). FIG. 62B illustrates the frequency characteristic of a differential signal (Ga−Gb) [dbm]. In this case, a noticeable peak appears at a horizontal resonance frequency Fh. A vertical resonance frequency Fv is the operating frequency of the cantilever vibrator 110. According to the first embodiment described above, only the operating frequency (vertical resonance frequency Fv) is taken into consideration, and a laser processing area for reducing the peak level is selected on the rear surface 110b of the cantilever vibrator 110 to irradiate this area with a laser beam to form a depression (hereinafter this process is referred to as "laser trimming"). In this way, the vibration of the cantilever vibrator 110 is adjusted to a vibration mode in the perpendicular direction, as shown in FIG. 63A, reducing the difference in the magnitudes of the left and right detection signals. As shown in FIG. 63B, the difference in the magnitudes of the left and right detection signals is minimized for both points Fv and Fh.

However, the difference in the magnitudes of the left and right detection signals can be reduced, as shown in FIG. 63B, by adjusting the vibration to a vibration mode in the perpendicular direction only when the magnitudes of the left and right detection signals output from a cantilever vibrator 110 vibrating in the perpendicular direction are originally the same. In other words, since the detection electrodes for outputting the detection signals are stacked on a piezoelectric film disposed on the front surface of the cantilever vibrator 110, in some cases, the piezoelectric film is provided in an asymmetric manner for some reason caused during the process of producing a cantilever vibrator 110. The main reason for such asymmetry is a change in the thickness and/or composition of the piezoelectric film that occurs depending on the positioning of the wafer (substrate) since a plurality of cantilever vibrators 110 are produced at once from one silicon substrate.

Figure 63C:
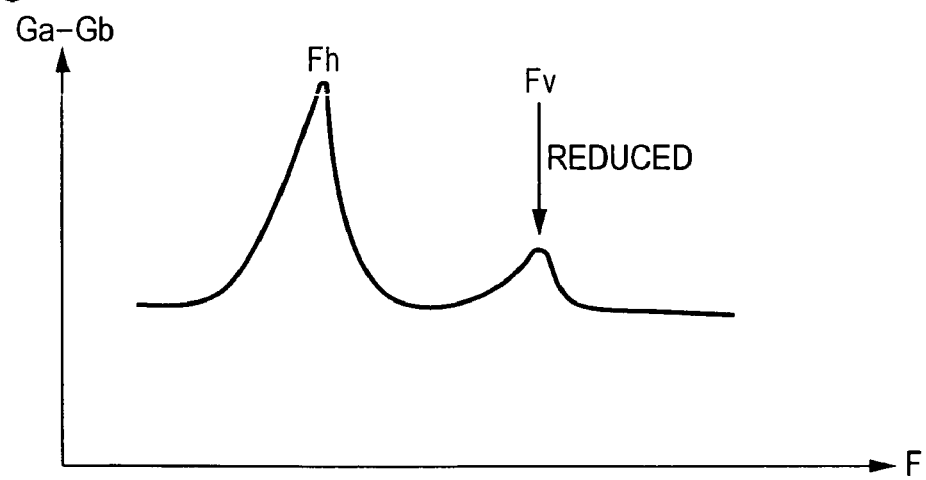

Therefore, as described above, for a cantilever vibrator 110 having a difference in the left and right detection signals, the peak level of the horizontal resonance frequency Fh normally cannot be reduced even when laser trimming based on the operating frequency (vertical resonance frequency Fv) is carried out, as shown in FIG. 63C. If a vibrating gyroscopic sensor is constructed using such a cantilever vibrator 110, the sensor will be easily affected by noise from the outside, and, as a result, the sensor output will be degraded. The mechanism of the degradation of the sensor output will be described below.

Figure 64:
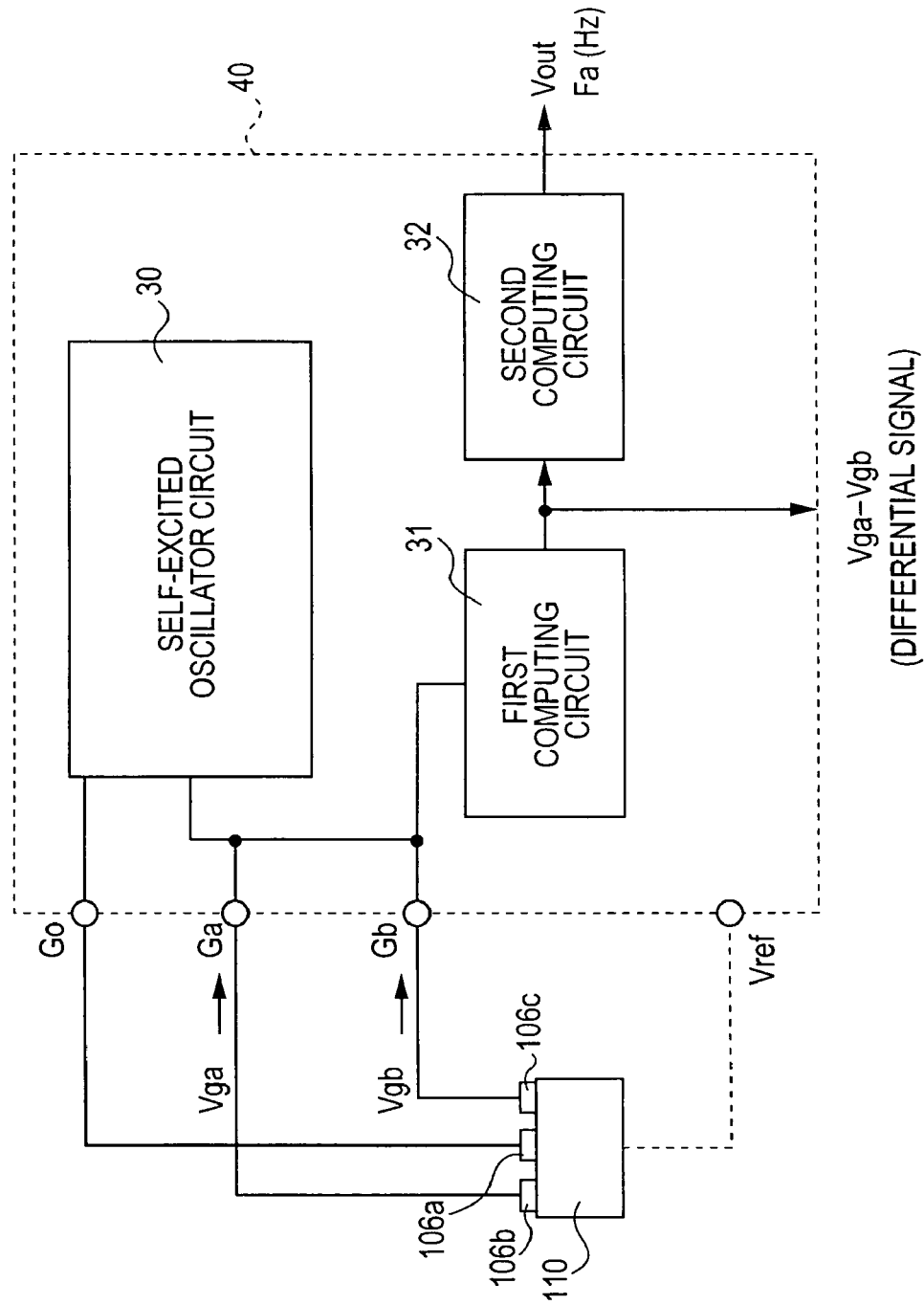
FIG. 64 illustrates a functional block diagram of a driving detection circuit configured to drive a cantilever vibrator.

As shown in FIG. 64, a G0 terminal of an IC 40 is connected to a driving electrode 106a of a cantilever vibrator 110 to apply a driving signal having a frequency F0 to a vibrating gyroscopic sensor according to this embodiment. A first detection electrode 106b is connected to a Ga terminal of the IC 40 to output a detection signal Vga, whereas a second detection electrode 106c is connected to a Gb terminal of the IC 40 to output a detection signal Vgb. At the IC 40, a self-excited oscillator circuit 30 includes an adder circuit 41, an amplifier circuit 42, a phase-shift circuit 43, and an auto gain controller 44, all described with reference to FIG. 5. In FIG. 64, a first computing circuit 31 is equivalent to the differential amplifier circuit 45 in FIG. 5, and a second computing circuit 32 is equivalent to the synchronous detection circuit 46 and the smoothing circuit 47 in FIG. 5.

The cantilever vibrator 110 vibrates when it receives an input signal Vg0 and outputs detection signals Vga and Vgb from the detection electrodes 106b and 106c, respectively. Amplitude modulation is carried out on the detection signals to generate a differential signal (Vga-Vgb). The differential signal is converted into a direct current at the second computing circuit 32 and is output to detect the angular rate applied to the cantilever vibrator 110. At this time, if a disturbance noise having a frequency Fa affects the input signal of the cantilever vibrator 110, the cantilever vibrator 110 vibrates at a frequency of the input signal including the noise frequency Fa (F0±Fa). Consequently, a frequency component F0±Fa will be included in the differential signal for the detection signals (Vga−Vgb). As a result, an output signal including a superimposed noise signal Fa will be output from the second computing circuit 32.

As described above, if the vibration of the cantilever vibrator 110 is in a state that allows the frequency component F0±Fa to be easily generated, the output from the sensor will be greatly affected by noise, and the detection accuracy of the angular rate will be reduced (i.e., the suppression ratio will be degraded). A state in which the vibration of the cantilever vibrator 110 allows the frequency component F0±Fa to be easily generated is a state where a peak is observed in a frequency band between about 200 to 300 Hz in the vicinity of the operating frequency (vertical resonance frequency Fv), wherein the peak is not at the operating frequency. Normally, to maintain the vibration characteristics of a cantilever vibrator used in an angular rate sensor, the horizontal resonance frequency Fh is set in the vicinity of the vertical resonance frequency Fv. The difference in the vertical resonance frequency Fv and the horizontal resonance frequency Fh is the level of detuning. The sensor output is easily affected by a disturbance noise having a frequency in the vicinity of the frequency corresponding to the level of detuning.

Figure 65A:
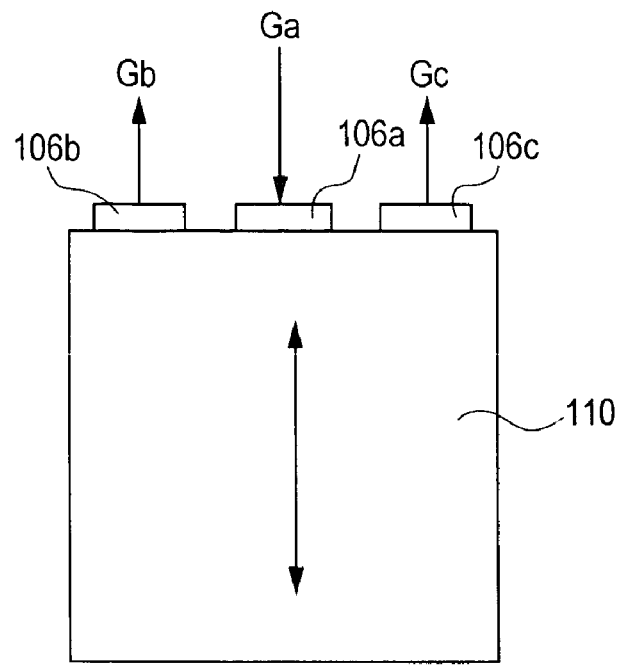
Figure 65B:
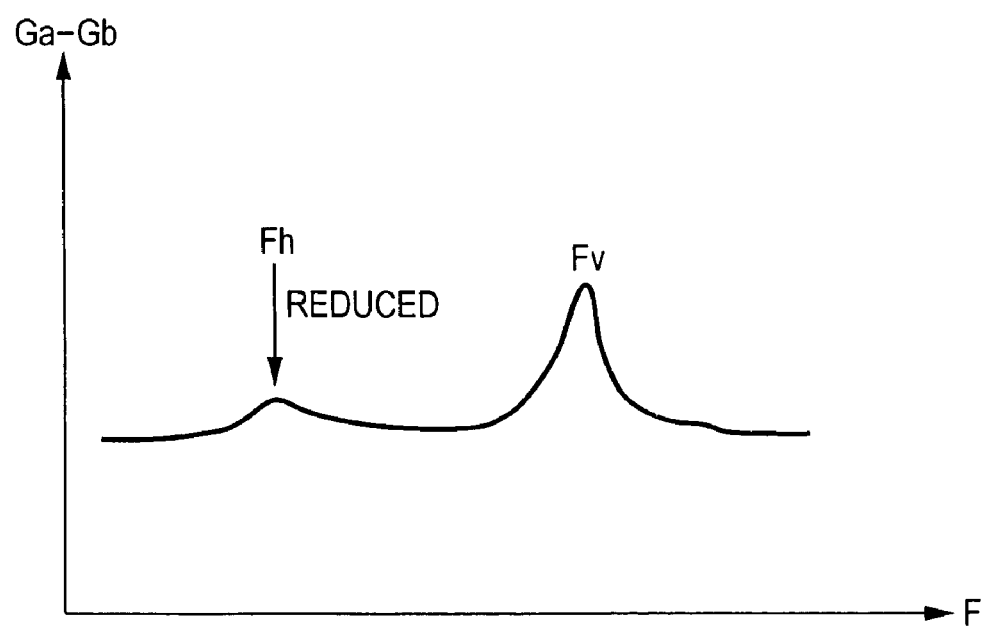

According to this embodiment, the vibration characteristics of the cantilever vibrator 110 are adjusted so that the differential signal obtained from the left and right detection signals output from the cantilever vibrator 110 while the cantilever vibrator 110 is being driven at a horizontal resonance frequency Fh. In other words, when adjusting the vibration characteristics of the cantilever vibrator 110, the peak level of the horizontal resonance frequency Fh, as shown in FIGS. 65A and 65B, is taken into consideration, and laser trimming is carried out on the cantilever vibrator 110 so that the peak level of the horizontal resonance frequency Fh is minimized. More specifically, it is determined whether or not the differential signal obtained from the detection electrodes 106b and 106c when the cantilever vibrator 110 vibrates at the horizontal resonance frequency Fh is within a predetermined range. Based on the magnitude of the differential signal obtained from the result, the laser processing area for adjustment on the cantilever vibrator 110 is selected, and trimming is carried out by laser processing. The steps of measurement and laser processing are repeated until a target value is achieved.

As described above, according to this embodiment, the vibration characteristics of the cantilever vibrator 110 are adjusted so that the cantilever vibrator 110 does not resonate at a frequency other than a frequency that causes the cantilever vibrator 110 to vibrate in the normal vibration direction (perpendicular direction). As a result, even if a disturbance noise having a frequency in the vicinity of the frequency corresponding to the level of detuning (e.g., 50 Hz or 100 Hz according to the present examples) affects the input signals, the affect on the detection signals is reduced and the signal ratio (signal-to-noise (SN) ratio) of the sensor output to the noise is increased. In this way, a vibrating gyroscopic sensor less likely to be affected by disturbance noise is obtained.

When there is a difference in the left and right detection signals of the cantilever vibrator 110 vibrating in the perpendicular vibration mode due to the asymmetry of the piezoelectric film, it is possible to simultaneously carry out adjustment of the level of detuning and adjustment of the left and right detection signals and take measures against disturbance. In this way, productivity, yield, and quality can be improved.

Third Embodiment

As described above, a vibrating gyroscopic sensor according to an embodiment of the present invention includes vibrating gyroscopic sensor elements 100A and 100B that have the same configuration and are mounted on the same support substrate in different axial direction. In this way, the vibrating gyroscopic sensor is capable of detecting angular rates in two axial directions (refer to FIG. 40). The vibrating gyroscopic sensor includes electronic components, such as IC chips, on the same support substrate. In addition, the vibrating gyroscopic sensor is set inside a main body including various sensor components and electronic devices. Therefore, it is necessary to improve the accuracy of the sensor output by preventing cross talk between the pair of vibrating gyroscopic sensor elements, between components, such as IC components, on the support substrate, and between the electronic devices included in the main body.

To adjust the level of detuning and adjust the detection signals of the vibrating gyroscopic sensor element 100 mounted on the support substrate 20 of the vibrating gyroscopic sensor according to an embodiment of the present invention, laser trimming is carried out on the rear surface 110b of the cantilever vibrator 110. In this adjustment process, it is possible to prevent cross talk between the vibrating gyroscopic sensors and between other electronic components and electronic devices.

In the adjustment of the vibration characteristics of the cantilever vibrator 110 according to this embodiment, various vibration characteristics such as the level of detuning and the balance of detection signals of the cantilever vibrator 110 are adjusted. Subsequently, laser trimming is carried out to adjust the vertical and horizontal resonance frequencies.

Since the cantilever vibrator 110 is shaped as a cantilever, the vibrating frequency is inversely proportional to the square of the length of the cantilever, as represented by the following formula, where fn represent a resonance frequency of the cantilever, E represents Young's modulus, I represents a cross-sectional secondary moment of the cantilever, ρ represents the density, A represents the cross-sectional area of the cantilever, L represents the length of the cantilever, and λ represents a proportionality coefficient. Laser trimming is carried out on the tip of the cantilever vibrator 110 based on the formula to reduce the rigidity and the actual length of the cantilever and, as a result, increase the resonance frequency of the cantilever.

$$f_n = \frac{\lambda^2}{2\pi}\sqrt{\frac{EI}{\rho A L^4}} = \frac{\lambda^2}{2\pi}\sqrt{\frac{EI}{\rho A}}\frac{1}{L^2} \qquad (1)$$

When adjusting the resonance frequency, the level of detuning that has already been adjusted must be prevented from changing. FIG. 66 illustrates a graph representing data points obtained by measuring the laser processing areas on the cantilever and the changes in the resonance frequency and the level of detuning when the laser processing depth is 11 μm and the cantilever length is 1.9 mm. By carrying out laser processing at an area more than 1.6 mm (which is more than four-fifths of the total length of the vibrator) away from the base of the cantilever (i.e., the rear anchor of the vibrator), the resonance frequency can be increased without changing the level of detuning (which corresponds to 94 Hz).

Figure 67:
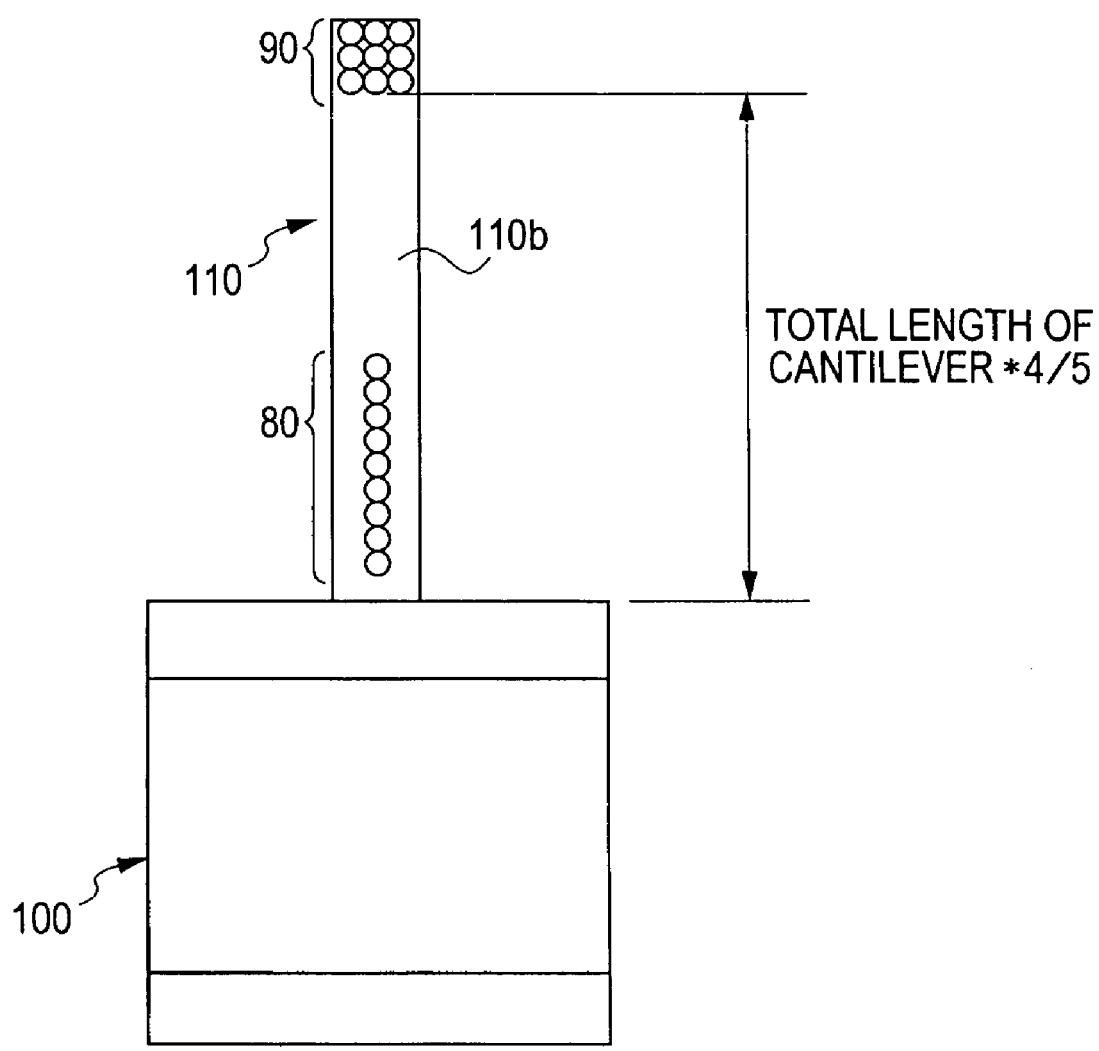
FIG. 67 illustrates a schematic plan view of laser processing area for adjusting the level of detuning and laser processing areas for adjusting the resonance frequency.

As a result, as shown in FIG. 67, the area away from the base of the cantilever vibrator 110 by a distance more than four-fifths of the total length of the vibrator on the rear surface 110b of the cantilever vibrator 110 is an area for forming laser-processed depressions 90 for adjusting the resonance frequency, whereas the area on the cantilever vibrator 110 excepting the former area is an area for forming laser-processed depressions 80 for adjusting the level of detuning and the balance of the left and right detection signals. In this way, the resonance frequency of the cantilever vibrator 110 can be adjusted, without changing the level of detuning, to a predetermined frequency band that is less affected by cross talk in the main body. The number of depressions 90 to be formed is not limited and may be a single depression or a plurality of depressions. The laser processing area where the depressions 90 are formed is not limited to a position aligned with the axial line of the cantilever vibrator 110. Moreover, the laser processing area where the depressions 90 are formed is not limited to the rear surface 110b of the cantilever vibrator 110 and, instead, may be at the tip of the cantilever vibrator 110. In addition to adjustment of the resonance frequency by forming the depressions 90, adjustment of the balance of the left and right detection signals is possible depending on the position of the laser processing area by forming the depressions 90 at asymmetric positions on the left and right sides of the central axial line of the cantilever vibrator 110.

To prevent cross talk between a pair of vibrating gyroscopic sensor elements, it is desirable to set the resonance frequencies of vibrating gyroscopic sensor elements at least 1 kHz apart.

Fourth Embodiment

In the process of forming a penetration part 13 for cutting out the external shape of a cantilever vibrator 110 from a Si substrate 1 according to the first embodiment (FIGS. 29 to 31), inductively coupled plasma reactive ion etching (ICP-RIE) is employed. ICP-RIE is extremely advantageous in that grooves having side walls perpendicular to the Si substrate 1 can be formed at a high aspect ratio.

Figure 68A:
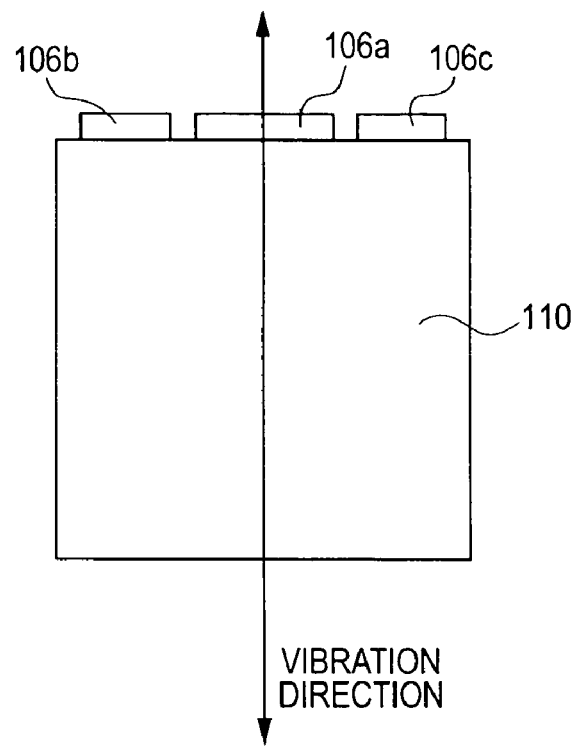
Figure 68B:
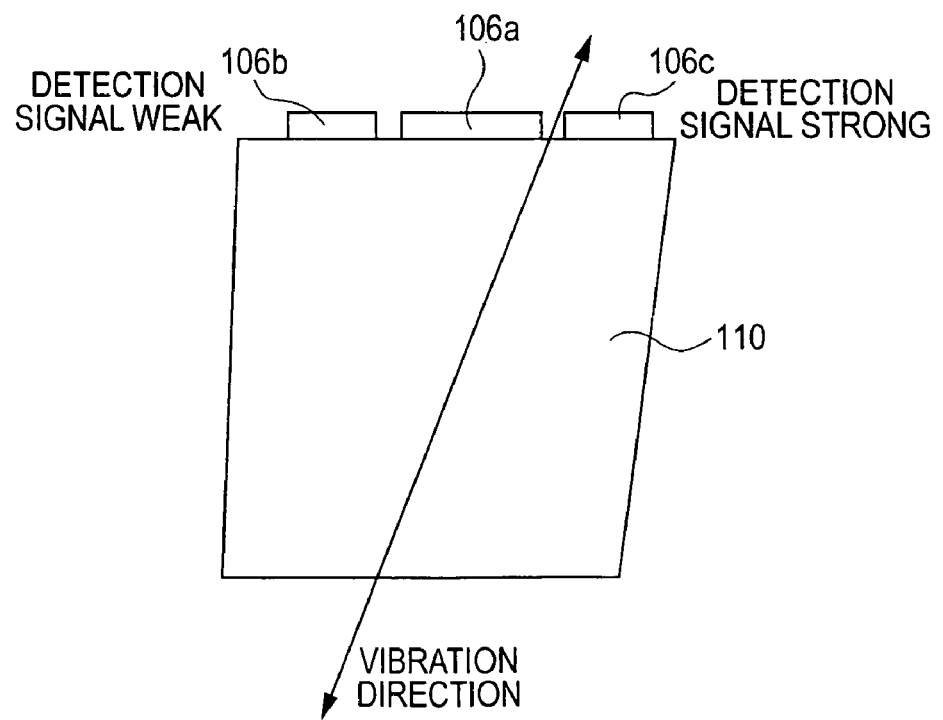

When the size of the Si substrate 1 (i.e., the wafer diameter) increases, it becomes difficult to form the side walls of all of the cantilever vibrator 110 on the Si substrate 1 at a desirable perpendicular angle, as shown in the schematic view illustrated in FIG. 68A, and, due to the gas flow distribution and the plasma distribution in the plasma processing chamber, the vibrators 110 may be formed as asymmetric shapes, as shown in the schematic view illustrated in FIG. 68B, especially in the outer peripheral area of the Si substrate 1.

If the cantilever vibrator 110 is symmetric, the vibration mode will be the perpendicular, which is the desirable vibration direction (FIG. 68A), and the detection signals output from the left and right detection electrodes 106b and 106c provided on the front surface of the cantilever vibrator 110 will be balanced without having a difference. However, when the cantilever vibrator 110 is asymmetric, the detection signals output from the left and right detection electrodes 106b and 106c will be unbalanced (FIG. 68B). When the left and right detection signals differ, the detected angular speed in the direction of the rotation of the cantilever vibrator 110 may differ or the sensitivity toward clockwise and counterclockwise rotational speeds will differ.

As described above, to adjust the balance of the left and right detection signals, predetermined areas of the cantilever vibrator 110 are trimmed by emitted a laser beam after forming the vibrating gyroscopic sensor element 100. However, the time required for adjustment is great when only this method is employed to balance the detection signals. Moreover, since the maximum difference of the left and right detection signals adjustable by using laser processing is about 30%, if the difference is greater than 30%, the cantilever vibrator 110 cannot be accepted as a product, causing a decrease in productivity.

According to the present embodiment, to shorten the time required for adjustment and to increase the production rate of non-defective products, etching for outlining the external shape of the cantilever vibrator 110 is carried out excessively until the ridge lines of the cantilever vibrator 110 exposed at the bottom of the penetration part 13 is curved.

Figure 69A:
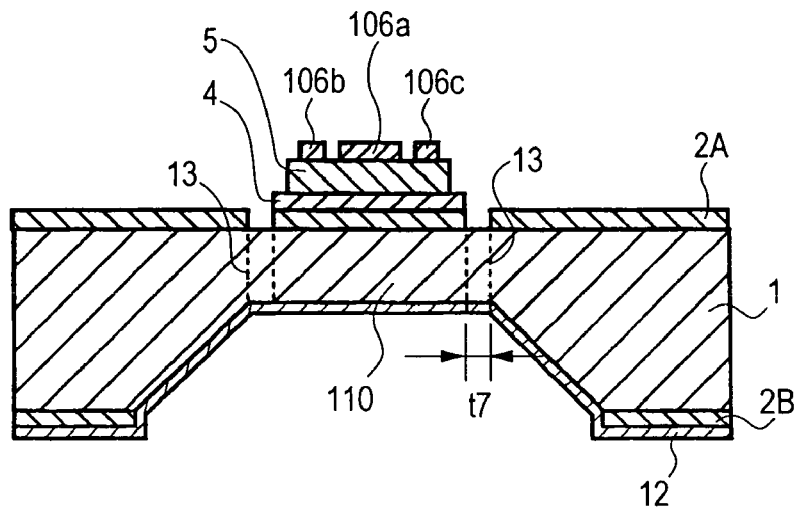

The penetration part 13 shown in FIG. 69A is U-shaped when viewed from the top. The penetration part 13 is formed by cutting out the Si substrate 1 masked by the thermally-oxidized film 2A along the external shape of the cantilever vibrator 110 by employing an etching process. This etching process is completed when the etching depth reaches a point that corresponds to the thickness of the cantilever vibrator 110 to be produced. At this time, the backside stopper film 12 provided on the backside of the Si substrate 1 limits the etching depth.

Figure 69B:
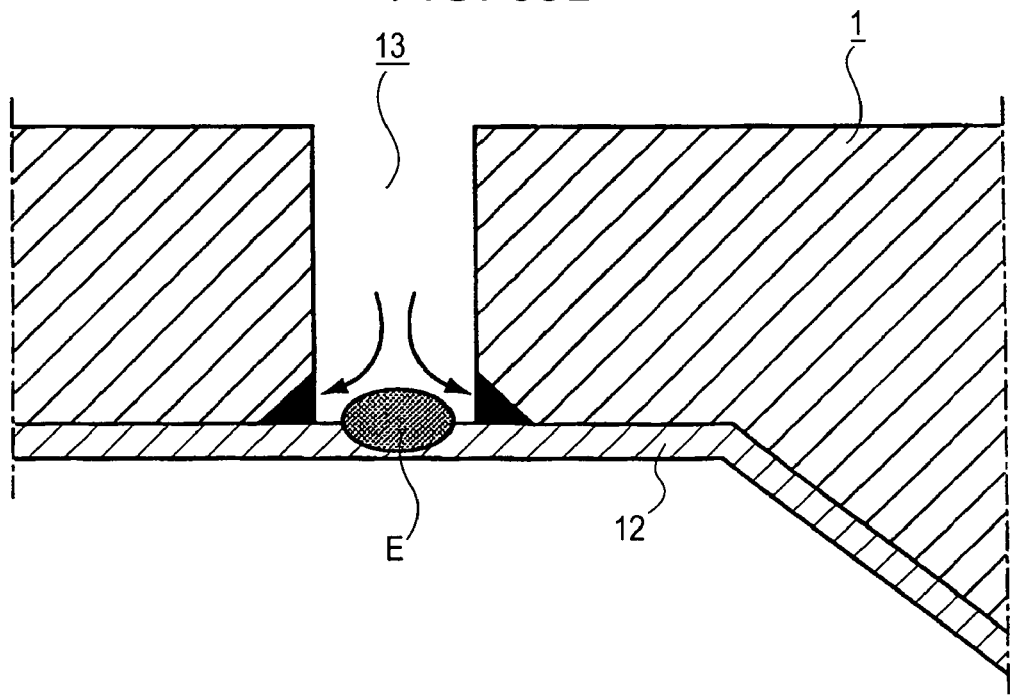

In the process of forming the penetration part 13 according to this embodiment, etching is continued even after the bottom of the groove formed by etching reaches the backside stopper film 12 (i.e., over-etching is carried out). As shown in the schematic view illustrated in FIG. 69B, when over-etching is carried out, an electric charge or a pool of etchant (represented by the reference character E in FIG. 69B) on the backside stopper film 12 causes the effect of the etching to be directed to the side walls of the penetration part 13. As a result, the lower ridge line areas of the cantilever vibrator 110 are trimmed into tapered or curved structures, as shown in FIG. 69B.

This phenomenon is known as "notching," and the etching conditions are normally controlled to prevent notching in a standard process. Severe notching occurs at the ridge line area where the angle of the backside stopper film 12 and the side wall of the penetration part 13 becomes more acute as the penetration part 13 is tilted more. FIG. 69A is a cross-sectional view illustrating the cantilever vibrator 110 viewed from the longitudinal direction. FIG. 69B is a cross-sectional view illustrating the main components viewed from an angle orthogonal to the longitudinal direction of the cantilever vibrator 110.

In this embodiment, notching caused by over-etching during the formation of the penetration part 13 is used to reduce the tilt in the vibration direction of the cantilever vibrator 110 due to asymmetry in the shape of the cantilever vibrator 110.

Figure 70A:
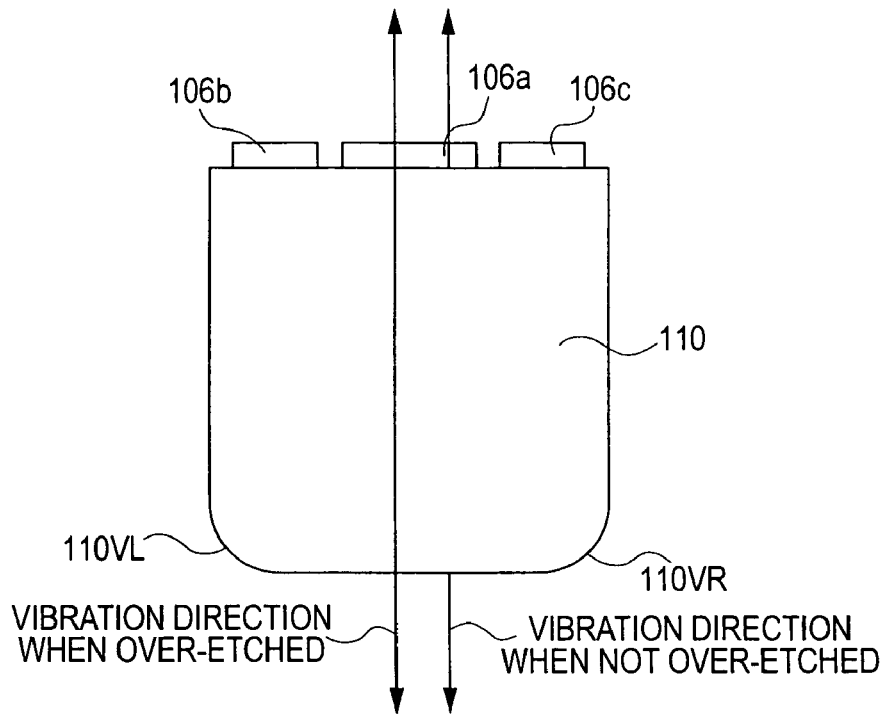
Figure 70B:
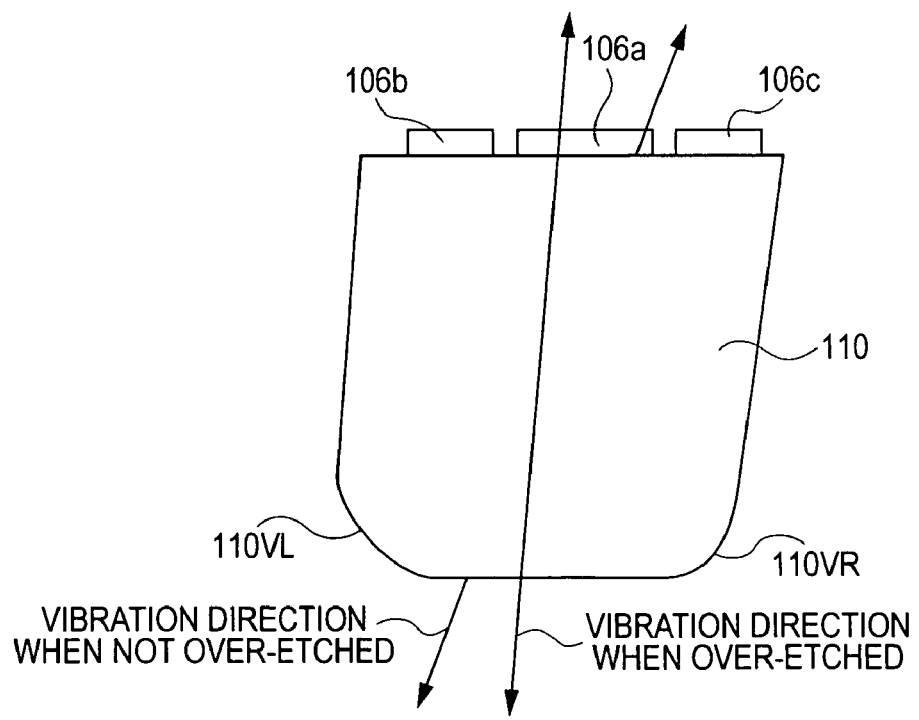

When the cantilever vibrator 110 having an asymmetric shape, the vibration direction of the cantilever vibrator 110 produced by over-etching, as shown in FIG. 70B, is closer to the perpendicular direction compared to the vibration direction of the cantilever vibrator 110 produced by regular etching (i.e., without employing over-etching), as shown in FIG. 68B. This is because, for the left and right ridge lines 110VL and 110VR of the cantilever vibrator 110, whichever has a more acute angle will be affected more by notching during the etching process and a larger mass of the cantilever vibrator 110 at the ridge line area is removed. As a result, the weight of the left and right halves of the cantilever vibrator 110 is better balanced, and the vibration is adjusted to a vibration mode in the perpendicular direction.

As shown in FIG. 68A, for the cantilever vibrator 110 having a symmetric shape, when the penetration part 13 is formed by employing over-etching, both the left and right ridge lines 110VL and 110VR will be curved due to notching, as shown in FIG. 70A. However, in this case, the mass removed by etching is substantially the same for both the left and right ridge lines 110VL and 110VR, and the symmetry of the shape of the cantilever vibrator 110 is maintained. As a result, similar to when over-etching is not employed, the cantilever vibrator 110 vibrates in the perpendicular direction.

The cantilever vibrator 110 illustrated in FIGS. 68 and 70 is shown upside-down so that the description is easier to understand. The actual vibrator 110 vibrates while facing the front surface, where the detection electrodes 106*b* and 106*c* and the driving electrode 106*a* are provided, downward.

Over-etching can be carried out by managing the regular etching time, i.e., setting the processing time longer than the time set for regular etching. The length of the area from the left and right ridge lines 110VL and 110VR of the cantilever vibrator 110 to be processed by notching can be set to a predetermined length depending on various specifications, such as the size and shape of the cantilever vibrator 110 and the driving frequency. According to the shape of the vibrating gyroscopic sensor element 100 according to the first embodiment, the length of the area to be processed is 5 µm or more. Furthermore, since the strength of the cantilever vibrator 110 is reduced if too large of an area is processed, the desirable length of the area to be processed is 20 µm or less.

As described above, according to this embodiment, the vibration mode of a cantilever vibrator originally having a symmetric shape is maintained in a desirable direction even after notching occurs to form tapered or curved ridge lines of the cantilever vibrator 110. Furthermore, in case the cantilever vibrator 110 that vibrates at a tilted angle due to its original asymmetric shape, notching that occurs at the lower ridge lines of the cantilever vibrator 110 makes the cantilever vibrator 110 less asymmetric and adjusts the vibration to a vibration mode closer to a perpendicular direction. Therefore, a cantilever vibrator 110 whose vibration mode is unbalanced due to insufficient adjustment can be adjusted by laser processing. In this way, productivity and yield are improved.

The inventors have confirmed that, for a plurality of known vibrating gyroscopic sensor elements produced from one Si substrate, the yield of non-defective elements in which the left and right detection signals differ by less than 30% is about 43% before carrying out adjustment, whereas, for a plurality of vibrating gyroscopic sensor elements produced from one Si substrate according to this embodiment, the yield of non-defective elements is about 87%, which is about twice of that for known vibrating gyroscopic sensor elements.

Fifth Embodiment

In the process of forming the penetration part 13 for cutting out the external shape of the cantilever vibrator 110 from the Si substrate 1 according to the first embodiment, inductively coupled plasma reactive ion etching (ICP-RIE) is employed. ICP-RIE is extremely advantageous in that grooves having side walls perpendicular to the Si substrate 1 can be formed at a high aspect ratio.

Figure 71:
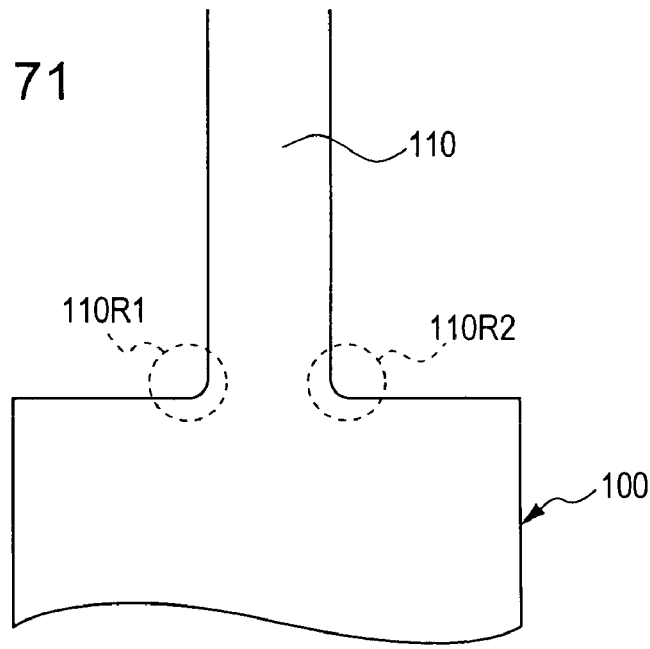
FIG. 71 illustrates a schematic plan view of the shape of the base of a cantilever vibrator in a vibrating gyroscopic sensor element.

Usually, when a linear groove is formed by etching, the walls of the groove do not form an accurate right angle (i.e., the sides on the width direction of the groove and the side on the longitudinal direction of the groove do not form a right angle) and are, instead, curved. Therefore, when forming the penetration part 13, base areas 110R1 and 110R2 of the cantilever vibrator 110 corresponding to the border areas between the two side surfaces of the cantilever vibrator 110 and the base of the vibrating gyroscopic sensor element 100 have curved shapes when viewed from the top, as shown in FIG. 71.

Figure 72A:
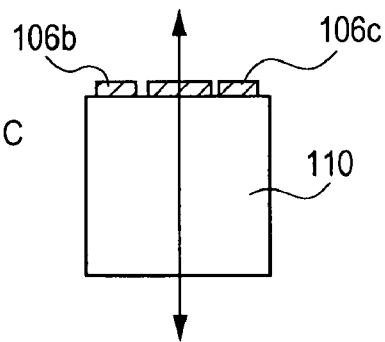
Figure 72B:
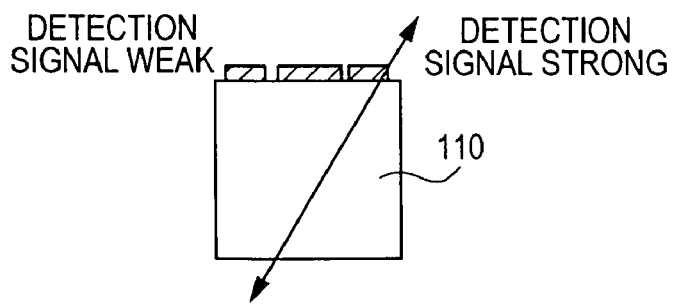

However, the base areas 110R1 and 110R2 of the cantilever vibrator 110 easily become asymmetric. As shown in FIG. 72A, if the shape of the cantilever vibrator 110 is symmetric, the vibration mode of the cantilever vibrator 110 will be the perpendicular direction and the detection signals from the detection electrodes 106*b* and 106*c* provided on the surface of the cantilever vibrator 110 will be balanced. In contrast, as described above, if the base areas 110R1 and 110R2 of the cantilever vibrator 110 are asymmetric, the vibration mode of the cantilever vibrator 110 will be tilted, as shown in FIG. 72B.

When the vibrator mode is a tilted angle, the detection signals from the left and right detection electrodes 106*b* and 106*c* will be unbalanced. When the left and right detection electrodes 106*b* and 106*c* are unbalanced, the detected angular speed in the direction of the rotation of the cantilever vibrator 110 may differ or the sensitivity toward clockwise and counterclockwise rotational speeds will differ.

As described above, to adjust the balance between the left and right detection signals, a predetermined area of the cantilever vibrator 110 is trimmed by emitting a laser beam after the vibrating gyroscopic sensor element 100 is formed. However, the time required for adjustment is great when only this method is employed to balance the detection signals. Moreover, since the maximum difference of the left and right detection signals adjustable by using a laser beam is about 30%, if the difference is greater than 30%, the cantilever vibrator 110 cannot be accepted as a product, causing a decrease in productivity.

Figure 73:
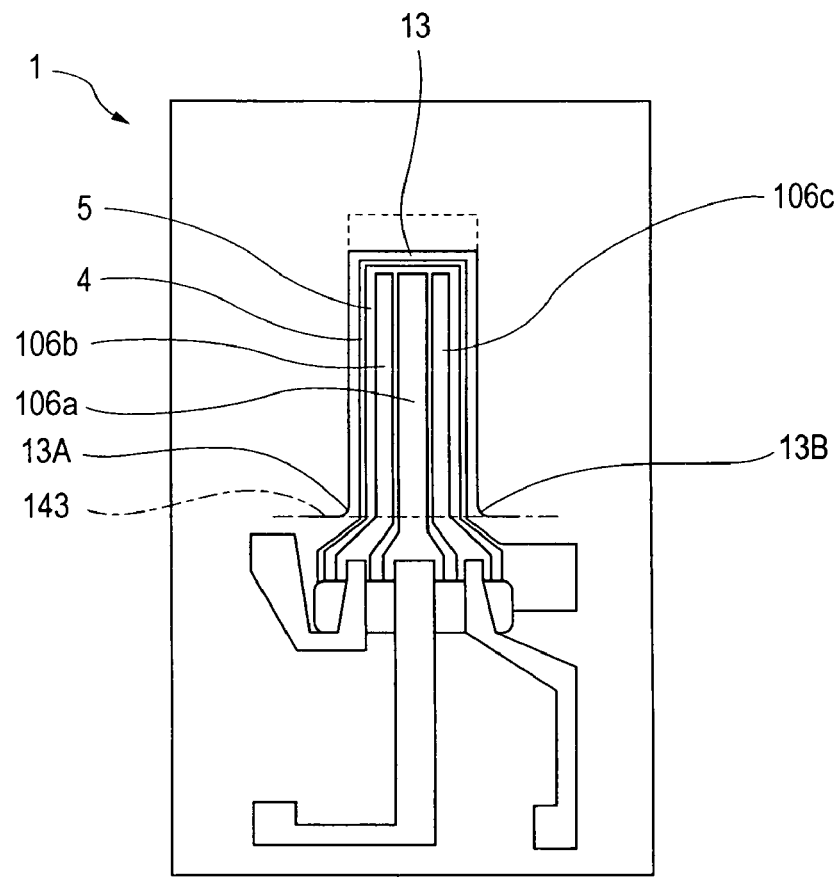
FIG. 73 illustrates a plan view of the main part of a penetration part according to a fifth embodiment of the present invention showing the formation process of the penetration part.

According to the present embodiment, to shorten the time required for adjustment and to increase the production rate of non-defective products, etching for outlining the external shape of the cantilever vibrator 110 is carried out to taper or curve both end portions 13A and 13B of the penetration part 13 toward the outside (refer to FIG. 73).

FIG. 73 illustrates a schematic of the Si substrate 1 in a process of forming an external groove. The penetration part 13 is formed as a U-shape, surrounding the outside of the cantilever vibrator 110. The end portions 13A and 13B of the penetration part 13 are curved toward the outside of the cantilever vibrator 110. The penetration part 13 is formed to etching the Si substrate 1 that is masked with the thermally-oxidized film 2A (at this time, the piezoelectric film, the upper electrode film, and the wiring pattern including terminals and leads are covered with a protective film). When patterning the thermally-oxidized film 2A, both edges at the opening of the U-shape corresponding to the areas where the penetration part 13 are curved, as shown in FIG. 73.

Figure 74:
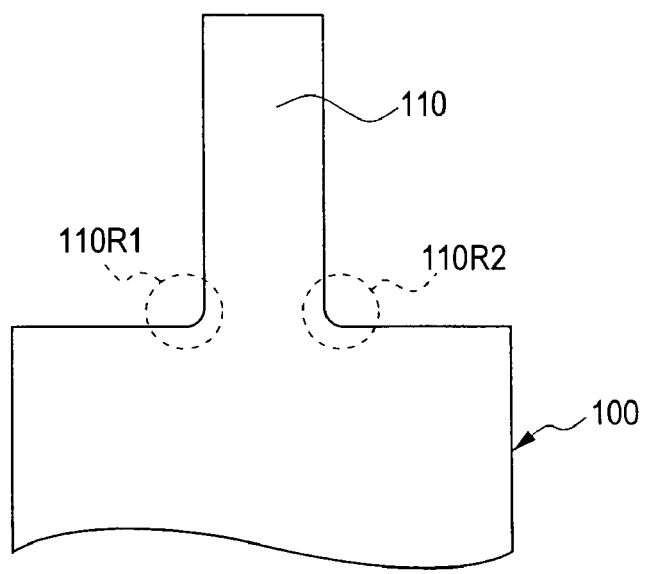
FIG. 74 illustrates a schematic plan view of the operation of a vibrating gyroscopic sensor element according to the fifth embodiment of the present invention.

As a result, the end portions 13A and 13B of the penetration part 13 are curved along the shape of the opening of the thermally-oxidized film 2A. As shown in FIG. 74, symmetry of the shapes of the base areas 110R1 and 110R2 of the cantilever vibrator 110 is improved to a degree in that the shapes are substantially identical. In this way, the vibration of the cantilever vibrator 110 will be maintained at a vibration mode in the perpendicular direction, and the balance between the detection signals is improved.

Figure 75A:
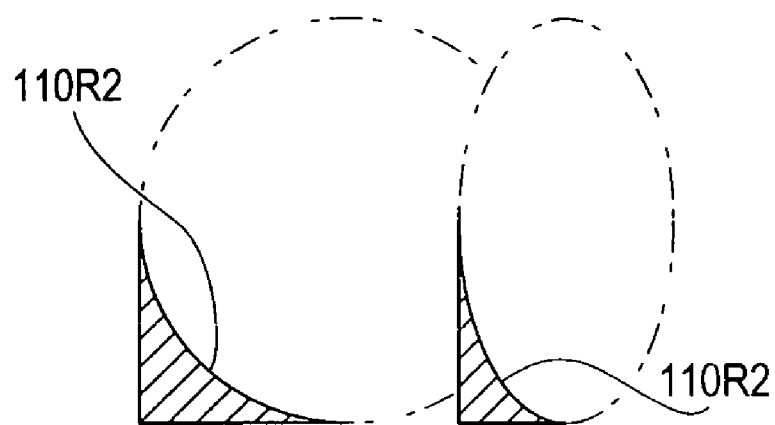
FIG. 75 illustrates the processes of forming the shape of the base of a cantilever vibrator.
Figure 75B:
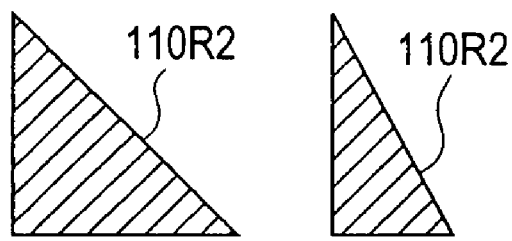
Figure 75C:
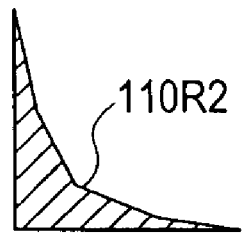

FIGS. 75A to 75C illustrates plan views of the base area 110R2 (110R1) of the cantilever vibrator 110. FIG. 75A illustrates the base areas 110R2 of the cantilever vibrator 110 formed as a circle and an oval having a predetermined curvature. FIG. 75B illustrates the base areas 110R2 of the cantilever vibrator 110 formed in tapered shapes having difference angles of inclination. FIG. 75C lustrates the base area 110R2 of the cantilever vibrator 110 formed on a plurality of connected inclined surfaces whose angles with respect to the base of the vibrating gyroscopic sensor element 100 become gradually become smaller.

The shapes of the base areas 110R1 and 110R1 of the cantilever vibrator 110 are not limited to the above-described shapes so long as the base areas 110R1 and 110R1 are tapered or curved so that the width of the base areas 110R1 and 110R1 becomes gradually greater toward the outside of the cantilever vibrator 110. The radius of curvature of the base areas 110R1 and 110R1 can be set to any value, such as 5 μm.

As described above, according this embodiment, since the base areas 110R1 and 110R1 are curved by forming the end portions 13A and 13B of the penetration part 13 as curved shapes from the beginning, the shape of the cantilever vibrator 110 is substantially symmetric. In this way, the vibration of the cantilever vibrator 110 can be maintained at a vibration mode in the perpendicular direction. Therefore, a cantilever vibrator who vibrates in an unbalanced vibration mode due to insufficient adjustment can be adjusted by laser processing. In this way, productivity and yield are improved.

The inventors have confirmed that, for a plurality of known vibrating gyroscopic sensor elements produced from one Si substrate, the yield of non-defective elements in which the left and right detection signals differ by less than 30% is about 38% before carrying out adjustment, whereas, for plurality of vibrating gyroscopic sensor elements produced from one Si substrate according to this embodiment, the yield of non-defective elements is significantly improved to about 82%. Here, the radius of curvature of the base of the vibrator is set to 20 μm.

The vibrating gyroscopic sensor element and a method of producing the same according to the present invention further include the following configurations:

(1) A vibrating gyroscopic sensor element including a cantilever vibrator, wherein the vibrator has at least one first depression for adjusting the frequency difference between a vertical resonance frequency and a horizontal resonance frequency of the vibrator and at least one second depression for adjusting the difference of signals output from a pair of detection electrodes provided on the vibrator;

(2) The vibrating gyroscopic sensor element according to (1), wherein the first and second depressions are provided as at least one common depression;

(3) The vibrating gyroscopic sensor element according to (1), wherein a piezoelectric film, a driving electrode, and the pair of detection electrodes are provided on a first surface of the vibrator, and the first and second depressions are provided in an area other than the first surface;

(4) The vibrating gyroscopic sensor element according to (1), wherein at least one third depression for adjusting a resonance frequency of the vibrator is provided at the tip area of the vibrator;

(5) The vibrating gyroscopic sensor element according to (4), wherein the third depression is provided at a position more than four-fifths of the total length of the vibrator away from the base of the vibrator;

(6) A vibrating gyroscopic sensor element including a cantilever vibrator, wherein at least one depression for adjusting the frequency difference between a vertical resonance frequency and a horizontal resonance frequency of the vibrator and the difference of signals output from a pair of detection electrodes provided on the vibrator is provided on the vibrator;

(7) The vibrating gyroscopic sensor element according to (6), wherein a piezoelectric film, a driving electrode, and the pair of detection electrodes are provided on a first surface of the vibrator, and the depression is provided in an area other than the first surface;

(8) The vibrating gyroscopic sensor element according to (6), wherein at least one depression for adjusting a resonance frequency of the vibrator is provided at the tip area of the vibrator;

(9) The vibrating gyroscopic sensor element according to (8), wherein the depression is provided at a position more than four-fifths of the total length of the vibrator away from the base of the vibrator;

(10) A vibrating gyroscopic sensor element including a cantilever vibrator, wherein the vibrator has at least one first depression for adjusting the frequency difference between a vertical resonance frequency and a horizontal resonance frequency of the vibrator and at least one second depression for adjusting the difference of signals output from a pair of detection electrodes provided on the vibrator, and the second depression is formed at a position that minimizes the signal difference when the vibrator is vibrated at a horizontal resonance frequency;

(11) The vibrating gyroscopic sensor element according to (10), wherein the first and second depressions are provided as at least one common depression;

(12) The vibrating gyroscopic sensor element according to (10), wherein a piezoelectric film, a driving electrode, and the pair of detection electrodes are provided on a first surface of the vibrator, and the first and second depressions are provided in an area other than the first surface;

(13) The vibrating gyroscopic sensor element according to (10), wherein at least one third depression for adjusting a resonance frequency of the vibrator is provided at the tip area of the vibrator;

(14) The vibrating gyroscopic sensor element according to (13), wherein the third depression is provided at a position more than four-fifths of the total length of the vibrator away from the base of the vibrator;

(15) A vibrating gyroscopic sensor element including a cantilever vibrator, wherein at least one depression for adjusting the frequency difference between a vertical resonance frequency and a horizontal resonance frequency of the vibrator and the difference of signals output from a pair of detection electrodes provided on the vibrator is provided on the vibrator, and the depression is formed at a position that minimizes the signal difference when the vibrator is vibrated at a horizontal resonance frequency;

(16) The vibrating gyroscopic sensor element according to (15), wherein a piezoelectric film, a driving electrode, and the pair of detection electrodes are provided on a first surface of the vibrator, and the depression is provided in an area other than the first surface;

(17) The vibrating gyroscopic sensor element according to (15), wherein at least one depression for adjusting a resonance frequency of the vibrator is provided at the tip area of the vibrator;

(18) The vibrating gyroscopic sensor element according to (17), wherein the depression is provided at a position more than four-fifths of the total length of the vibrator away from the base of the vibrator;

(19) A vibrating gyroscopic sensor element including a cantilever vibrator, wherein at least one depression for adjusting a resonance frequency of the vibrator is provided on the vibrator;

(20) The vibrating gyroscopic sensor element according to (19), wherein at least one depression for adjusting the difference of signals output from a pair of detection electrodes provided on the vibrator is provided on the vibrator;

(21) The vibrating gyroscopic sensor element according to (19), wherein at least one depression for adjusting the frequency difference between a vertical resonance frequency and a horizontal resonance frequency of the vibrator is provided on the vibrator;

(22) The vibrating gyroscopic sensor element according to (19), wherein at least one depression for adjusting the frequency difference between a vertical resonance frequency and a horizontal resonance frequency of the vibrator and the difference of signals output from a pair of detection electrodes provided on the vibrator is provided on the vibrator;

(23) A method of producing a vibrating gyroscopic sensor element including a cantilever vibrator including the steps of forming, on the vibrator, at least one first depression for adjusting the frequency difference between a vertical resonance frequency and a horizontal resonance frequency of the vibrator and forming, on the vibrator, at least one second depression for adjusting the difference of signals output from a pair of detection electrodes provided on the vibrator, wherein the second depression is formed at a position that minimizes the signal difference when the vibrator is vibrated at a vertical resonance frequency;

(24) The method of producing a vibrating gyroscopic sensor element according to (23), wherein the steps of forming the first and second depressions are repeated a number of times after measuring the frequency difference and the signal difference;

(25) The method of producing a vibrating gyroscopic sensor element according to (23), wherein the first and second depressions are provided as at least one common depression;

(26) The method of producing a vibrating gyroscopic sensor element according to (23), further including the step of forming at least one third depression for adjusting a resonance frequency of the vibrator at the tip area of the vibrator;

(27) The method of producing a vibrating gyroscopic sensor element according to (26), wherein the third depression is provided at a position more than four-fifths of the total length of the vibrator away from the base of the vibrator;

(28) A method of producing a vibrating gyroscopic sensor element including a cantilever vibrator including the steps of forming at least one depression for adjusting the frequency difference between a vertical resonance frequency and a horizontal resonance frequency of the vibrator and the difference of signals output from a pair of detection electrodes provided on the vibrator is provided on the vibrator, wherein the depression is formed at a position that minimizes the signal difference when the vibrator is vibrated at a vertical resonance frequency;

(29) The method of producing a vibrating gyroscopic sensor element according to (28), wherein the step of forming the depression is repeated a number of times after measuring the frequency difference and the signal difference;

(30) The method of producing a vibrating gyroscopic sensor element according to (28), further including the step of forming at least one depression for adjusting a resonance frequency of the vibrator on the vibrator;

(31) The method of producing a vibrating gyroscopic sensor element according to (30), wherein the depression is provided at a position more than four-fifths of the total length of the vibrator away from the base of the vibrator;

(32) A method of producing a vibrating gyroscopic sensor element including a cantilever vibrator including the steps of forming, on the vibrator, at least one first depression for adjusting the frequency difference between a vertical resonance frequency and a horizontal resonance frequency of the vibrator and forming, on the vibrator, at least one second depression for adjusting the difference of signals output from a pair of detection electrodes provided on the vibrator, wherein the second depression is formed at a position that minimizes the signal difference when the vibrator is vibrated at a horizontal resonance frequency;

(33) The method of producing a vibrating gyroscopic sensor element according to (32), wherein the steps of forming the first and second depressions are repeated a number of times after measuring the frequency difference and the signal difference;

(34) The method of producing a vibrating gyroscopic sensor element according to (32), wherein the first and second depressions are provided as at least one common depression;

(35) The method of producing a vibrating gyroscopic sensor element according to (32), further including the step of forming at least one third depression for adjusting a resonance frequency of the vibrator at the tip area of the vibrator;

(36) The method of producing a vibrating gyroscopic sensor element according to (35), wherein the third depression is provided at a position more than four-fifths of the total length of the vibrator away from the base of the vibrator;

(37) A method of producing a vibrating gyroscopic sensor element including a cantilever vibrator including the steps of forming at least one depression for adjusting the frequency difference between a vertical resonance frequency and a horizontal resonance frequency of the vibrator and the difference of signals output from a pair of detection electrodes provided on the vibrator is provided on the vibrator, wherein the depression is formed at a position that minimizes the signal difference when the vibrator is vibrated at a horizontal resonance frequency;

(38) The method of producing a vibrating gyroscopic sensor element according to (37), wherein the step of forming the depression is repeated a number of times after measuring the frequency difference and the signal difference;

(39) The method of producing a vibrating gyroscopic sensor element according to (37), further including the step of forming at least one depression for adjusting a resonance frequency of the vibrator at the tip area of the vibrator;

(40) The method of producing a vibrating gyroscopic sensor element according to (39), wherein the depression is provided at a position more than four-fifths of the total length of the vibrator away from the base of the vibrator;

(41) A vibrating gyroscopic sensor element including a cantilever vibrator, wherein the vibrator has at least one first depression for adjusting the frequency difference between a vertical resonance frequency and a horizontal resonance frequency of the vibrator and at least one second depression for adjusting the difference of signals output from a pair of detection electrodes provided on the vibrator, and the second depression is formed at a position that minimizes the signal difference when the vibrator is vibrated at a vertical resonance frequency;

(42) The vibrating gyroscopic sensor element according to (41), wherein the first and second depressions are provided as at least one common depression;

(43) The vibrating gyroscopic sensor element according to (41), wherein a piezoelectric film, a driving electrode, and the pair of detection electrodes are provided on a first surface of the vibrator, and the first and second depressions are provided in an area other than the first surface;

(44) The vibrating gyroscopic sensor element according to (41), wherein at least one third depression for adjusting a resonance frequency of the vibrator is provided at the tip area of the vibrator;

(45) The vibrating gyroscopic sensor element according to (44), wherein the third depression is provided at a position more than four-fifths of the total length of the vibrator away from the base of the vibrator;

(46) A vibrating gyroscopic sensor element including a cantilever vibrator, wherein at least one depression for adjusting the frequency difference between a vertical resonance frequency and a horizontal resonance frequency of the vibrator and the difference of signals output from a pair of detection electrodes provided on the vibrator is provided on the vibrator, and the depression is formed at a position that minimizes the signal difference when the vibrator is vibrated at a vertical resonance frequency;

(47) The vibrating gyroscopic sensor element according to (46), wherein a piezoelectric film, a driving electrode, and the pair of detection electrodes are provided on a first surface of the vibrator, and the depression is provided in an area other than the first surface;

(48) The vibrating gyroscopic sensor element according to (46), wherein at least one depression for adjusting a resonance frequency of the vibrator is provided at the tip area of the vibrator; and

(49) The vibrating gyroscopic sensor element according to (48), wherein the depression is provided at a position more than four-fifths of the total length of the vibrator away from the base of the vibrator.

It should be understood by those skilled in the art that various modifications, combinations, sub-combinations and alterations may occur depending on design requirements and other factors insofar as they are within the scope of the appended claims or the equivalents thereof.

What is claimed is:

1. A vibrating gyroscopic sensor comprising:
   a vibrating gyroscopic sensor element;
   a cantilever vibrator including a piezoelectric film;
   a driving electrode;
   a pair of detection electrodes on a first surface of the vibrating gyroscopic sensor element;
   one or more depressions in the cantilever vibrator effective to adjust the vibration characteristics of the cantilever vibrator; and
   a support substrate on which the vibrating gyroscopic sensor element is mounted,
   wherein,
   the vibrating gyroscopic sensor element is mounted on the support substrate so that a first surface of the cantilever vibrator faces the support substrate,
   said cantilever vibrator projects from a base area of said vibrating gyroscopic sensor element, and
   said one or more depressions effective to adjust the vibration characteristics of the cantilever vibrator are provided in an area other than the first surface of the cantilever vibrator, which area is defined as a laser processing region.

2. The vibrating gyroscopic sensor according to claim 1, wherein the depression is effective to adjust a frequency difference between a vertical resonance frequency and a horizontal resonance frequency of the cantilever vibrator.

3. The vibrating gyroscopic sensor according to claim 1, wherein the depression is effective to adjust a difference between signals output from the pair of detection electrodes.

4. The vibrating gyroscopic sensor according to claim 1, wherein the depression is effective to adjust a frequency difference between a vertical resonance frequency and a horizontal resonance frequency of the cantilever vibrator and a difference between signals output from the pair of detection electrodes.

5. The vibrating gyroscopic sensor according to claim 1, wherein the laser processing region is a surface opposing the first surface.

6. The vibrating gyroscopic sensor according to claim 1, wherein the laser processing region is a ridge line area connecting a surface opposing the first surface and a side surface adjacent to the first surface.

7. The vibrating gyroscopic sensor according to claim 1, wherein the laser processing region is a side surface adjacent to the first surface.

8. The vibrating gyroscopic sensor according to claim 1, wherein said depression is a plurality of depressions formed at different positions.

9. The vibrating gyroscopic sensor according to claim 1, wherein the depression is provided at a position more than 100 .mu.m away from the base of the cantilever vibrator.

10. The vibrating gyroscopic sensor according to claim 1, wherein said depression is a plurality of depressions provided in a step-like pattern.

11. The vibrating gyroscopic sensor according to claim 1, wherein the depression is effective to adjust a resonance frequency of the cantilever vibrator.

12. The vibrating gyroscopic sensor according to claim 11, wherein the depression forms at a position more than four-fifths of a total length of said cantilever vibrator away from the base of the cantilever vibrator.

13. The vibrating gyroscopic sensor according to claim 1, wherein at least part of the laser processing region melts to form a smooth surface.

14. The vibrating gyroscopic sensor according to claim 1, further comprising a curved ridge line area that connects a surface opposing the first surface of the cantilever vibrator and a side surface adjacent to the first surface.

15. The vibrating gyroscopic sensor according to claim 1, wherein both sides of the base area of the cantilever vibrator are curved.

16. A method of adjusting a vibrating gyroscopic sensor, comprising the steps of:
   providing a vibrating gyroscopic sensor element and a support substrate on which the vibrating gyroscopic sensor element mounts, the vibrating gyroscopic sensor element including a cantilever vibrator, the cantilever vibrator having a piezoelectric film, a driving electrode, and a pair of detection electrodes on a first surface, the cantilever vibrator projecting from a base area of said vibrating gyroscopic sensor element, the vibrating gyroscopic sensor element being mounted on the support substrate so that said first surface of said cantilever vibrator faces the support substrate;
   adjusting the vibration characteristics of said cantilever vibrator by laser processing a laser processing region, the laser processing region being an area other than said first surface of said cantilever vibrator;
   measuring a vertical resonance frequency by reading an operating frequency, via detection signals generated while vertically vibrating said cantilever;
   measuring a horizontal resonance frequency by reading a operating frequency, via detection signals generated while horizontally vibrating said cantilever;

measuring the frequency difference between the vertical resonance frequency and the horizontal resonance frequency to obtain a level of detuning;

measuring the difference between a pair of detection signals while vertically vibrating said cantilever vibrator so as to obtain a differential signal;

processing the laser processing area of said cantilever vibrator based on the level of detuning and the differential signal obtained in the measuring step;

the measuring step and the processing step are repeated until the level of detuning and the differential signal obtained in the measuring step reach target values, wherein adjustments of frequency and adjustment of left and right detection signals are carried out by determining the position of the laser processing area of the cantilever vibrator on the basis of the frequency differences between the vertical and horizontal initial resonance frequencies of the cantilever vibrator and left and right initial detection signals, respectively, output from the pair of detection electrodes, and the step of adjusting the vibrating characteristics of the cantilever vibrator by laser processing the laser processing area comprises forming one or more depressions in the laser processing area effective to adjust the vibration characteristics of the cantilever vibrator.

17. The method of adjusting a vibrating gyroscopic sensor according to claim 16, wherein, the adjusting step, a vibration direction of the cantilever vibrator adjust to a direction perpendicular to the support substrate.

18. The method of adjusting a vibrating gyroscopic sensor according to claim 16, wherein, a frequency difference in vertical and horizontal initial resonance frequencies of the cantilever vibrator is measured, and the measured frequency difference determines a laser processing area of the cantilever vibrator.

19. The method of adjusting a vibrating gyroscopic sensor according to claim 16, wherein left and right initial detection signals output from the pair of detection electrodes determines a laser processing area of the cantilever vibrator.

20. The method of adjusting a vibrating gyroscopic sensor according to claim 16, wherein, processing the base of the cantilever vibrator produces a coarse adjustment, and processing the area opposite the base area of the cantilever vibrator produces a fine adjustment.

21. The method of adjusting a vibrating gyroscopic sensor according to claim 16, wherein the vibration characteristics are adjusted to the perpendicular direction by determining the laser processing area so that a difference between signals output from the pair of detection electrodes is minimized when the cantilever vibrator is vibrated at a horizontal resonance frequency.

22. The method of adjusting a vibrating gyroscopic sensor according to claim 16, further comprising the step of: adjusting a resonance frequency of the cantilever vibrator by laser processing at a position more than four-fifths of a total length of the cantilever vibrator away from the base of the cantilever vibrator.

23. The method of adjusting a vibrating gyroscopic sensor according to claim 16, further comprising the step of: melting and smoothing the laser processing area of the cantilever vibrator by irradiating the laser processing region with a laser beam before adjusting the vibration characteristics of the cantilever vibrator.

24. The method of adjusting a vibrating gyroscopic sensor according to claim 16, wherein, a external shape of the cantilever vibrator is defined by etching a U-shaped groove on a silicon substrate, and a ridge line area connecting a surface opposing the first surface of the cantilever vibrator and a side surface adjacent to the first surface is curved by carrying out excessive etching.

25. The method of adjusting a vibrating gyroscopic sensor according to claim 16, wherein, an external shape of the cantilever vibrator is defined by etching a U-shaped groove on a silicon substrate, and each edge of the U-shaped groove is curved outward from the corresponding side surface of the cantilever vibrator.

* * * * *